(12) United States Patent
Zhang et al.

(10) Patent No.: US 11,616,945 B2
(45) Date of Patent: Mar. 28, 2023

(54) SIMPLIFIED HISTORY BASED MOTION VECTOR PREDICTION

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/210,797

(22) Filed: Mar. 24, 2021

(65) Prior Publication Data

US 2021/0218980 A1 Jul. 15, 2021

Related U.S. Application Data

(63) Continuation of application No. PCT/IB2019/058078, filed on Sep. 24, 2019.

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/109* (2014.11); *H04N 19/159* (2014.11);
(Continued)

(58) Field of Classification Search
CPC .. H04N 19/105; H04N 19/109; H04N 19/159; H04N 19/176; H04N 19/513; H04N 19/52; H04N 19/577
See application file for complete search history.

(56) References Cited

U.S. PATENT DOCUMENTS

| 7,529,302 B2 | 5/2009 | Mukerjee et al. |
| 8,184,715 B1 | 5/2012 | Rosenzweig et al. |

(Continued)

FOREIGN PATENT DOCUMENTS

| CA | 3025490 A1 | 12/2017 |
| CA | 3037685 A1 | 3/2018 |

(Continued)

OTHER PUBLICATIONS

J. Han, Y. Xu and J. Bankoski, "Adynamic motion vector referencing scheme for video coding," 2016 IEEE International Conference on Image Processing (ICIP), 2016, pp. 2032-2036, doi: 10.1109/ICIP.2016.7532715.*

(Continued)

*Primary Examiner* — Mohammed S Rahaman
(74) *Attorney, Agent, or Firm* — Perkins Coie LLP

(57) ABSTRACT

A video coding or decoding method includes using history-based motion vector prediction (HMVP) for conversion between multiple video blocks including a current block of video and a bitstream representation of the multiple video blocks such that for a uni-predicted block that for which a single reference picture is used for motion compensation, refraining from updating a look-up table for HMVP candidates for the uni-predicted block. The video coding or decoding method further includes performing the conversion using look-up tables for the multiple video blocks.

20 Claims, 48 Drawing Sheets

(51) Int. Cl.
   *H04N 19/52*   (2014.01)
   *H04N 19/577*  (2014.01)
   *H04N 19/109*  (2014.01)
   *H04N 19/159*  (2014.01)
   *H04N 19/513*  (2014.01)

(52) U.S. Cl.
   CPC ......... *H04N 19/176* (2014.11); *H04N 19/513* (2014.11); *H04N 19/52* (2014.11); *H04N 19/577* (2014.11)

(56) References Cited

U.S. PATENT DOCUMENTS

| | | |
|---|---|---|
| 8,462,846 B2 | 6/2013 | Zhang |
| 9,294,777 B2 | 3/2016 | Wang |
| 9,374,595 B2 | 6/2016 | Kim et al. |
| 9,432,684 B2 | 8/2016 | Lee et al. |
| 9,521,425 B2 | 12/2016 | Chen et al. |
| 9,615,089 B2 | 4/2017 | Fartukov et al. |
| 9,667,996 B2 | 5/2017 | Chen et al. |
| 9,674,542 B2 | 6/2017 | Chen et al. |
| 9,762,927 B2 | 9/2017 | Chen et al. |
| 9,900,593 B2 | 2/2018 | Xiu et al. |
| 9,948,930 B2 | 4/2018 | Panusopone et al. |
| 9,955,186 B2 | 4/2018 | Chon et al. |
| 10,045,014 B2 | 8/2018 | Zhang et al. |
| 10,142,655 B2 | 11/2018 | Lin et al. |
| 10,298,950 B2 | 5/2019 | Wang et al. |
| 10,362,330 B1 | 7/2019 | Li et al. |
| 10,404,990 B2 | 9/2019 | Hendry et al. |
| 10,419,763 B2 | 9/2019 | Huang et al. |
| 10,440,378 B1 * | 10/2019 | Xu ................. H04N 19/423 |
| 10,448,010 B2 | 10/2019 | Chen et al. |
| 10,484,686 B2 | 11/2019 | Xiu et al. |
| 10,491,902 B1 * | 11/2019 | Xu ................. H04N 19/573 |
| 10,523,964 B2 | 12/2019 | Chuang et al. |
| 10,560,712 B2 | 2/2020 | Zou et al. |
| 10,701,366 B2 | 6/2020 | Chen et al. |
| 10,708,592 B2 | 7/2020 | Dong et al. |
| 10,757,417 B2 | 8/2020 | Zhang et al. |
| 10,778,999 B2 | 9/2020 | Li et al. |
| 10,779,002 B2 | 9/2020 | Chen et al. |
| 10,785,494 B2 | 9/2020 | Chien et al. |
| 10,805,630 B2 | 10/2020 | Li et al. |
| 10,841,609 B1 | 11/2020 | Liu et al. |
| 10,904,565 B2 | 1/2021 | Chuang et al. |
| 11,172,196 B2 | 11/2021 | Zhang et al. |
| 11,197,003 B2 | 12/2021 | Zhang et al. |
| 11,197,007 B2 | 12/2021 | Zhang et al. |
| 11,202,065 B2 | 12/2021 | Zhang et al. |
| 11,202,081 B2 | 12/2021 | Zhang et al. |
| 11,477,463 B2 | 10/2022 | Zhang et al. |
| 2007/0192762 A1 | 8/2007 | Eichenberger et al. |
| 2011/0002386 A1 | 1/2011 | Zhang |
| 2011/0194609 A1 | 8/2011 | Rusert et al. |
| 2011/0200107 A1 | 8/2011 | Ryu |
| 2012/0219216 A1 | 8/2012 | Sato |
| 2012/0287999 A1 | 11/2012 | Li et al. |
| 2012/0320984 A1 | 12/2012 | Zhou et al. |
| 2013/0003842 A1 | 1/2013 | Kondo |
| 2013/0101041 A1 | 4/2013 | Fishwick et al. |
| 2013/0107958 A1 | 5/2013 | Shimada et al. |
| 2013/0128976 A1 | 5/2013 | Koyama et al. |
| 2013/0182755 A1 | 7/2013 | Chen et al. |
| 2013/0229485 A1 | 9/2013 | Rusanovskyy et al. |
| 2013/0329007 A1 | 12/2013 | Zhang et al. |
| 2014/0086325 A1 | 3/2014 | Chen et al. |
| 2014/0286408 A1 | 9/2014 | Zhang et al. |
| 2014/0286416 A1 | 9/2014 | Jeon et al. |
| 2014/0294066 A1 | 10/2014 | Kondo |
| 2014/0334551 A1 | 11/2014 | Kim et al. |
| 2015/0023423 A1 | 1/2015 | Zhang et al. |
| 2015/0181216 A1 | 6/2015 | Zhang et al. |
| 2015/0249828 A1 | 9/2015 | Rosewarne et al. |
| 2015/0312588 A1 | 10/2015 | Yamamoto et al. |
| 2015/0373350 A1 | 12/2015 | Hendry et al. |
| 2015/0373357 A1 | 12/2015 | Pang et al. |
| 2015/0373362 A1 | 12/2015 | Pang et al. |
| 2016/0057420 A1 | 2/2016 | Pang et al. |
| 2016/0073132 A1 | 3/2016 | Zhang et al. |
| 2016/0100189 A1 | 4/2016 | Pang et al. |
| 2016/0142729 A1 | 5/2016 | Wang et al. |
| 2016/0366441 A1 | 12/2016 | An et al. |
| 2016/0373756 A1 | 12/2016 | Yu et al. |
| 2017/0054996 A1 | 2/2017 | Xu et al. |
| 2017/0085905 A1 * | 3/2017 | Kadono ............... H04N 19/577 |
| 2017/0142418 A1 | 5/2017 | Li et al. |
| 2017/0223378 A1 | 8/2017 | Tao et al. |
| 2017/0238005 A1 | 8/2017 | Chien et al. |
| 2017/0238011 A1 | 8/2017 | Pettersson et al. |
| 2017/0272748 A1 | 9/2017 | Seregin et al. |
| 2017/0272782 A1 | 9/2017 | Li et al. |
| 2017/0289566 A1 | 10/2017 | He et al. |
| 2017/0310990 A1 | 10/2017 | Hsu |
| 2017/0332095 A1 | 11/2017 | Zou et al. |
| 2017/0332099 A1 | 11/2017 | Lee et al. |
| 2017/0339404 A1 | 11/2017 | Panusopone et al. |
| 2017/0339405 A1 | 11/2017 | Wang et al. |
| 2018/0041762 A1 | 2/2018 | Ikai et al. |
| 2018/0048889 A1 | 2/2018 | Zhang et al. |
| 2018/0054628 A1 | 2/2018 | Pettersson et al. |
| 2018/0063553 A1 | 3/2018 | Zhang et al. |
| 2018/0098062 A1 | 4/2018 | Li et al. |
| 2018/0098087 A1 | 4/2018 | Li et al. |
| 2018/0124394 A1 | 5/2018 | Xu et al. |
| 2018/0131952 A1 | 5/2018 | Xiu et al. |
| 2018/0184117 A1 | 6/2018 | Chen et al. |
| 2018/0192069 A1 | 7/2018 | Chen et al. |
| 2018/0192072 A1 | 7/2018 | Chen et al. |
| 2018/0199056 A1 | 7/2018 | Sato |
| 2018/0247396 A1 | 8/2018 | Pouli et al. |
| 2018/0249172 A1 | 8/2018 | Chen et al. |
| 2018/0270500 A1 | 9/2018 | Li et al. |
| 2018/0278951 A1 | 9/2018 | Seregin et al. |
| 2018/0288425 A1 | 10/2018 | Panusopone et al. |
| 2018/0288441 A1 | 10/2018 | Zhang et al. |
| 2018/0324454 A1 | 11/2018 | Lin et al. |
| 2018/0332298 A1 | 11/2018 | Liu et al. |
| 2018/0376166 A1 | 12/2018 | Chuang et al. |
| 2019/0020895 A1 | 1/2019 | Liu et al. |
| 2019/0037231 A1 | 1/2019 | Ikai et al. |
| 2019/0052886 A1 | 2/2019 | Chiang et al. |
| 2019/0058897 A1 | 2/2019 | Han et al. |
| 2019/0068977 A1 | 2/2019 | Zhang et al. |
| 2019/0075293 A1 | 3/2019 | Lim et al. |
| 2019/0104303 A1 | 4/2019 | Xiu et al. |
| 2019/0124332 A1 | 4/2019 | Lim et al. |
| 2019/0158866 A1 | 5/2019 | Kim |
| 2019/0182504 A1 | 6/2019 | Lainema |
| 2019/0191171 A1 | 6/2019 | Ikai et al. |
| 2019/0222859 A1 | 7/2019 | Chuang et al. |
| 2019/0246128 A1 | 8/2019 | Xu et al. |
| 2019/0246143 A1 | 8/2019 | Zhang et al. |
| 2019/0273943 A1 | 9/2019 | Zhao et al. |
| 2019/0306502 A1 | 10/2019 | Gadde et al. |
| 2019/0320181 A1 | 10/2019 | Chen et al. |
| 2019/0335170 A1 | 10/2019 | Lee et al. |
| 2019/0342547 A1 | 11/2019 | Lee et al. |
| 2019/0364295 A1 | 11/2019 | Li et al. |
| 2019/0373261 A1 | 12/2019 | Eglimez et al. |
| 2019/0387250 A1 | 12/2019 | Boyce et al. |
| 2020/0021837 A1 | 1/2020 | Ikai et al. |
| 2020/0021839 A1 * | 1/2020 | Pham Van ........... H04N 19/521 |
| 2020/0045310 A1 | 2/2020 | Chen et al. |
| 2020/0045311 A1 | 2/2020 | Yoo |
| 2020/0053364 A1 | 2/2020 | Seo |
| 2020/0059658 A1 * | 2/2020 | Chien ................. H04N 19/176 |
| 2020/0084441 A1 | 3/2020 | Lee et al. |
| 2020/0084454 A1 | 3/2020 | Liu et al. |
| 2020/0099951 A1 | 3/2020 | Hung et al. |
| 2020/0112741 A1 | 4/2020 | Han et al. |
| 2020/0120334 A1 | 4/2020 | Xu et al. |
| 2020/0128237 A1 | 4/2020 | Xu et al. |
| 2020/0128258 A1 | 4/2020 | Chen et al. |

(56) References Cited

U.S. PATENT DOCUMENTS

| | | | |
|---|---|---|---|
| 2020/0137398 | A1 | 4/2020 | Zhao et al. |
| 2020/0145688 | A1 | 5/2020 | Zou et al. |
| 2020/0154127 | A1 | 5/2020 | Lee |
| 2020/0169726 | A1 | 5/2020 | Kim et al. |
| 2020/0213594 | A1 | 7/2020 | Liu et al. |
| 2020/0213612 | A1 | 7/2020 | Liu et al. |
| 2020/0213622 | A1 | 7/2020 | Xu et al. |
| 2020/0221077 | A1 | 7/2020 | Park et al. |
| 2020/0221110 | A1 | 7/2020 | Chien et al. |
| 2020/0221120 | A1 | 7/2020 | Robert et al. |
| 2020/0267408 | A1 | 8/2020 | Lee et al. |
| 2020/0275120 | A1 | 8/2020 | Lin et al. |
| 2020/0296380 | A1 | 9/2020 | Aono et al. |
| 2020/0296382 | A1 | 9/2020 | Zhao et al. |
| 2020/0296415 | A1 | 9/2020 | Chen et al. |
| 2020/0336738 | A1 | 10/2020 | Xiu et al. |
| 2020/0351505 | A1 | 11/2020 | Seo |
| 2020/0359029 | A1 | 11/2020 | Liu et al. |
| 2020/0374543 | A1 | 11/2020 | Liu et al. |
| 2020/0374544 | A1 | 11/2020 | Liu et al. |
| 2020/0382771 | A1 | 12/2020 | Liu et al. |
| 2020/0382795 | A1 | 12/2020 | Zhang et al. |
| 2020/0382807 | A1 | 12/2020 | Liu et al. |
| 2020/0396453 | A1 | 12/2020 | Zhang et al. |
| 2020/0396462 | A1 | 12/2020 | Zhang et al. |
| 2020/0396465 | A1 | 12/2020 | Zhang et al. |
| 2020/0404255 | A1 | 12/2020 | Zhang et al. |
| 2020/0404260 | A1 | 12/2020 | Zhang et al. |
| 2020/0413048 | A1 | 12/2020 | Zhang et al. |
| 2021/0006780 | A1 | 1/2021 | Zhang et al. |
| 2021/0006787 | A1 | 1/2021 | Zhang et al. |
| 2021/0029356 | A1 | 1/2021 | Zhang et al. |
| 2021/0029362 | A1 | 1/2021 | Liu et al. |
| 2021/0029368 | A1 | 1/2021 | Zhang et al. |
| 2021/0037240 | A1 | 2/2021 | Zhang et al. |
| 2021/0037256 | A1 | 2/2021 | Zhang et al. |
| 2021/0051339 | A1 | 2/2021 | Liu et al. |
| 2021/0067783 | A1 | 3/2021 | Liu et al. |
| 2021/0076050 | A1 | 3/2021 | Zhang et al. |
| 2021/0076063 | A1 | 3/2021 | Liu et al. |
| 2021/0092379 | A1 | 3/2021 | Zhang et al. |
| 2021/0092435 | A1 | 3/2021 | Liu et al. |
| 2021/0105482 | A1 | 4/2021 | Zhang et al. |
| 2021/0152846 | A1 | 5/2021 | Zhang et al. |
| 2021/0203958 | A1 | 7/2021 | Zhang et al. |
| 2021/0227234 | A1 | 7/2021 | Zhang et al. |
| 2021/0352302 | A1 | 11/2021 | Zhang et al. |
| 2021/0392341 | A1 | 12/2021 | Zhang et al. |
| 2022/0070489 | A1 | 3/2022 | Zhang et al. |
| 2022/0078452 | A1 | 3/2022 | Zhang et al. |
| 2022/0217363 | A1 | 7/2022 | Zhang et al. |
| 2022/0264125 | A1 | 8/2022 | Zhang et al. |

FOREIGN PATENT DOCUMENTS

| | | | |
|---|---|---|---|
| CN | 1672174 | A | 9/2005 |
| CN | 1710959 | A | 12/2005 |
| CN | 1777283 | A | 5/2006 |
| CN | 101605255 | A | 12/2009 |
| CN | 101895751 | A | 11/2010 |
| CN | 102577388 | A | 7/2012 |
| CN | 103561263 | A | 2/2014 |
| CN | 104053005 | A | 9/2014 |
| CN | 104170381 | A | 11/2014 |
| CN | 104221376 | A | 12/2014 |
| CN | 104904207 | A | 9/2015 |
| CN | 105306944 | A | 2/2016 |
| CN | 105532000 | A | 4/2016 |
| CN | 105678808 | A | 6/2016 |
| CN | 105723713 | A | 6/2016 |
| CN | 105917650 | A | 8/2016 |
| CN | 106303543 | A1 | 1/2017 |
| CN | 106416245 | A | 2/2017 |
| CN | 106537915 | A | 3/2017 |
| CN | 106559669 | A | 4/2017 |
| CN | 106688232 | A | 5/2017 |
| CN | 107079161 | A | 8/2017 |
| CN | 107113424 | A1 | 8/2017 |
| CN | 107113442 | A | 8/2017 |
| CN | 107211156 | A | 9/2017 |
| CN | 107409225 | A | 11/2017 |
| CN | 107426568 | A | 12/2017 |
| CN | 107534778 | A | 1/2018 |
| CN | 107615765 | A | 1/2018 |
| CN | 107852490 | A | 3/2018 |
| CN | 107925775 | A | 4/2018 |
| CN | 107979756 | A | 5/2018 |
| CN | 108012153 | A | 5/2018 |
| CN | 108028929 | A | 5/2018 |
| CN | 108432250 | A | 8/2018 |
| CN | 108632629 | A | 10/2018 |
| CN | 112020829 | A | 12/2020 |
| EP | 3788782 | A1 | 3/2021 |
| GB | 2539213 | A | 12/2016 |
| JP | H08186825 | A | 7/1996 |
| JP | 2007272733 | A | 10/2007 |
| JP | 2011077761 | A | 4/2011 |
| JP | 2013098745 | A | 5/2013 |
| JP | 2021513818 | A | 5/2021 |
| KR | 20200128154 | A | 11/2020 |
| TW | 201540047 | A | 10/2015 |
| TW | 201709738 | A | 3/2017 |
| TW | 201832557 | A | 9/2018 |
| WO | 2000065829 | A1 | 11/2000 |
| WO | 2009080133 | A1 | 7/2009 |
| WO | 2013168407 | A1 | 11/2013 |
| WO | 2016048834 | A1 | 3/2016 |
| WO | 2016057701 | A1 | 4/2016 |
| WO | 2016091161 | A1 | 6/2016 |
| WO | 2016138513 | A1 | 9/2016 |
| WO | 2016183224 | A1 | 11/2016 |
| WO | 2017130696 | A1 | 3/2017 |
| WO | 2017118411 | A1 | 7/2017 |
| WO | 2017133661 | A1 | 8/2017 |
| WO | 2017157264 | A1 | 9/2017 |
| WO | 2017157281 | A1 | 9/2017 |
| WO | 2017165391 | A1 | 9/2017 |
| WO | 2017188509 | A1 | 11/2017 |
| WO | 2017195554 | A1 | 11/2017 |
| WO | 2017197126 | A1 | 11/2017 |
| WO | 2017197146 | A1 | 11/2017 |
| WO | 2017206803 | A1 | 12/2017 |
| WO | 2018047668 | A1 | 3/2018 |
| WO | 2018066241 | A1 | 4/2018 |
| WO | 2018067823 | A1 | 4/2018 |
| WO | 2018097692 | A2 | 5/2018 |
| WO | 2018097693 | A3 | 7/2018 |
| WO | 2018184589 | A1 | 10/2018 |
| WO | 2020086331 | A1 | 4/2020 |

OTHER PUBLICATIONS

Huang, Wanzhang, "Research on Side Information Generation of Distributed Video Coding," South China University of Technology, Guangzhou, China, 2012.

Jang et al. "Non-CE8: Modification on SbTMVP Process Regarding with CPR," Joint Video Experts Team (JVET) of ITU-T SG 16 WP3 and ISO/IEC JTC 1/SC 29/WG 11, 13th Meeting, Marrakech, MA, Jan. 9-18, 2019, document JVET-M0335, 2019.

Lai et al. "CE8-Related: Clarification on Interaction Between CPR and other Inter Coding Tools," Joint Video Experts feram (JVET) of ITU-T SG 16 WP 3 and ISO/IEC JTC 1/SC 29/WG 11, 13th Meeting, Marrakech, MA, Jan. 9-18, 2019, document JVET-M0175, 2019.

Solovyev et al. "Non-CE4: Merge Mode Modification," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0056, 2018.

Xu et al. "Non-CE8: Mismatch Between Text Specification and Reference Software on ATMVP Candidate Derivation When CPR is Enabled," Joint Video Experts Team (JVET) of ITU-T SG 16 WP

(56) References Cited

OTHER PUBLICATIONS 3 and ISO/IEC JTC 29/WG 11, 13th Meeting, Marrakech, MA, Jan. 9-18, 2019, document JVET-M0409, 2019.
Yang et al. "BoG Report on CE4 Related Contributions," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0546, 2018.
Zhao et al. "Intra Mini-Block Copy Algorithm for Screen Content Coding," Journal of Computer Applications, 2016, 36 (7): 1938-1943.
Zuo et al. "Intra Block Copy for Intra-Frame Coding," Joint Video Experts Team (JVET) of ITU-T SG 16 WP 3 and ISO/IEC JTC 1/SC 29/WG 11 10th Meeting: San Diego, US, Apr. 10-20, 2018, document JVET-J0042, 2018.
International Search Report and Written Opinion from PCT/CN2019/117116 dated Jan. 2, 2020 (9 pages).
International Search Report and Written Opinion from PCT/CN2019/117118 dated Feb. 5, 2020 (9 pages).
International Search Report and Written Opinion from PCT/CN2019/117119 dated Jan. 23, 2020 (9 pages).
International Search Report and Written Opinion from PCT/IB2019/055244 dated Nov. 18, 2019 (18 pages).
International Search Report and Written Opinion from PCT/IB2019/055246 dated Nov. 7, 2019 (18 pages).
International Search Report and Written Opinion from PCT/IB2019/055247 dated Nov. 7, 2019 (21 pages).
International Search Report and Written Opinion from PCT/IB2019/058078 dated Mar. 3, 2020(20 pages).
International Search Report and Written Opinion from PCT/IB2019/058079 dated Mar. 3, 2020(26 pages).
International Search Report and Written Opinion from PCT/IB2019/058081 dated Mar. 25, 2020(21 pages).
Non-Final Office Action from U.S. Appl. No. 17/019,629 dated Nov. 13, 2020.
Non-Final Office Action from U.S. Appl. No. 17/011,157 dated Nov. 17, 2020.
Non-Final Office Action from U.S. Appl. No. 17/031,451 dated Dec. 4, 2020.
Non-Final Office Action from U.S. Appl. No. 17/071,357 dated Dec. 8, 2020.
Notice of Allowance from U.S. Appl. No. 17/011,131 dated Dec. 10, 2020.
Non-Final Office Action from U.S. Appl. No. 17/074,842 dated Dec. 23, 2020.
Non-Final Office Action from U.S. Appl. No. 17/074,892 dated Dec. 24, 2020.
Non-Final Office Action from U.S. Appl. No. 17/099,042 dated Dec. 31, 2020.
Non-Final Office Action from U.S. Appl. No. 17/005,521 dated Jan. 7, 2021.
Notice of Allowance from U.S. Appl. No. 17/071,412 dated Jan. 7, 2021.
Final Office Action from U.S. Appl. No. 17/019,629 dated Feb. 26, 2021.
Non-Final Office Action from U.S. Appl. No. 17/161,391 dated Mar. 25, 2021.
Final Office Action from U.S. Appl. No. 17/005,521 dated Apr. 26, 2021.
Bross et al. "Versatlie Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.
Li et al. "Affine Deformation Model Based Intra Block Copy for Intra Frame Coding," 2020, Institute of Information and Communication Engineering, Zhejiang University.
Van Der Auwera et al. "Description of Core Experiment 3: Intra Prediction and Mode Coding," Joint Video Experts Team (JVET) of ITU-T SG 16 WP 3 and ISO/IEC JTC 1/SC 29/WG 11, 10th Meeting, San Diego, USA, Apr. 10-20, 2018. document JVET-J1023,2018.

Alshin et al. "Bi-Directional Optical Flow for Improving Motion Compensation," 28th Picture Coding Symposium, PCS2010, Dec. 8, 2010, Nagoya, Japan, pp. 422-425.
Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.
Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1001, 2019.
Chen et al. "EE3: Generalized Bi-Prediction," Joint Video Exploration Team (JVET) of ITU-T SG 16 WP 3 and ISO/IEC JTC 1/SC 29/WG 11, 4th Meeting, Chengdu, CN, Oct. 15-21, 2016, document JVET-D0102, 2016.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting, Torino, IT, Jul. 13-21, 2017, document JVET-G1001, 2017.
Chen et al. "Description of SDR, HDR and 360 degree Video Coding Technology Proposal by Qualcomm and Technicolor—low and high complexity versions," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0021, 2018.
Chen et al. "Description of SDR, HDR and 360 degree Video Coding Technology Proposal by Huawei, GoPro, HiSilicon, and Samsung," Joint Video Exploration Team (JVET) of ITU-T SG 16 WP 3 and ISO/IEC JTC 1/SC 29/WG 11, 10th Meeting, San Diego, US, 10-20, Apr. 2018, document JVET-J0025, 2018.
Chen et al. "DMVR Extension baed on Template Matching," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0057, 2018.
Chien et al. "Modification of Merge Candidate Derivation," Joint Video Exploration Team (JVET) of ITU-T SG 16 WP 3 and ISO/IEC JTC 1/SC 29/WG 11, 2nd Meeting, San Diego, USA, Feb. 20-26, 2016, document JVET-B0058, 2016.
JEM-7.0: https://jvet.hhi.fraunhofer.de/svn/svn_HMJEMSoftware/tags/ HM-16.6-JEM-7.0. (only website).
Han et al. "CE4-Related: Modification on Merge List," Joint Video Exploration Team (JVET) of ITU-T SG 16 WP 3 and ISO/IEC JTC 1/SC 29/WG 11, 13th Meeting, Marrakech, MA, Jan. 9-18, 2019, document JVET-M0127, 2019.
He et al. "Non-SCCE1: Improved Intra Block Copy Coding with Block Vector Derivation," Joint Collaborative Team on Video Coding (JCT-VC) of ITU-T SG 16 WP 3 and ISO/IEC JTC 1/SC 29/WG 11, 18th Meeting, Sapporo, JP, Jun. 30-Jul. 9, 2017, document JCTVC-R0165, 2014.
"High Efficiency Video Coding" Series H: Audiovisual and Multimedia Systems: Infrastructure of Audiovisual Services—Coding of Moving Video, ITU-T, H.265, 2018.
Hsiao et al. "CE4.2.8: Merge Mode Enhancement," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K0245, 2018.
Hsiao et al. "CE4.4.12: Pairwise Average Candidates," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0090, 2019.
Hsu et al. "Description of SDR Video Coding Technology Proposal by MediaTek," Joint Video Experts Team (JVET) of ITU-T SG 16 WP 3 and Iso/IEC JTC 1/SC 29/WG 11, 10th Meeting, San Diego, US, Apr. 10-20, 2018, document JVET-J0018, 2018.
H.265/HEVC, https://www.itu.int/rec/T-REC-H.265.
Lee et al. "Unified Condition for Affine Merge and Affine Inter Mode," Joint Video Exploration Team (JVET) of ITU-T SG 16 WP 3 and ISO/IEC JTC 1/SC 29/WG 11, 5th Meeting, Geneva, CH, Jan. 12-20, 2017, JVET-E0039, 2017.
Liao et al. "CE10.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124. 2018.

(56) References Cited

OTHER PUBLICATIONS

Li et al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117rl, 2016.
Li et al. "Non-CE4: Harmonization between HMVP and Gbi," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0264, 2019.
Li et al. "Adaptive Motion Vector Resolution for Screen Content," Joint Collaborative Team on Video Coding (JCT-VC) of ITU-T SG 16 WP 3 and ISO/IEC JTC 1/SC 29/WG 11, 19th Meeting, Strasbourg, FR, Oct. 17-24, 2014, document JCTVC-S0085, 2014.
Li et al. "Combining Directional Intra Prediction and Intra Block Copy with Block Partitioning for HEVC," 2016 IEEE International Conference on Image Processing (ICIP), Phoenix, AZ, USA, 2016, pp. 524-528.
Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.
Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 11-18, 2018, document No. JVET-K0248, 2018.
Sullivan et al. "Overview of the High Efficiency Video Coding (HEVC) Standard," IEEE Transactions on Circuits and Systems for Video Technology, Dec. 2012, 22(12):1649-1668.
Sullivan et al. "Meeting Report of the 18th Meeting of the Joint Collaborative Team on Video Coding (JCT-VC), Sapporo, JP, Jun. 30-Jul. 9, 2014", Joint Collaborative Team on Video Coding (JCT-VC) of ITU-T SG16 WP3 and ISO/IEC JTC1/SC29/WG11, 18th Meeting: Sapporo, JP, Jun. 30-Jul. 9, 2014, JCTVC-R_Notes_d, 2014.
Toma et al. "Description of SDR Video Coding Technology Proposal by Panasonic," Joint Video Experts Team (JVET) of ITU-T SG 16 WP 3 and ISO/IEC JTC 1/SC 29/WG 11, 10th Meetingmm San Diego, US, Apr. 10-20, 2018, document JVET-J0020, 2018.
Xu et al. "Intra Block Copy in HEVC Screen Content Coding Extensions," IEEE Journal on Emerging and Selected Fopics in Circuits and Systems, Dec. 2016, 6(4):409-419.
Xu et al. "CE8-Related Combination Test of JVET-N0176/JVET-N0317/JVET-N0382 on Simplification of IBC Vector Prediction," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0843, 2019.
Yang et al. "Description of Core Experiment 4 (CE4): Inter Prediction and Motion Vector Coding," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1024, 2018.
Zhang et al. "Rotate Intra Block Copy for Still Image Coding," 2015 IEEE International Conference on Image Processing (ICIP), IEEE, Sep. 27, 2015, pp. 4102-4106.
Zhang et al. "CE4-Related: Simplified Affine Prediction," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0103. 2018.
Zhang et al. "CE4-related: History-based Motion Vector Prediction", Joint Video Experts Team (JVET) of ITU-T SG 16 WP 3 and ISO/IEC JTC 1/SC 29/WG 11, 11th Meeting, Ljubljana, SI, 10-18 (Jul. 2018), Document JVET-K0104, 2018.
Zhang et al. "CE4.2.14: Planar Motion Vector Prediction," Joint Video Experts Team (JVET) of ITU-T SG 16 and WP 3 and ISO/IEC JTC 1/SC 29/WG 11, 11th Meeting: Ljubljaba, SI, Jul. 10-18, 2018, document JVET-K0135, 2018.
Zhang et al. "CE4: Affine Prediction with 4x4 Sub-blocks for Chroma Components (Test 4.1.16)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0265, 2018.
Zhang et al. "CE3-Related: Modified Chroma Derived Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0272, 2018.
Zhang et al. "Adaptive Motion Vector Resolution Rounding Align," Joint Video Experts Team (JVET) of ITU-T SG 16 WP 3 and ISO/IEC JTC 1/SC 2/WG 11, 12th Meeting, Macao, CN, Oct. 3-12, 2018, document JVET-L0377, 2018.
Zhang et al. "BoG Report on CE4 Related Contributions," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0843, 2019.
Zhang et al. "On Adaptive Motion Vector Resolution," Joint Collaborative Team on Video Coding (JCT-VC) of ITU-T SG 16 WP 3 and ISO/IEC JTC 1/SC 29/WG 11, 20th Meeting, Geneva, CH, Feb. 10-18, 2015, document JCTVC-T0059, 2015.
Zou et al. "Improved Affine Motion Prediction," Joint Video Exploration Team (JVET) of ITU-T SG 16 WP3 and ISO/IEC JTC 1/SC 29/WG 11, 3rd Meeting, Geneva, CH, May 26-Jun. 1, 2016, document JVET-C0062, 2016.
Zhou et al. "Spatial-Temporal Merge Mode (Non Subblock STMVP)," Joint Video Exploration Team (JVET) of ITU-T SG 16 WP 3 and ISO/IEC JTC 1/SC 29/WG 11, 11th Meeting: Ljubljana, SI, Jul. 10-18, 2018, document JVET-K0532, and JVET-K0161, 2018.
International Search Report and Written Opinion from PCT/IB2019/054602 dated Aug. 21, 2019 (17 pages).
International Search Report and Written Opinion from PCT/IB2019/054604 dated Sep. 26, 2019 (17 pages).
International Search Report and Written Opinion from PCT/IB2019/054611 dated Aug. 29, 2019 (88 pages).
International Search Report and Written Opinion from PCT/IB2019/054612 dated Sep. 26, 2019 (17 pages).
International Search Report and Written Opinion from PCT/IB2019/054614 dated Aug. 27, 2019 (14 pages).
International Search Report and Written Opinion from PCT/IB2019/054650 dated Oct. 28, 2019 (20 pages).
International Search Report and Written Opinion from PCT/IB2019/054652 dated Sep. 27, 2019 (18 pages).
International Search Report and Written Opinion from PCT/IB2019/054654 dated Aug. 27, 2019 (85 pages).
Advisory Action from U.S. Appl. No. 17/074,892 dated Aug. 4, 2021.
Non-Final Office Action from U.S. Appl. No. 17/071,357 dated Sep. 21, 2021.
Non Final Office Action from U.S. Appl. No. 17/019,629 dated Jun. 8, 2022.
Final Office Action from U.S. Appl. No. 17/031,451 dated Dec. 21, 2021.
Notice of Allowance n from U.S. Appl. No. 17/071,357 dated Feb. 2, 2022.
Office Action from Indian Patent Application No. 202127002718 dated Jan. 6, 2022.
Bross et al. "Versatile Video Coding (Draft 3)," Joint Video Experts Team (JVET) of ITU-T SG 16 WP 3 and ISO/IEC JTC 1/SC 29/WG 11 12th Meeting, Macao, CN, Oct. 3-12, 2018. document JVET-L1001, 2018. (cited in EP19882864.2 EESR mailed Mar. 21, 2022).
Zhang et al. "AHG16: Clean-up on MV Rounding," Joint Video Experts Team (JVET) of ITU-T SG 16 WP 3 and ISO/IEC JTC 1/SC 29/WG 11,13th Meeting, Marrakech, MA Jan. 9-18, 2019, document JVET-M0265, 2019. (cited in EP19882864.2 EESR mailed Mar. 21, 2022).
Extended European Search Report from European Patent Application No. 19882864.2 dated Mar. 21, 2022 (9 pages).
Final Office Action from U.S. Appl. No. 17/161,391 dated Jul. 14, 2021.
Koyama et al. "Modification of Derivation Process of Motion Vector Information for Interlace Format," Joint Collaborative Team on Video Coding (JCT-VC) of ITU-T SG16 WP3 and ISO/IEC

(56) References Cited

OTHER PUBLICATIONS

JTC1/SC29/WG11 7th Meeting: Geneva, CH, Nov. 21-30, 2011, document JCTVC-G196, 2011. (cited in JP2021-524354 OA dated Aug. 2, 2022).
Shimada et al. "Non-CE9/Non-CE13: Averaged Merge Candidate," Joint Collaborative Team on Video Coding (JCT-VC)of ITU-T SG16 WP3 and ISO/IEC JTC1/SC29/WG11 7th Meeting: Geneva, CH, Nov. 21-30, 2011, document JCTVC-G195, 2011. (cited in JP2021-524354 OA dated Aug. 2, 2022).
Non Final Office Action from U.S. Appl. No. 17/529,607 dated Oct. 31, 2022.
Intention to Grant from British Patent Application No. 2018867.8 dated Nov. 11, 2022 (2 pages).
Examination Report from Indian Patent Application No. 202228045435 dated Dec. 26, 2022.

\* cited by examiner

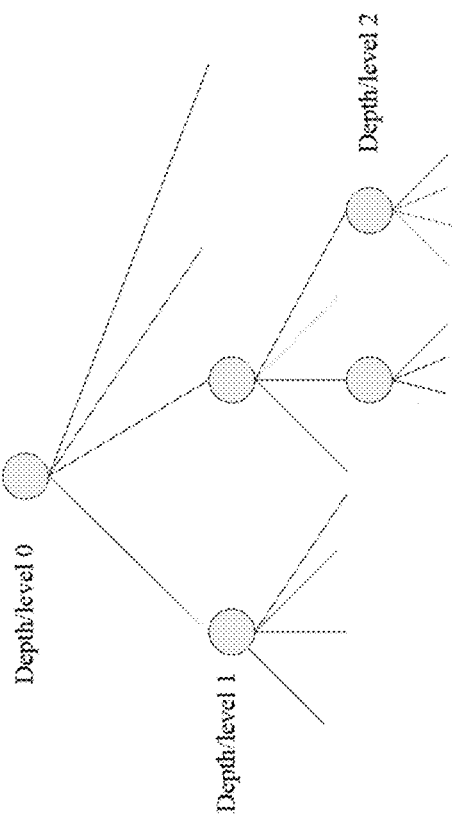
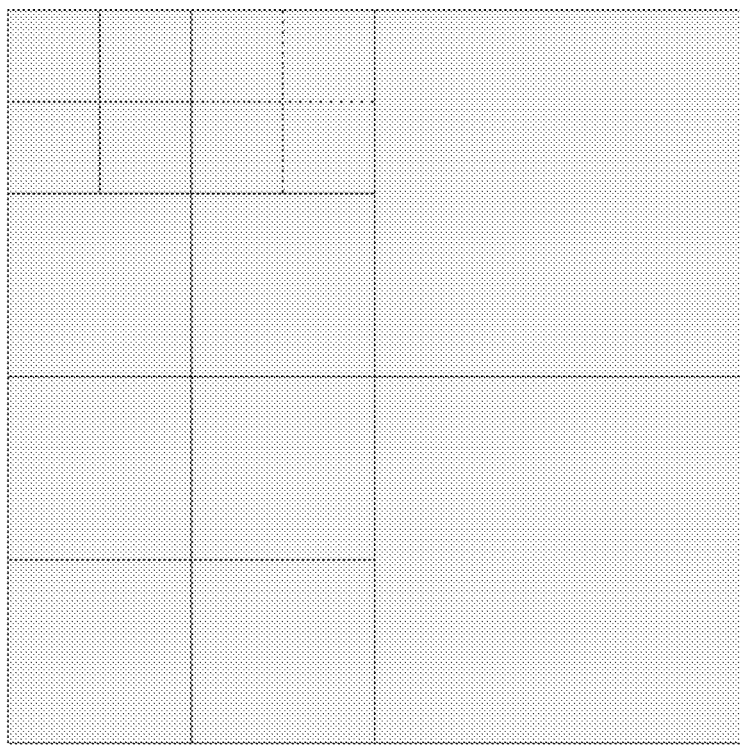
FIG. 4

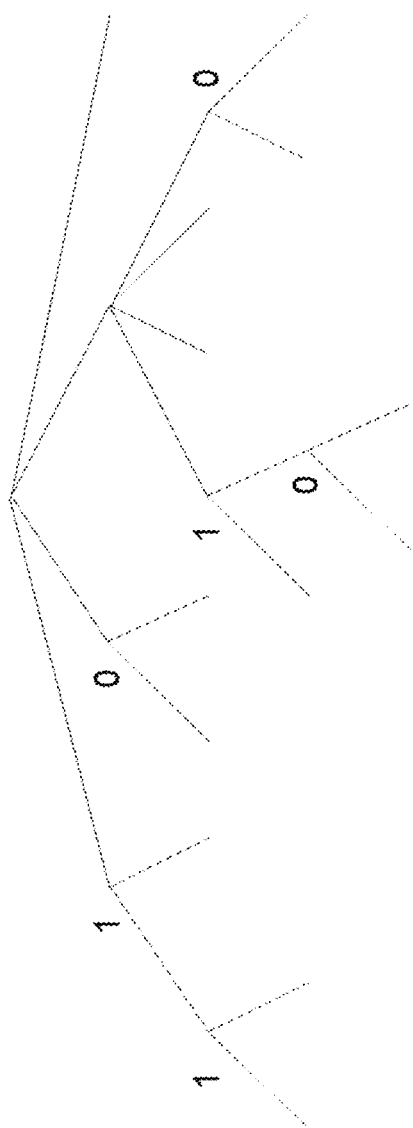
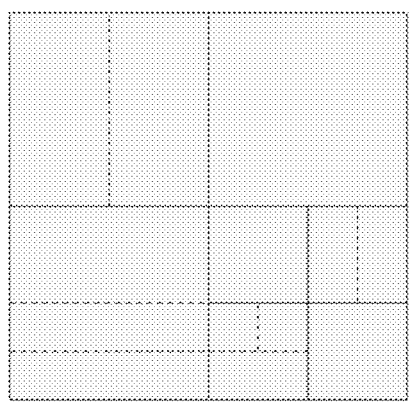
FIG. 5B
FIG. 5A

Original Merge candidate list

| Merge_idx | L0 | L1 |
|---|---|---|
| 0 | mvL0_A,ref0 | - |
| 1 | - | mvL1_B,ref0 |
| 2 | | |
| 3 | | |
| 4 | | |

FIG. 15A

Merge candidate list after adding combined candidates

| Merge_idx | L0 | L1 |
|---|---|---|
| 0 | mvL0_A,ref0 | combine |
| 1 | | mvL1_B,ref0 |
| 2 | mvL0_A,ref0 | mvL1_B,ref0 |
| 3 | | |
| 4 | | |

FIG. 15B

SIMPLIFIED HISTORY BASED MOTION VECTOR PREDICTION

CROSS REFERENCE TO RELATED APPLICATIONS

This application is a continuation of International Application No. PCT/IB2019/058078, filed on Sep. 24, 2019, which claims the priority to and benefit of International Patent Application No. PCT/CN2018/107178, filed on Sep. 24, 2018. The entire disclosures of all the aforementioned patent applications are incorporated by reference as part of the disclosure of this application.

TECHNICAL FIELD

This patent document relates to video coding and decoding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

This document discloses methods, systems, and devices for encoding and decoding digital video using a merge list of motion vectors.

In one example aspect, a video decoding method is disclosed. The method includes determining, after a conversion between a video block of a video comprising multiple blocks and a bitstream representation of the video, whether a rule of updating of one or more history based motion vector predictor (HMVP) tables is satisfied by a prediction direction used for the conversion; and selectively updating the one or more HMVP tables based on the determining.

In another example aspect, a method of video processing is disclosed. The method includes maintaining one or more tables with history-based motion vector prediction (HMVP) candidates based on motion information associated with blocks of a video, wherein the HMVP candidates are stored using a first precision of motion information lower than a second precision of motion information used by motion candidates not stored in the one or more tables; and performing a conversion between a current block of the video and a coded representation of the current block, wherein the one or more tables are used during the conversion.

In yet another aspect, a method of video processing is disclosed. The method includes maintaining one or more tables with history-based motion vector prediction (HMVP) candidates based on motion information associated with blocks of a video, wherein the HMVP candidates in the one or more tables are stored in accordance with a rule based at least on a condition of reference pictures to which the HMVP candidates refer to; and performing the conversion between a current block of the video and a coded representation of the current block, wherein the one or more tables are used during the conversion.

In yet another aspect, a method of video processing is disclosed. The method includes maintaining one or more tables with history-based motion vector prediction (HMVP) candidates based on motion information associated with blocks of a video; performing the conversion between a current block of the video and a coded representation of the current block; selecting an HMVP candidate from the HMVP candidates in the one or more tables; and updating the one or more tables using a hash-table based pruning applied to the HMVP candidate and a motion information of the current block of the video.

In yet another aspect, a method of video processing is disclosed. The method includes maintaining one or more tables with history-based motion vector prediction (HMVP) candidates based on motion information associated with blocks of a video; performing a conversion between a current block of the video to a coded representation of the current block using a generalized bi-prediction (GBi, also called "Bi-prediction with CU-level weights", a.k.a. BCW) mode, wherein, in the GBi mode, the current block is coded using a bi-prediction step and wherein coding unit (CU)-level weights are assigned to prediction blocks generated from the bi-prediction step; and updating the one or more tables only using reference picture information and motion information of the current block, thereby excluding storing the weights of the current block in the one or more tables.

In yet another example aspect, a method of video processing is disclosed. The method includes maintaining one or more tables with history-based motion vector prediction (HMVP) candidates based on motion information associated with blocks of a video; performing a conversion between a current block of the video and a coded representation of the current block using a generalized bi-prediction (GBi) mode, wherein, in the GBi mode, the current block is coded using a bi-prediction step and wherein coding unit (CU)-level weights are assigned to prediction blocks generated from the bi-prediction step; and updating the one or more tables with at least the weights of the current block.

In yet another example aspect, a method of video processing is disclosed. The method includes maintaining one or more tables with history-based motion vector prediction (HMVP) candidates based on motion information associated with blocks of a video; and performing a conversion between a current block of video and a coded representation of the current block, wherein the one or more tables are used during the conversion, wherein a combined bi-predictive merge candidate is generated by comparing N number of pairs of motion information of the current block, and wherein N is less than 12.

In yet another example aspect, a method of video processing is disclosed. The method includes maintaining one or more tables with history-based motion vector prediction (HMVP) candidates based on motion information associated with blocks of a video; and performing a conversion between a current block of video and a coded representation of the current block, wherein the one or more tables are used during the conversion, wherein a combined bi-predictive merge candidate is generated by comparing multiple pairs of motion information of the current block, and wherein the bi-predictive merge candidate is generated using only a certain type of merge candidates.

In yet another example aspect, a method of video processing is disclosed. The method includes maintaining one or more tables with history-based motion vector prediction (HMVP) candidates based on motion information associated with blocks of a video; generating multiple merge candidates from a HMVP candidate; and performing a conversion between a current block of video and a coded representation of the current block, wherein a generated merge candidate is used during the conversion.

In yet another example aspect, a method of video processing is disclosed. The method includes maintaining one or more tables with history-based motion vector prediction (HMVP) candidates based on motion information associated with blocks of a video; constructing a motion candidate list at least based on the HMVP candidates and spatio-temporal motion vector predictors for the current block; and performing a conversion between a current block of the video and a coded representation of the current block, wherein the motion candidate list is used during the conversion.

In yet another example aspect, a method of video processing is disclosed. The method includes maintaining one or more tables with history-based motion vector prediction (HMVP) candidates based on motion information associated with blocks of a video; constructing a motion candidate list at least based on the HMVP candidates and pairwise-average candidates (PAC) for the current block; and performing a conversion between a current block of the video and a coded representation of the current block, wherein the motion candidate list is used during the conversion.

In yet another example aspect, a method of video processing is disclosed. The method includes maintaining one or more tables with history-based motion vector prediction (HMVP) candidates based on motion information associated with blocks of a video; constructing a motion candidate list at least based on the HMVP candidates and affine motion candidates for the current block; and performing a conversion between a current block of the video and a coded representation of the current block, wherein the motion candidate list is used during the conversion.

In yet another example aspect, a video encoder device that implements a video encoding method described herein is disclosed.

In yet another representative aspect, the various techniques described herein may be embodied as a computer program product stored on a non-transitory computer readable media. The computer program product includes program code for carrying out the methods described herein.

In yet another representative aspect, a video decoder apparatus may implement a method as described herein.

The details of one or more implementations are set forth in the accompanying attachments, the drawings, and the description below. Other features will be apparent from the description and drawings, and from the claims.

BRIEF DESCRIPTION OF THE DRAWINGS

FIG. 4 illustrates an example implementation for subdivision of a CTB into CBs and transform block (TBs). Solid lines indicate CB boundaries and dotted lines indicate TB boundaries, including an example CTB with its partitioning, and a corresponding quadtree.

FIG. 5A illustrates an example of block partitioning by using QTBT.

FIG. 5B illustrates the corresponding tree representation of FIG. 5A.

FIG. 15A shows an original merge candidate list in connection with a combined bi-predictive merge candidate.

FIG. 15B shows an example of a merge candidate list generated from the original list of FIG. 15A.

DETAILED DESCRIPTION

To improve compression ratio of video, researchers are continually looking for new techniques by which to encode video. The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for improving readability and do not limit the scope of techniques and embodiments described in each section only to that section. Furthermore, while certain terms from various existing video codec standards are used, the disclosed technologies are not limited only to these video standards or their successors and are applicable to other video codec standards. Furthermore, in some cases, techniques are disclosed using corresponding coding steps, and it will be understood that, at a decoder, the corresponding decoding steps in reverse order will be performed. In addition, coding may also be used to perform transcoding in which a video is represented from one coded representation (e.g., one bitrate) to another coded representation (e.g., a different bitrate).

1. Introduction

The present document is related to video coding technologies. Specifically, it is related to motion information coding (such as merge mode, AMVP mode) in video coding. It may be applied to the existing video coding standard like HEVC, or the standard (Versatile Video Coding) to be finalized. It may be also applicable to future video coding standards or video codec.

Brief Discussion

Figure 1:
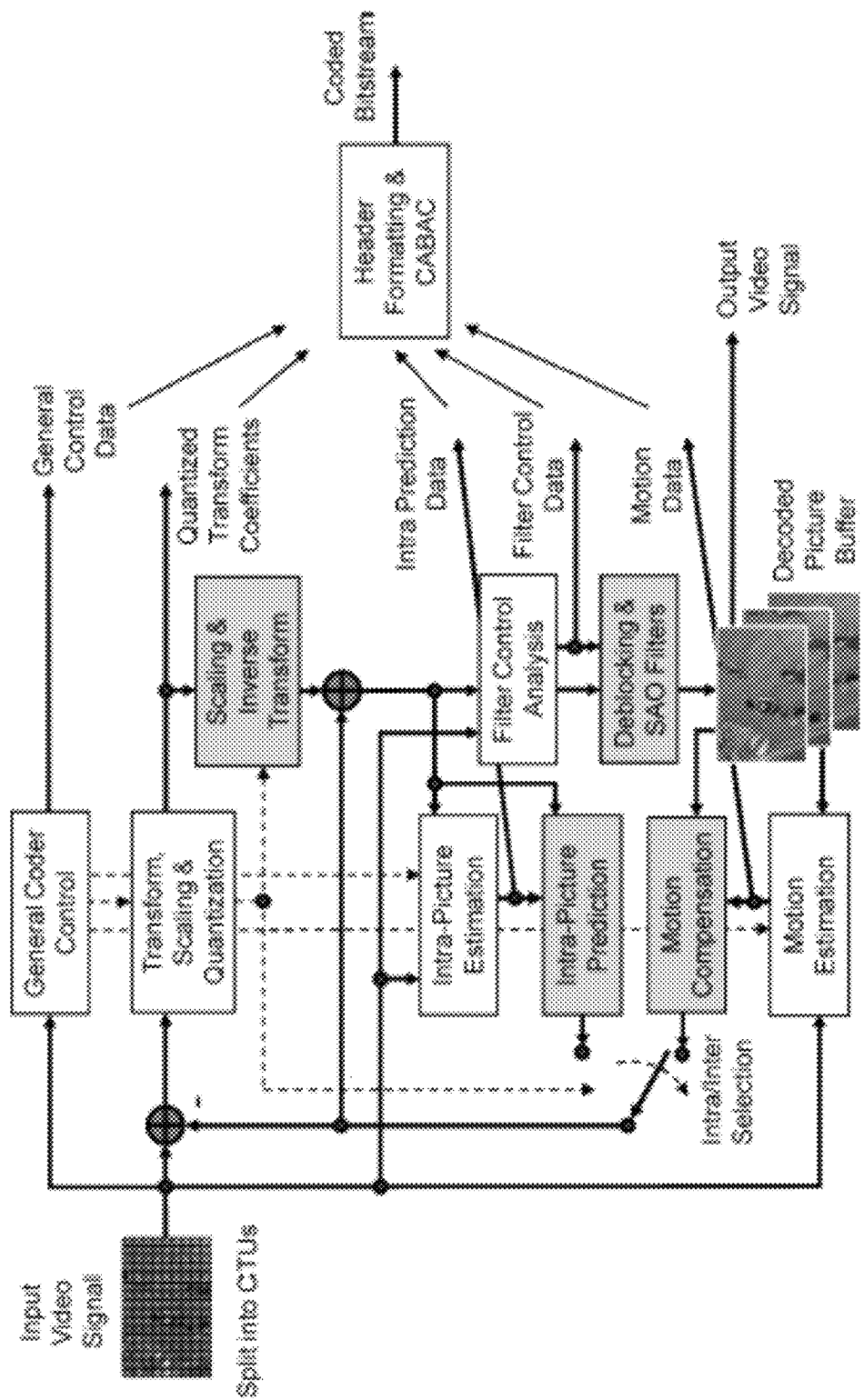
FIG. 1 is a block diagram showing an example of a video encoder implementation

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. An example of a typical HEVC encoder framework is depicted in FIG. 1.

2.1 Partition Structure 2.1.1 Partition Tree Structure in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

Figure 2:
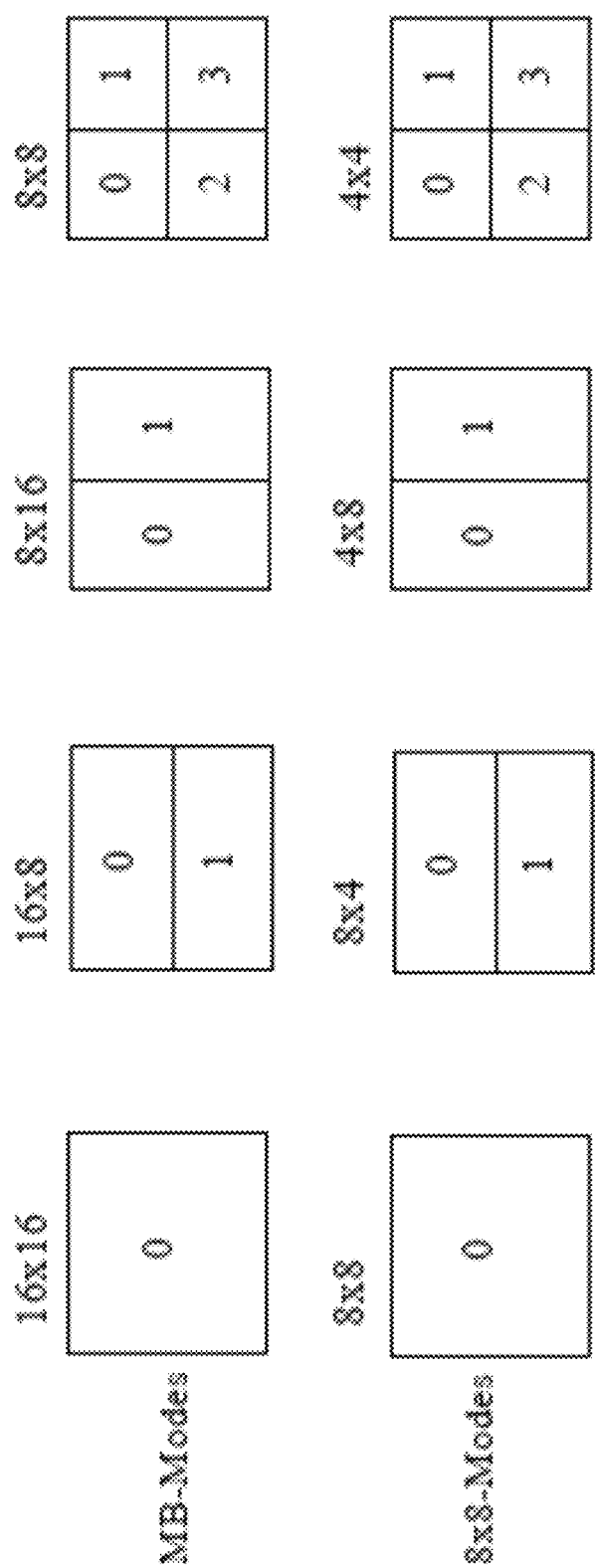
FIG. 2 illustrates macroblock partitioning in the H.264 video coding standard.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4 (see FIG. 2). Only one motion vector (MV) per sub-macroblock partition is allowed.

2.1.2 Partition Tree Structure in HEVC

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

In the following, the various features involved in hybrid video coding using HEVC are highlighted as follows.

1) Coding tree units and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

Figure 3:
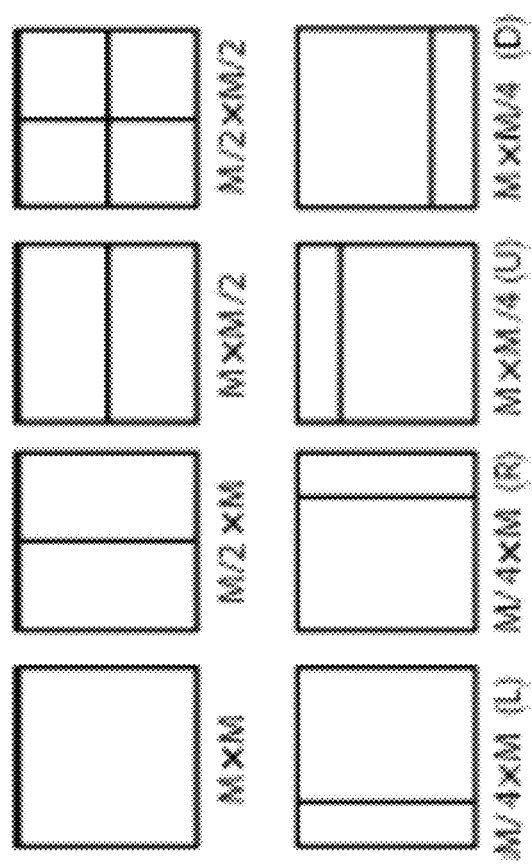
FIG. 3 illustrates an example of splitting coding blocks (CB) into prediction blocks (PU).

3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. FIG. 3 shows examples of allowed PBs for a M×M CU. As shown therein, the modes for splitting a CB into PBs may be subject to certain size constraints. For intrapicture-predicted CBs, only M×M and M/2×M/2 are supported.

4) TUs and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

FIG. 4 shows an example of a subdivision of a CTB into CBs [and transform block (TBs)]. Solid lines indicate CB borders and dotted lines indicate TB borders. (a) CTB with its partitioning. (b) corresponding quadtree.

2.1.2.1 Tree-Structured Partitioning into Transform Blocks and Units

For residual coding, a CB can be recursively partitioned into transform blocks (TBs). The partitioning is signaled by a residual quadtree. Only square CB and TB partitioning is specified, where a block can be recursively split into quadrants, as illustrated in FIG. 4. For a given luma CB of size M×M, a flag signals whether it is split into four blocks of size M/2×M/2. If further splitting is possible, as signaled by a maximum depth of the residual quadtree indicated in the SPS, each quadrant is assigned a flag that indicates whether it is split into four quadrants. The leaf node blocks resulting from the residual quadtree are the transform blocks that are further processed by transform coding. The encoder indicates the maximum and minimum luma TB sizes that it will use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intra-picture-predicted CUs, the decoded samples of the nearest-neighboring TBs (within or outside the CB) are used as reference data for intra picture prediction.

In contrast to previous standards, the HEVC design allows a TB to span across multiple PBs for inter-picture predicted CUs to maximize the potential coding efficiency benefits of the quadtree-structured TB partitioning.

2.1.2.2 Parent and Child Nodes

A CTB is divided according to a quad-tree structure, the nodes of which are coding units. The plurality of nodes in a quad-tree structure includes leaf nodes and non-leaf nodes. The leaf nodes have no child nodes in the tree structure (i.e., the leaf nodes are not further split). The, non-leaf nodes include a root node of the tree structure. The root node corresponds to an initial video block of the video data (e.g., a CTB). For each respective non-root node of the plurality of nodes, the respective non-root node corresponds to a video block that is a sub-block of a video block corresponding to a parent node in the tree structure of the respective non-root node. Each respective non-leaf node of the plurality of non-leaf nodes has one or more child nodes in the tree structure.

2.1.3 Quadtree Plus Binary Tree Block Structure with Larger CTUs in JEM

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

2.1.3.1 QTBT Block Partitioning Structure

Different from HEVC, the QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIGS. 5A and 5B, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.

CTU size: the root node size of a quadtree, the same concept as in HEVC

MinQTSize: the minimally allowed quadtree leaf node size

MaxBTSize: the maximally allowed binary tree root node size

MaxBTDepth: the maximally allowed binary tree depth

MinBTSize: the minimally allowed binary tree leaf node size

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

FIG. 5A illustrates an example of block partitioning by using QTBT and FIG. 5B illustrates the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

2.1.4 Ternary-Tree for VVC

In some implementations, tree types other than quad-tree and binary-tree are supported. In the implementation, two more ternary tree (TT) partitions, i.e., horizontal and vertical center-side ternary-trees are introduced, as shown in FIGS. 6 (d) and (e).

Figure 6:
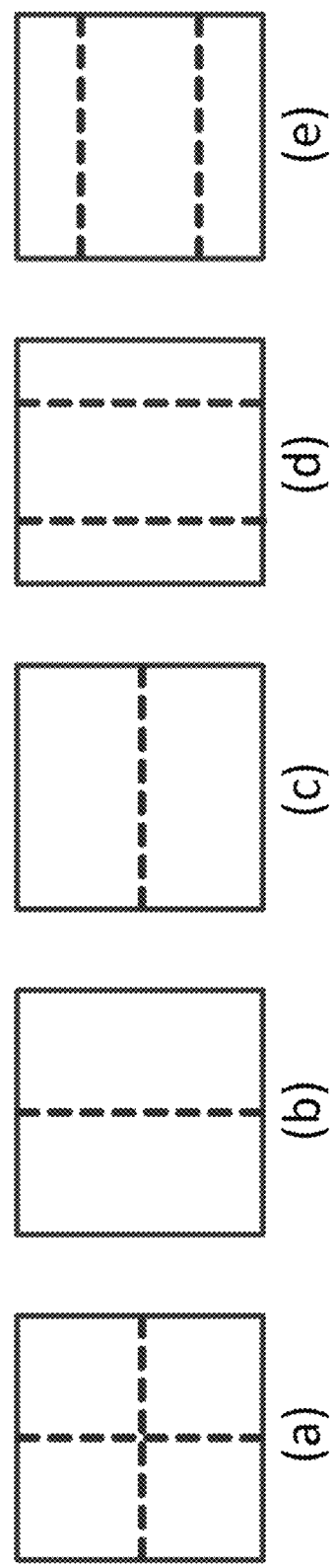
FIG. 6 shows an example of video block partitioning.

FIG. 6 shows: (a) quad-tree partitioning (b) vertical binary-tree partitioning (c) horizontal binary-tree partitioning (d) vertical center-side ternary-tree partitioning (e) horizontal center-side ternary-tree partitioning.

For example, there can be two levels of trees, region tree (quad-tree) and prediction tree (binary-tree or ternary-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

2.1.5 Partitioning Structure

Figure 7:
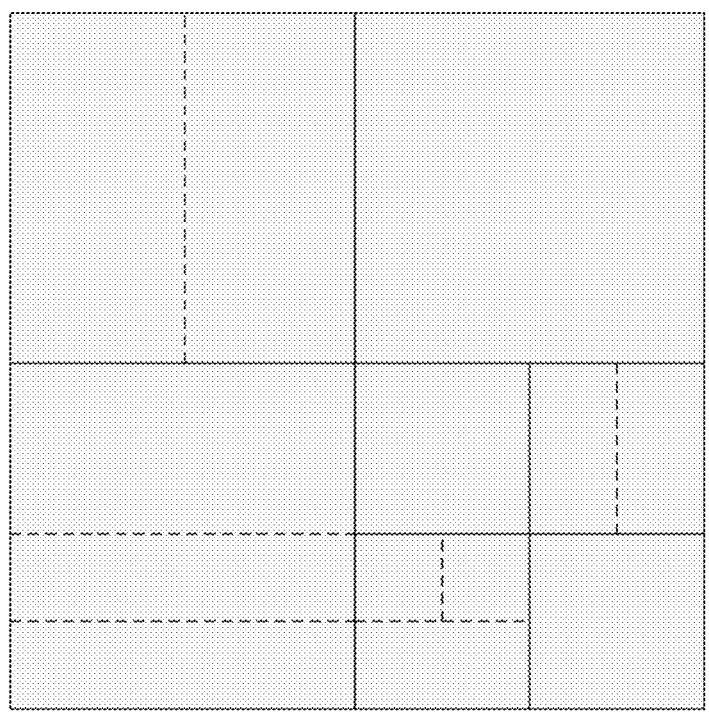
FIG. 7 shows an example of quad-tree partitioning.

The tree structure used in this response, called Multi-Tree Type (MTT), is a generalization of the QTBT. In QTBT, as shown in FIG. 7, a Coding Tree Unit (CTU) is firstly partitioned by a quad-tree structure. The quad-tree leaf nodes are further partitioned by a binary-tree structure.

The fundamental structure of MTT constitutes of two types of tree nodes: Region Tree (RT) and Prediction Tree (PT), supporting nine types of partitions, as shown in FIG. 7.

Figure 8:
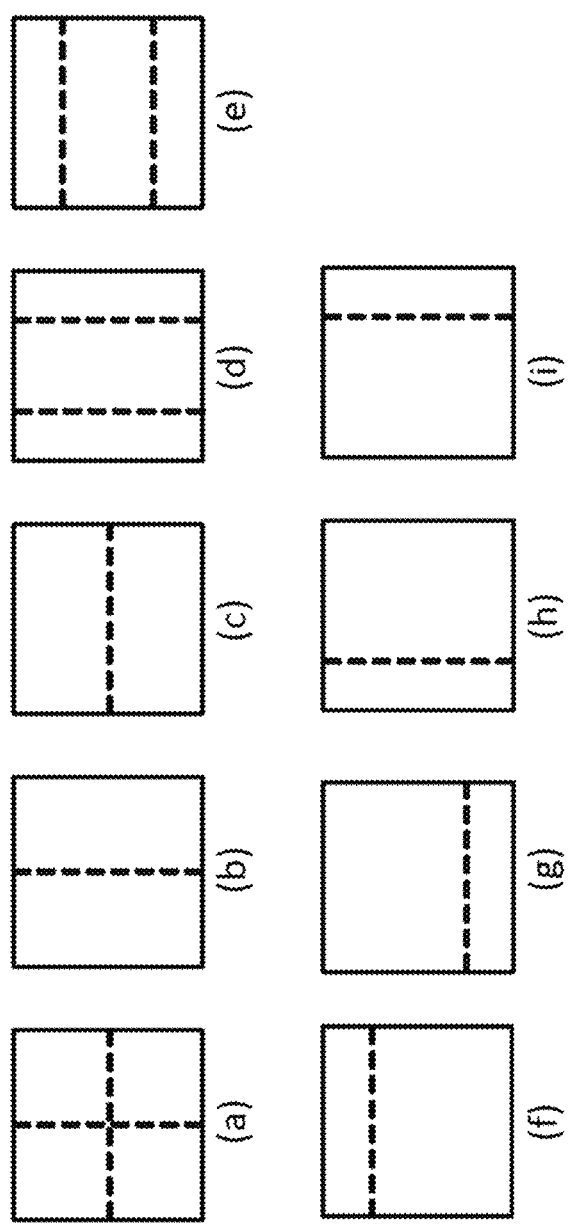
FIG. 8 shows an example of tree-type signaling.

FIG. 8 shows: (a) quad-tree partitioning (b) vertical binary-tree partitioning (c) horizontal binary-tree partitioning (d) vertical ternary-tree partitioning (e) horizontal ternary-tree partitioning (f) horizontal-up asymmetric binary-tree partitioning (g) horizontal-down asymmetric binary-tree partitioning (h) vertical-left asymmetric binary-tree partitioning (i) vertical-right asymmetric binary-tree partitioning.

A region tree can recursively split a CTU into square blocks down to a 4×4 size region tree leaf node. At each node in a region tree, a prediction tree can be formed from one of three tree types: Binary Tree (BT), Ternary Tree (TT), and Asymmetric Binary Tree (ABT). In a PT split, it is prohibited to have a quadtree partition in branches of the prediction tree. As in JEM, the luma tree and the chroma tree are separated in I slices. The signaling methods for RT and PT are illustrated in FIG. 8.

2.2 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors, such a coding mode is called AMVP mode.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signalled explicitly per each PU.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.2.1 Merge Mode 2.2.1.1 Derivation of Candidates for Merge Mode

Figure 9:
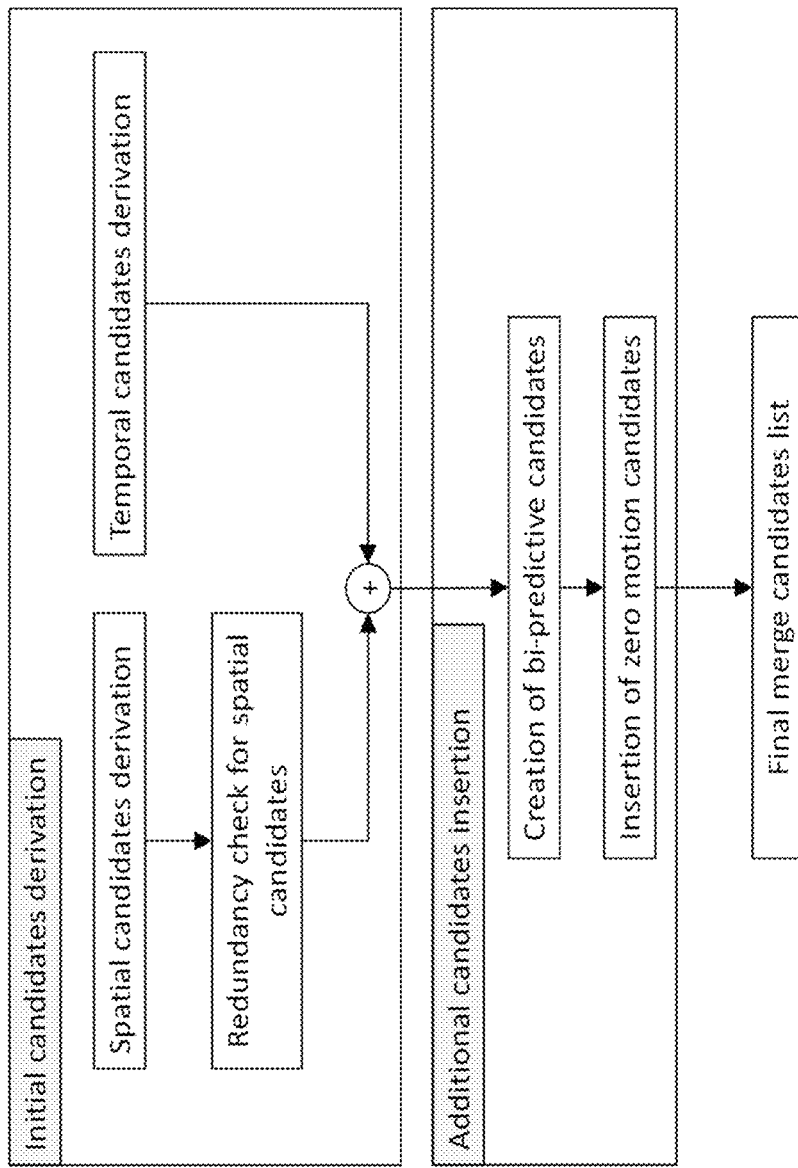
FIG. 9 shows an example of a derivation process for merge candidate list construction.

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
　Step 1.1: Spatial candidates derivation
　Step 1.2: Redundancy check for spatial candidates
　Step 1.3: Temporal candidates derivation
Step 2: Additional candidates insertion
　Step 2.1: Creation of bi-predictive candidates
　Step 2.2: Insertion of zero motion candidates These steps are also schematically depicted in FIG. 9. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.2.1.2 Spatial Candidates Derivation

Figure 10:
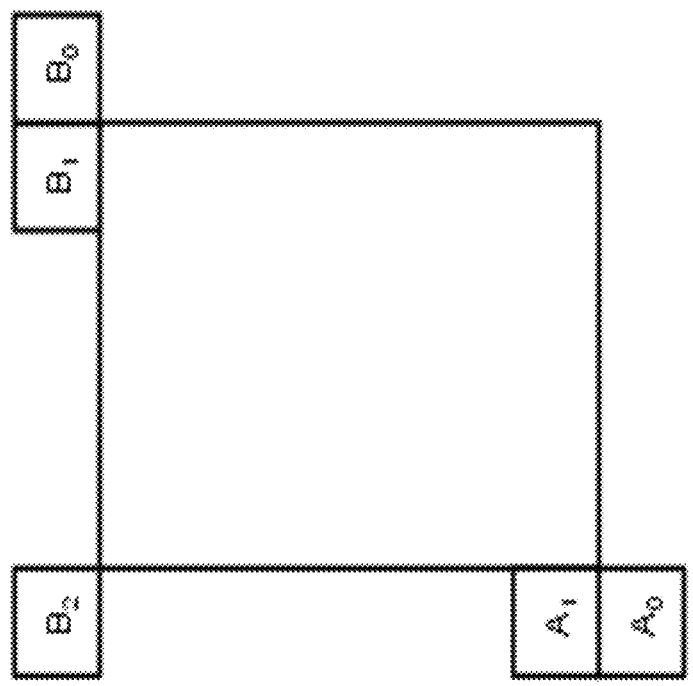
FIG. 10 shows example positions of spatial merge candidates.
Figure 11:
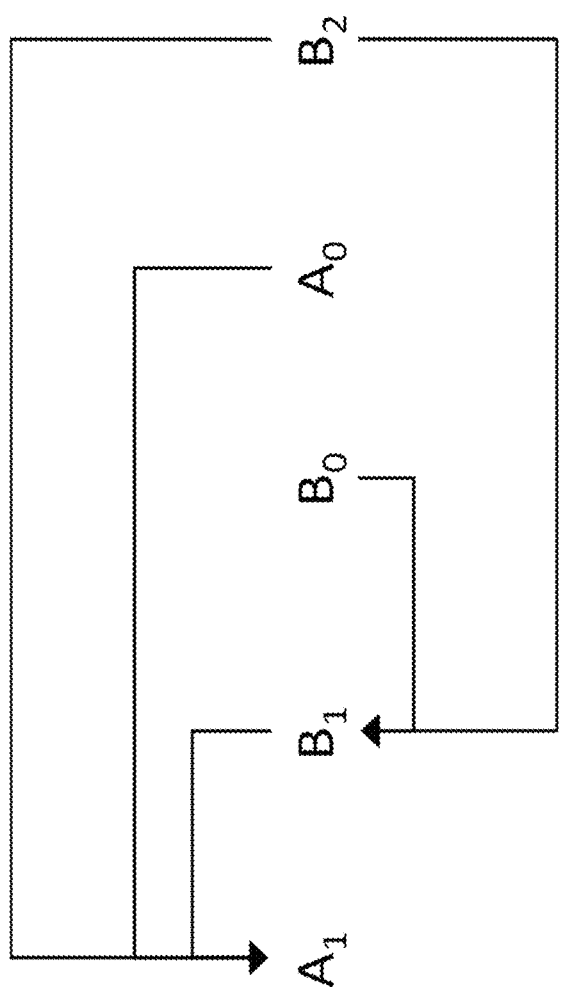
FIG. 11 shows examples of candidate pairs considered for redundancy check of spatial merge candidates.
Figure 12B:
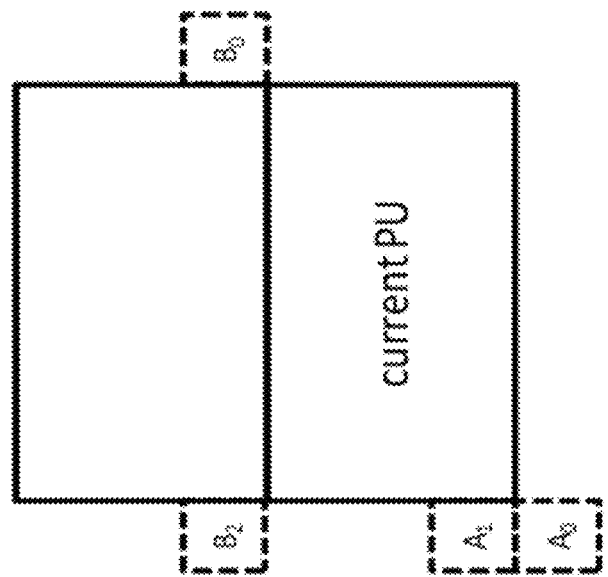
FIGS. 12A and 12B show examples of positions for the second PU of N×2N and 2N×N partitions.
Figure 12A:
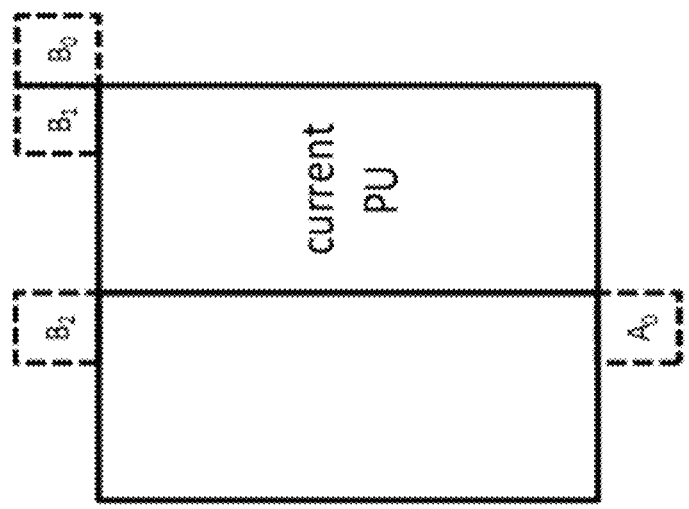

In the derivation of spatial merge candidates, a maximum of four merge candidates are selected among candidates located in the positions depicted in FIG. 10. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 11 are considered and a candidate is only added to the list if the corresponding candidate used for redundancy check has not the same motion information. Another source of duplicate motion information is the "second PU" associated with partitions different from 2N×2N. As examples, FIGS. 12A and 12B depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.2.1.3 Temporal Candidate Derivation

Figure 13:
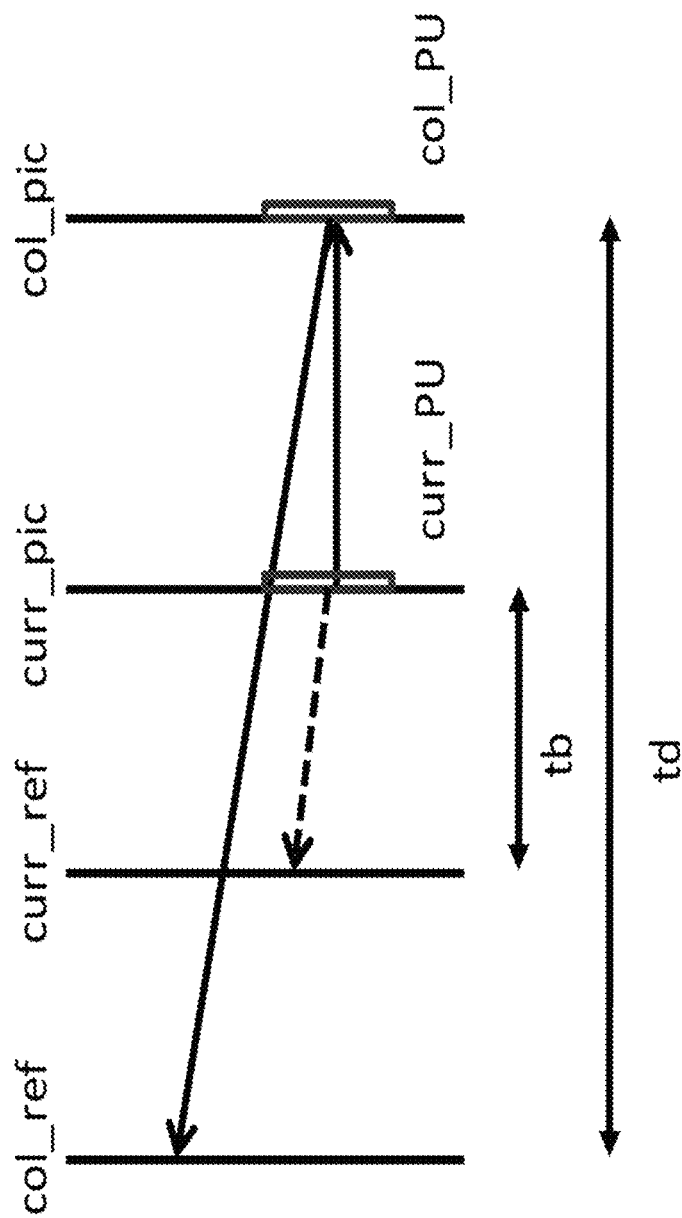
FIG. 13 illustrates motion vector scaling for temporal merge candidates.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dashed line in FIG. 13, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate. Illustration of motion vector scaling for temporal merge candidate.

Figure 14:
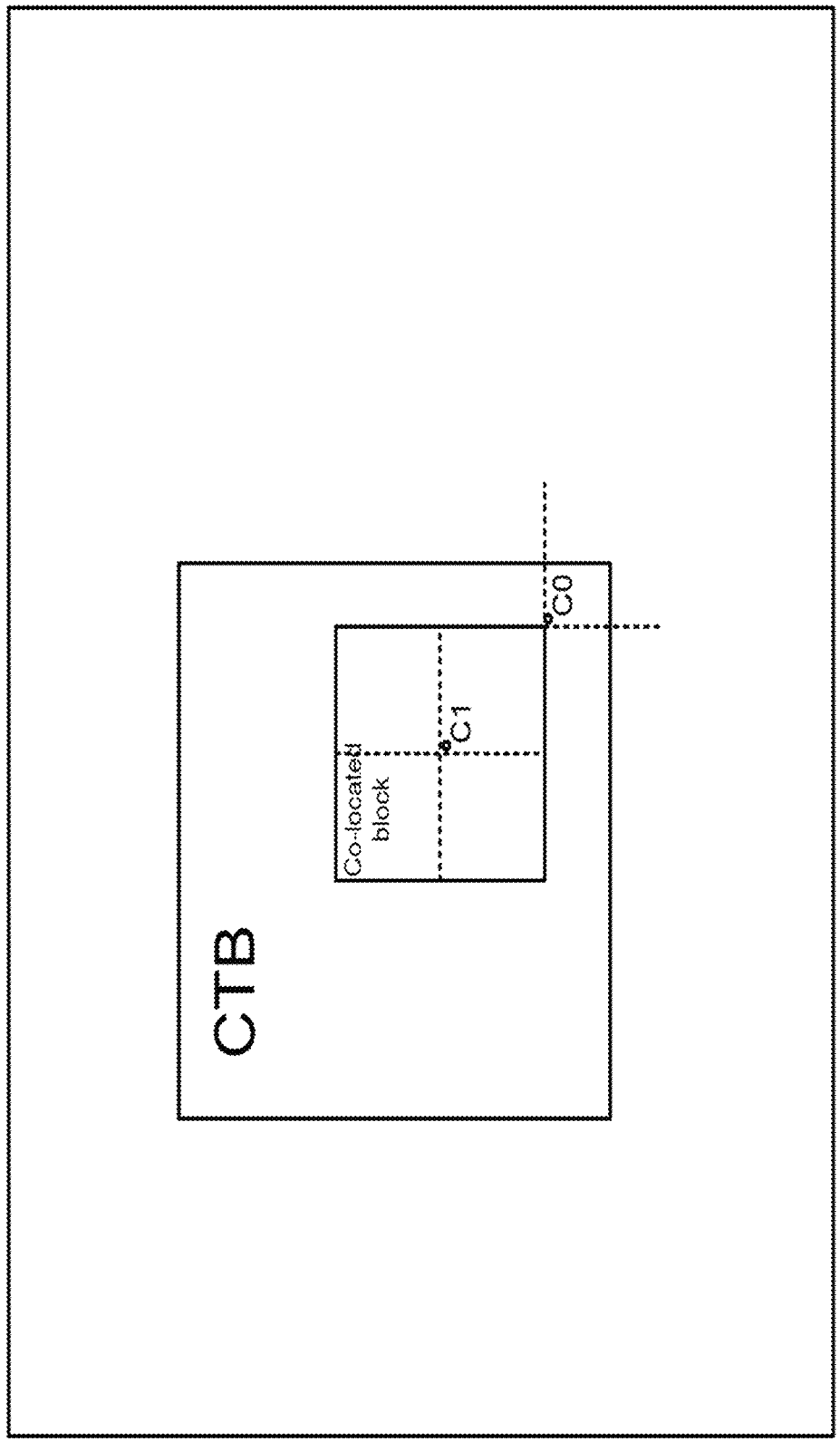
FIG. 14 shows candidate positions for temporal merge candidates, and their co-located picture.

In the co-located PU (Y) belonging to the reference frame, the position for the temporal candidate is selected between candidates $C_0$ and $C_1$, as depicted in FIG. 14. If PU at position $C_0$ is not available, is intra coded, or is outside of the current CTU, position $C_1$ is used. Otherwise, position $C_0$ is used in the derivation of the temporal merge candidate.

2.2.1.4 Additional Candidates Insertion

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIGS. 15A and 15B depict original list on the left and a merge candidate list on the right. FIGS. 15A and 15B depict a case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.2.1.5 Motion Estimation Regions for Parallel Processing

To speed up the encoding process, motion estimation can be performed in parallel whereby the motion vectors for all prediction units inside a given region are derived simultaneously. The derivation of merge candidates from spatial neighbourhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using e.g., the "log 2_parallel_merge_level_minus2" syntax element. When a MER is defined, merge candidates falling in the same region are marked as unavailable and therefore not considered in the list construction.

7.3.2.3 Picture Parameter Set RBSP Syntax
7.3.2.3.1 General Picture Parameter Set RBSP Syntax

|  | Descriptor |
|---|---|
| pic_parameter_set_rbsp( ) { |  |
|   pps_pic_parameter_set_id | ue(v) |
|   pps_seq_parameter_set_id | ue(v) |
|   dependent_slice_segments_enabled_flag | u(1) |
|   ... |  |
|   pps_scaling_list_data_present_flag | u(1) |
|   if( pps_scaling_list_data_present_flag ) |  |
|     scaling_list_data( ) |  |
|   lists_modification_present_flag | u(1) |
|   log2_parallel_merge_level_minus2 | ue(v) |
|   slice_segment_header_extension_present_flag | u(1) |
|   pps_extension_present_flag | u(1) |
|   ... |  |
|   rbsp_trailing_bits( ) |  |
| } |  | log 2_parallel_merge_level_minus2 plus 2 specifies the value of the variable Log 2ParMrgLevel, which is used in the derivation process for luma motion vectors for merge mode as specified in clause 8.5.3.2.2 and the derivation process for spatial merging candidates as specified in clause 8.5.3.2.3. The value of log 2_parallel_merge_level_minus2 shall be in the range of 0 to CtbLog 2SizeY−2, inclusive. The variable Log 2ParMrgLevel is derived as follows:

$$\text{Log 2ParMrgLevel} = \text{log 2\_parallel\_merge\_level\_minus2} + 2 \quad (7\text{-}37)$$

NOTE 3—The value of Log 2ParMrgLevel indicates the built-in capability of parallel derivation of the merging candidate lists. For example, when Log 2ParMrgLevel is equal to 6, the merging candidate lists for all the prediction units (PUs) and coding units (CUs) contained in a 64×64 block can be derived in parallel.

2.2.2 Motion Vector Prediction in AMVP Mode

Motion vector prediction exploits spatio-temporal correlation of motion vector with neighbouring PUs, which is used for explicit transmission of motion parameters. It constructs a motion vector candidate list by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (e.g., FIGS. 2 to 8). In the following sections, details about derivation process of motion vector prediction candidate are provided.

2.2.2.1 Derivation of Motion Vector Prediction Candidates

Figure 16:
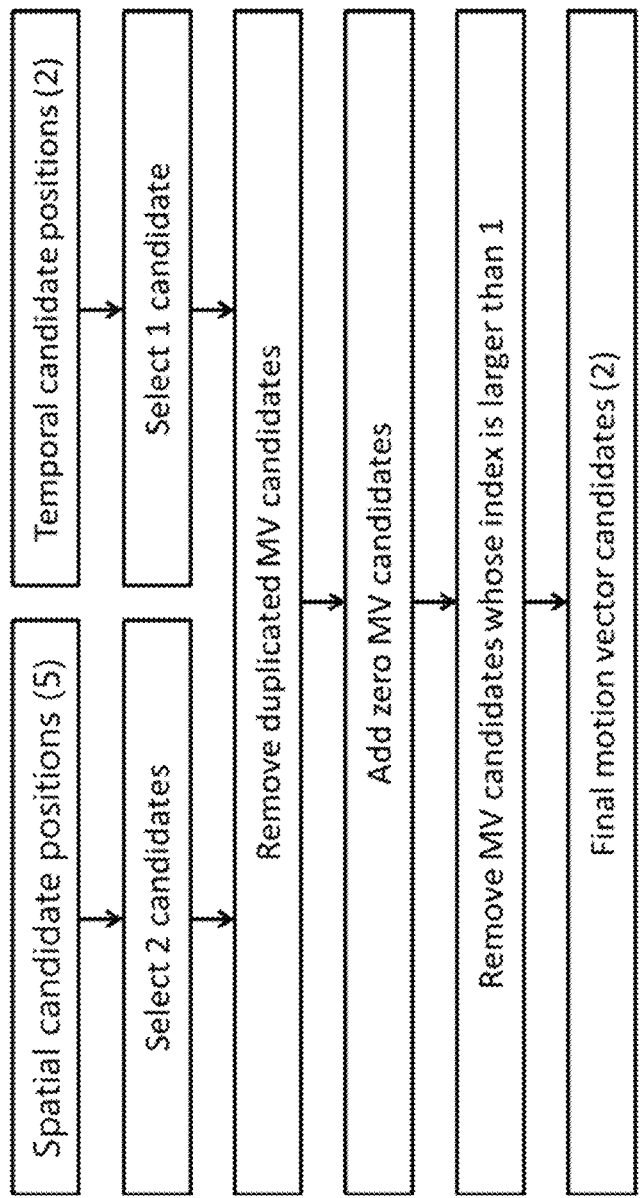
FIG. 16 shows an example of a derivation process for motion vector prediction candidates.

FIG. 16 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 11.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.2.2.2 Spatial Motion Vector Candidates

In the derivation of spatial motion vector candidates, a maximum of two candidates are considered among five potential candidates, which are derived from PUs located in positions as depicted in FIG. 11, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
   (1) Same reference picture list, and same reference picture index (same POC)
   (2) Different reference picture list, but same reference picture (same POC)
Spatial scaling
   (3) Same reference picture list, but different reference picture (different POC)
   (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 17:
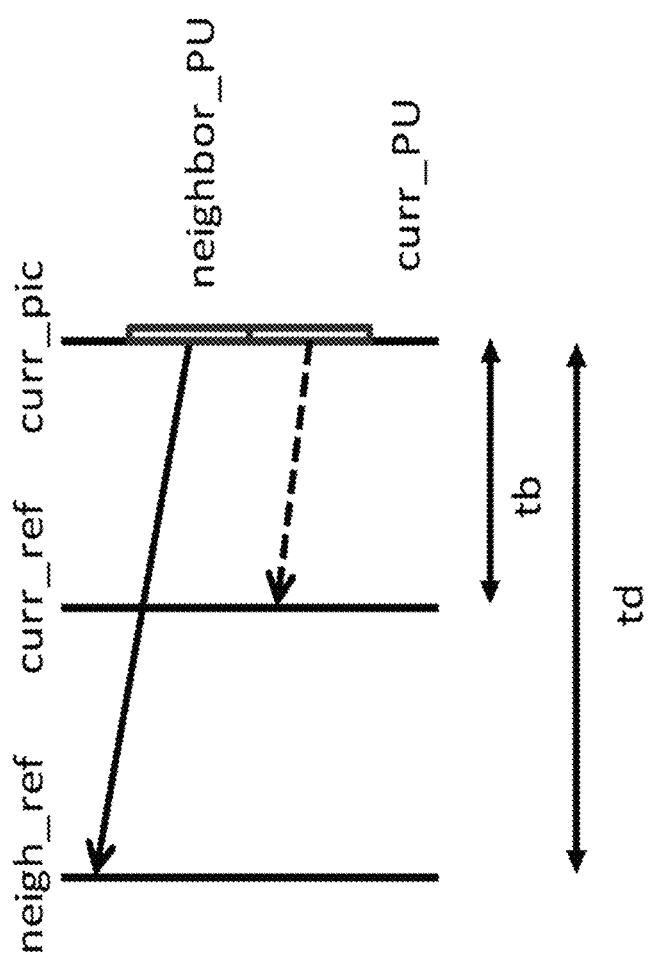
FIG. 17 shows an example of motion vector scaling for spatial motion vector candidates.

In a spatial scaling process, the motion vector of the neighbouring PU is scaled in a similar manner as for temporal scaling, as depicted as FIG. 17. The main difference is that the reference picture list and index of current PU is given as input; the actual scaling process is the same as that of temporal scaling.

2.2.2.3 Temporal Motion Vector Candidates

Apart for the reference picture index derivation, all processes for the derivation of temporal merge candidates are the same as for the derivation of spatial motion vector candidates (see, e.g., FIG. 6). The reference picture index is signalled to the decoder.

2.2.2.4 Signaling of AMVP Information

For the AMVP mode, four parts may be signalled in the bitstream, i.e., prediction direction, reference index, MVD and my predictor candidate index.

Syntax Tables:

|  | Descriptor |
|---|---|
| prediction_unit( x0, y0, nPbW, nPbH ) { |  |
|   if( cu_skip_flag[ x0 ][ y0 ] ) { |  |
|     if( MaxNumMergeCand > 1 ) |  |
|       merge_idx[ x0 ][ y0 ] | ae(v) |
|   } else { /* MODE_INTER */ |  |
|     merge_flag[ x0 ][ y0 ] | ae(v) |
|     if( merge flag[ x0 ][ y0 ] ) { |  |
|       if( MaxNumMergeCand > 1 ) |  |
|         merge_idx[ x0 ][ y0 ] | ae(v) |
|     } else { |  |
|       if( slice_type == B ) |  |
|         inter_pred_idc[ x0 ][ y0 ] | ae(v) |
|       if( inter_pred_idc[ x0 ][ y0 ] != PRED_L1 ) { |  |
|         if( num_ref_idx_10_active_minus1 > 0 ) |  |
|           ref_idx_10[ x0 ][ y0 ] | ae(v) |
|         mvd_coding( x0, y0, 0 ) |  |
|         mvp_10_flag[ x0 ][ y0 ] | ae(v) |
|       } |  |
|       if( inter_pred_idc[ x0 ][ y0 ] != PRED_L0 ) { |  |
|         if( num_ref_idx_11_active_minus1 > 0 ) |  |
|           ref_idx_l1[ x0 ][ y0 ] | ae(v) |
|         if( mvd_l1_zero_flag && inter_pred_idc[ x0 ][ y0 ] == PRED_BI ) |  |
| { |  |

-continued

|  | Descriptor |
|---|---|
|         MvdL1[ x0 ][ y0 ][ 0 ] = 0 | |
|         MvdL1[ x0 ][ y0 ][ 1 ] = 0 | |
|       } else | |
|         mvd_coding( x0, y0, 1 ) | |
|       mvp_l1_flag[ x0 ][ y0 ] | ae(v) |
|     } | |
|   } | |
| } | |
| } | |

7.3.8.9 Motion Vector Difference Syntax

|  | Descriptor |
|---|---|
| mvd coding( x0, y0, refList ) { | |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | |

2.3 New Inter Prediction Methods in JEM (Joint Exploration Model)

2.3.1 Sub-CU Based Motion Vector Prediction

In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

2.3.1.1 Alternative Temporal Motion Vector Prediction

Figure 18:
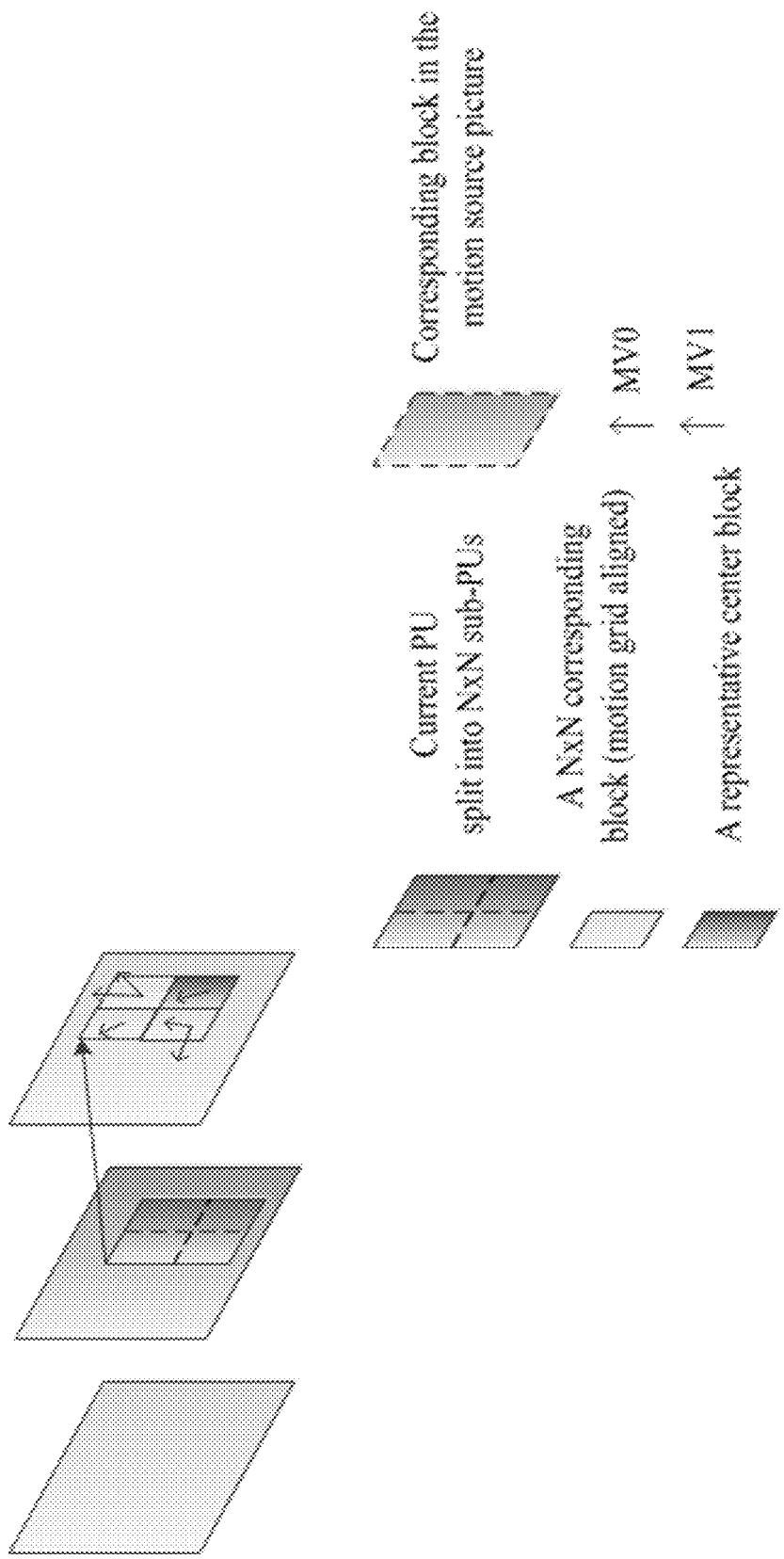
FIG. 18 shows an example Alternative Temporal Motion Vector Prediction (ATMVP) for motion prediction of a CU.

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in FIG. 18, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 18.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU. In one example, if the first merge candidate is from the left neighboring block (i.e., $A_1$ in FIG. 19), the associated MV and reference picture are utilized to identify the source block and source picture.

Figure 19:
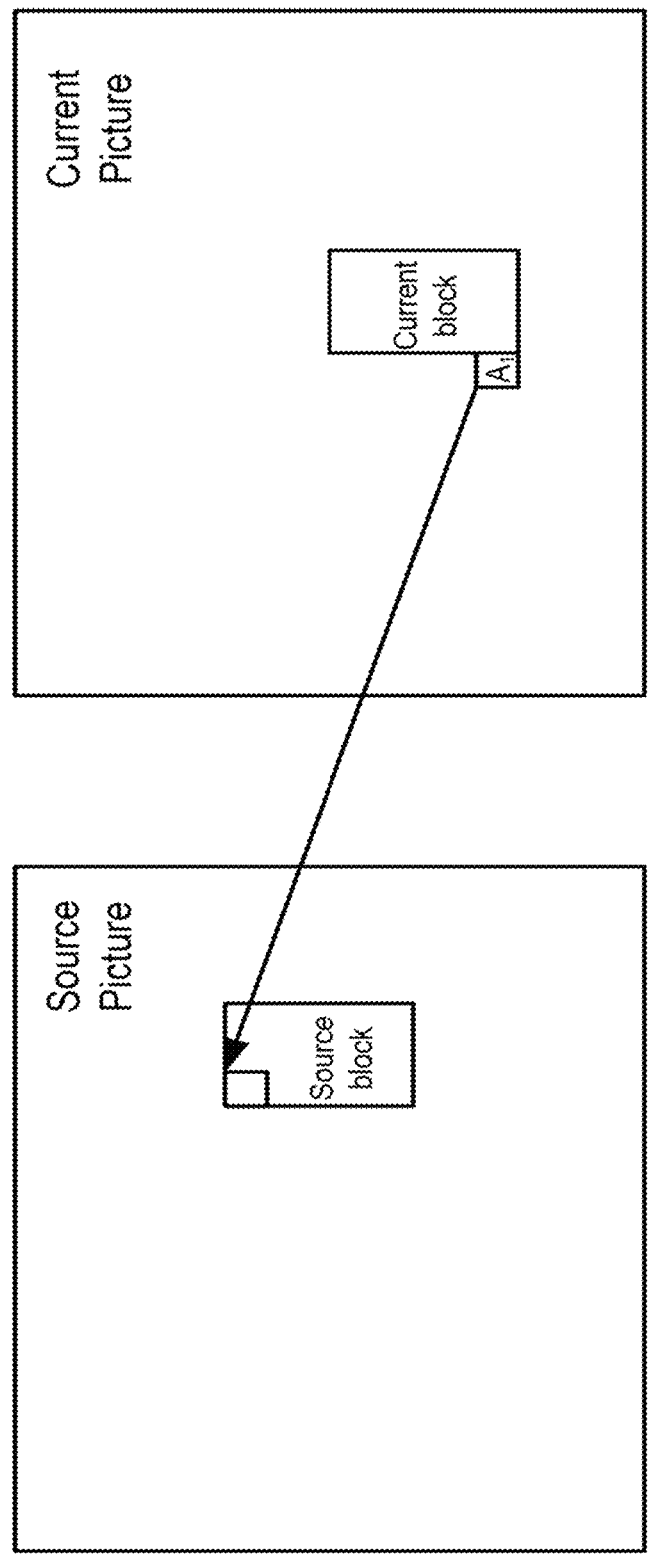
FIG. 19 pictorially depicts an example of identification of a source block and a source picture.

FIG. 19 shows an example of the identification of source block and source picture.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1−X) for each sub-CU.

2.3.1.2 Spatial-Temporal Motion Vector Prediction

Figure 20:
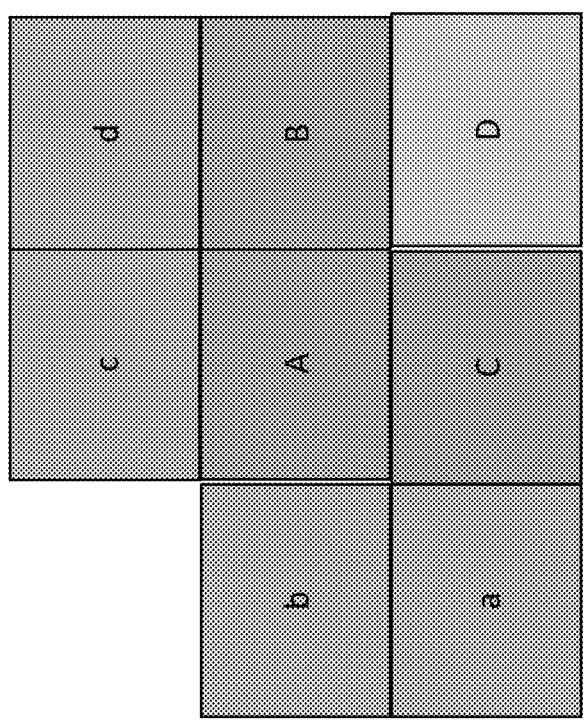
FIG. 20 shows an example of one CU with four sub-blocks and neighboring blocks.

In this method, the motion vectors of the sub-CUs are derived recursively, following raster scan order. FIG. 20 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

FIG. 20 shows an example of one CU with four sub-blocks (A-D) and its neighbouring blocks (a-d).

2.3.1.3 Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index is context coded by CABAC. While in HEVC, only the first bin is context coded and the remaining bins are context by-pass coded.

2.3.2 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.3.3 Pattern Matched Motion Vector Derivation

Pattern matched motion vector derivation (PMMVD) mode is a special merge mode based on Frame-Rate Up Conversion (FRUC) techniques. With this mode, motion information of a block is not signalled but derived at decoder side.

A FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \quad (1)$$

Figure 21:
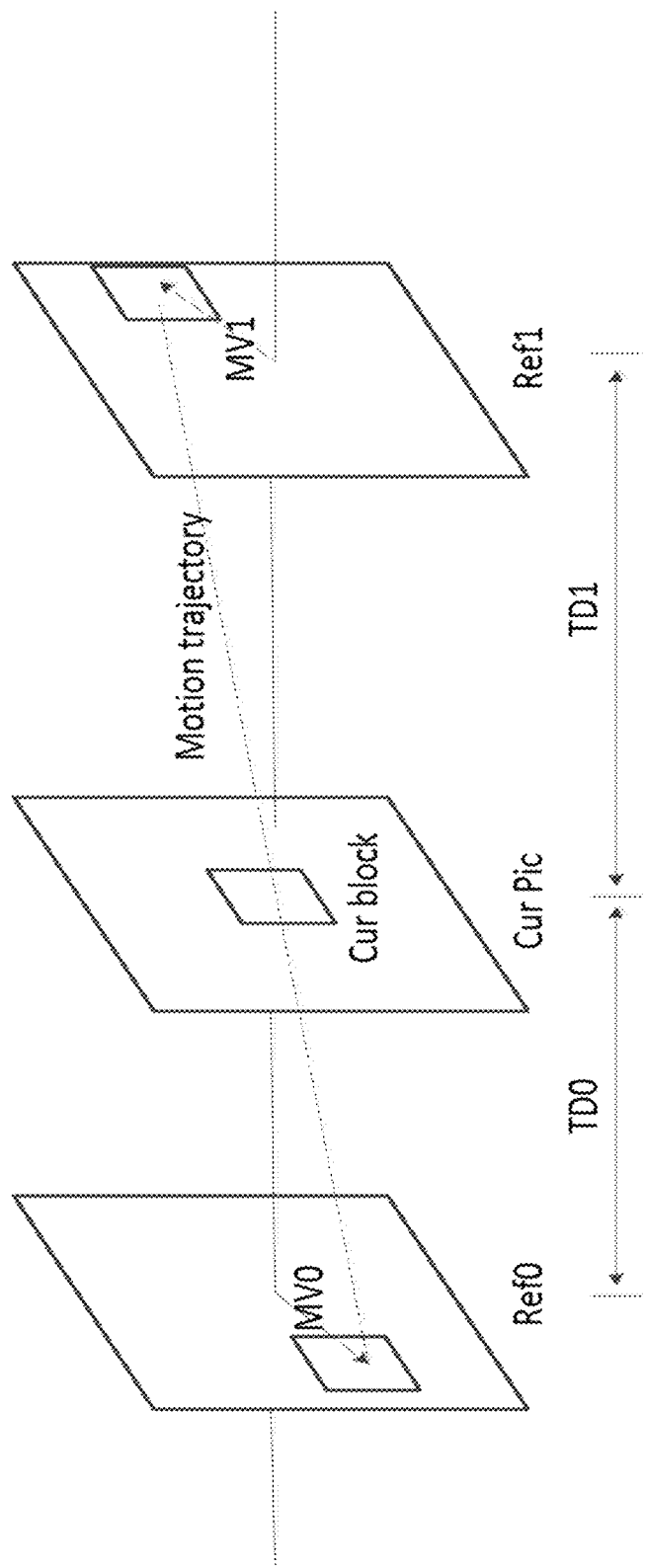
FIG. 21 illustrates an example of bilateral matching.

As shown in the FIG. 21, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 22:
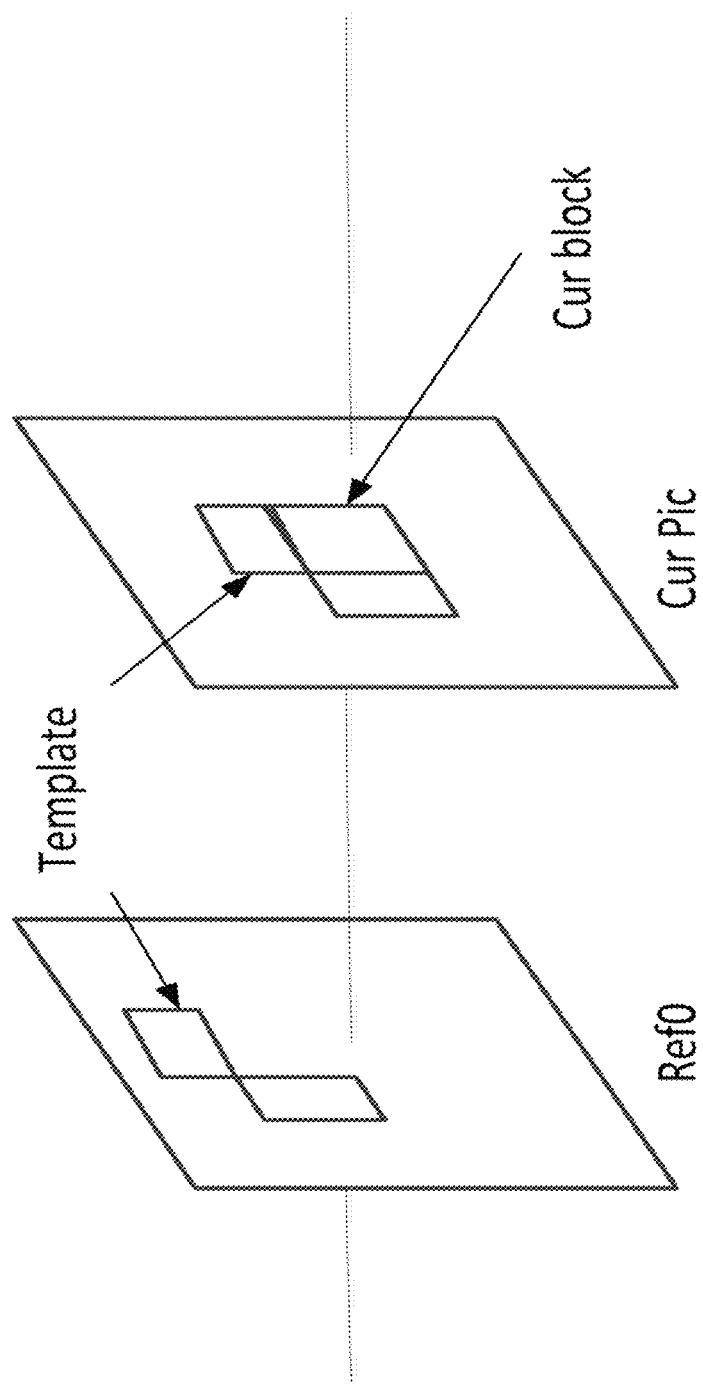
FIG. 22 illustrates an example of template matching.

As shown in FIG. 22, template matching is used to derive motion information of the current CU by finding the closest match between a template (top and/or left neighbouring blocks of the current CU) in the current picture and a block (same size to the template) in a reference picture. Except the aforementioned FRUC merge mode, the template matching is also applied to AMVP mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

2.3.3.1 CU Level MV Candidate Set

The MV candidate set at CU level consists of:

(i) Original AMVP candidates if the current CU is in AMVP mode (ii) all merge candidates, (iii) several MVs in the interpolated MV field.

(iv) top and left neighbouring motion vectors

When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

2.3.3.2 Sub-CU Level MV Candidate Set

The MV candidate set at sub-CU level consists of:

(i) an MV determined from a CU-level search, (ii) top, left, top-left and top-right neighbouring MVs, (iii) scaled versions of collocated MVs from reference pictures, (iv) up to 4 ATMVP candidates, (v) up to 4 STMVP candidates The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones.

At the sub-CU level, up to 17 MVs are added to the candidate list.

2.3.3.3 Generation of Interpolated MV Field

Before coding a frame, interpolated motion field is generated for the whole picture based on unilateral ME. Then the motion field may be used later as CU level or sub-CU level MV candidates.

Figure 23:
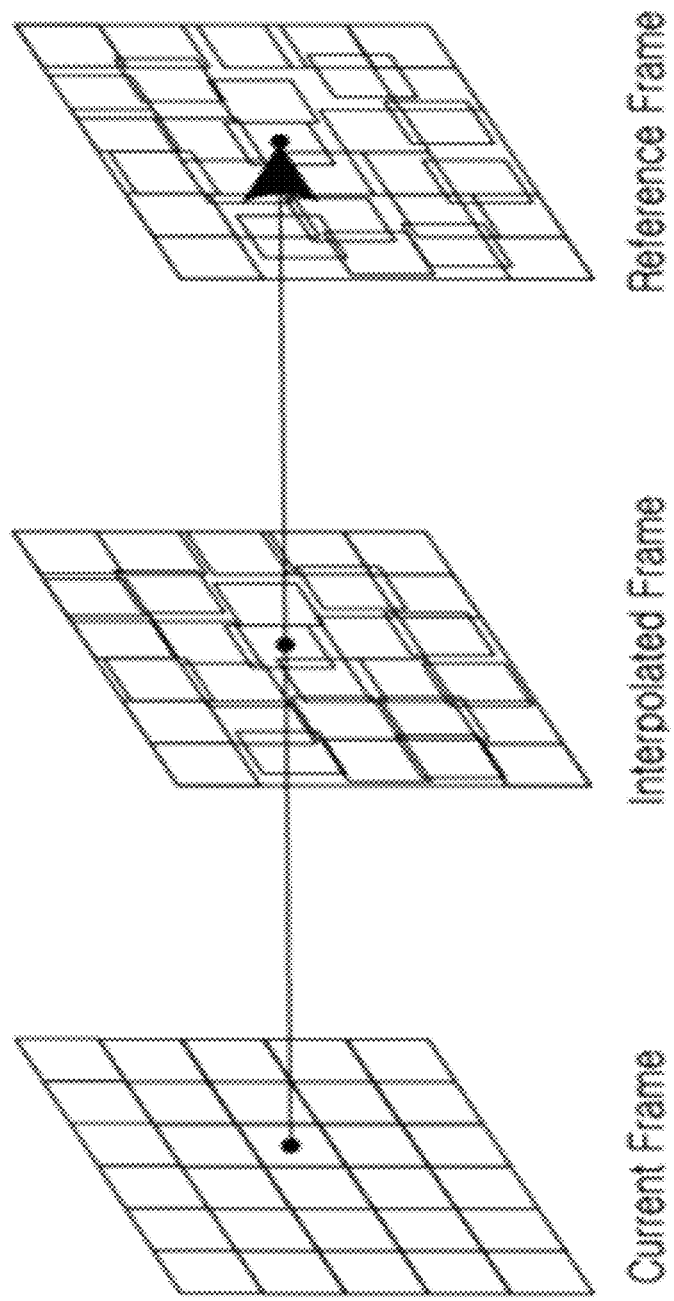
FIG. 23 depicts an example of unilateral Motion Estimation (ME) in Frame Rate UpConversion (FRUC).

First, the motion field of each reference pictures in both reference lists is traversed at 4×4 block level. For each 4×4 block, if the motion associated to the block passing through a 4×4 block in the current picture (as shown in FIG. 23) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

2.3.3.4 Interpolation and Matching Cost

When a motion vector points to a fractional sample position, motion compensated interpolation is needed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C=SAD+w\cdot(|MV_x-MV_x^s|+|MV_y-MV_y^s|) \quad (2)$$

where w is a weighting factor which is empirically set to 4, MV and MVS indicate the current MV and the starting MV, respectively. SAD is still used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

2.3.3.5 MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

2.3.3.6 Selection of Prediction Direction in Template Matching FRUC Merge Mode

In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

If costBi<=factor*min (cost0, cost1)

bi-prediction is used;

Otherwise, if cost0<=cost1 uni-prediction from list0 is used;

Otherwise,
  uni-prediction from list1 is used;
where cost0 is the SAD of list0 template matching, cost1 is the SAD of list1 template matching and costBi is the SAD of bi-prediction template matching. The value of factor is equal to 1.25, which means that the selection process is biased toward bi-prediction.

The inter prediction direction selection is only applied to the CU-level template matching process.

2.3.4 Decoder-Side Motion Vector Refinement

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 24:
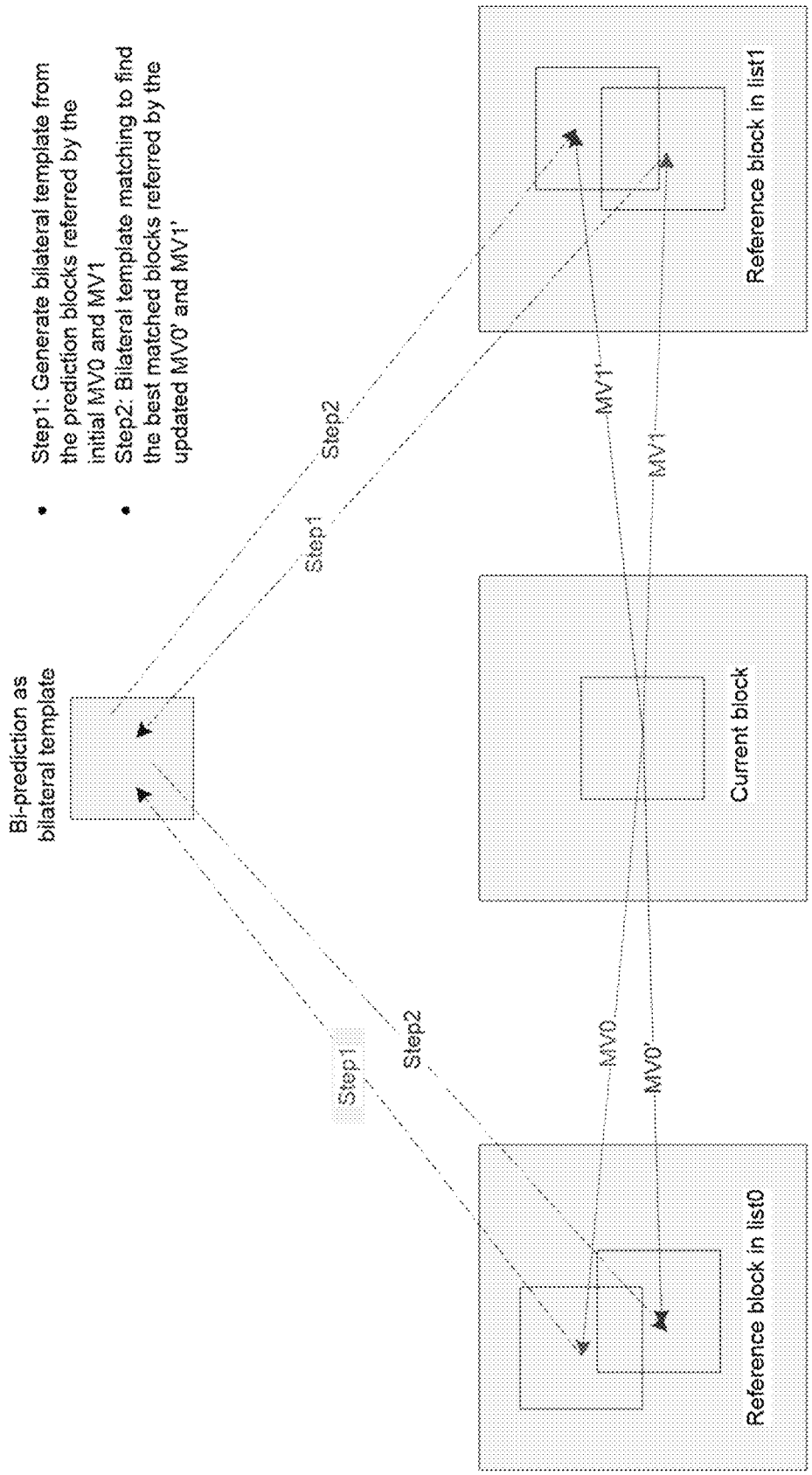
FIG. 24 shows an example of DMVR based on bilateral template matching.

In DMVR, a bilateral template is generated as the weighted combination (i.e. average) of the two prediction blocks, from the initial MV0 of list0 and MV1 of list1, respectively, as shown in FIG. 23. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 24, are used for generating the final bi-prediction results. A sum of absolute differences (SAD) is used as the cost measure.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

2.3.5 Merge/Skip Mode with Bilateral Matching Refinement

Figure 25:
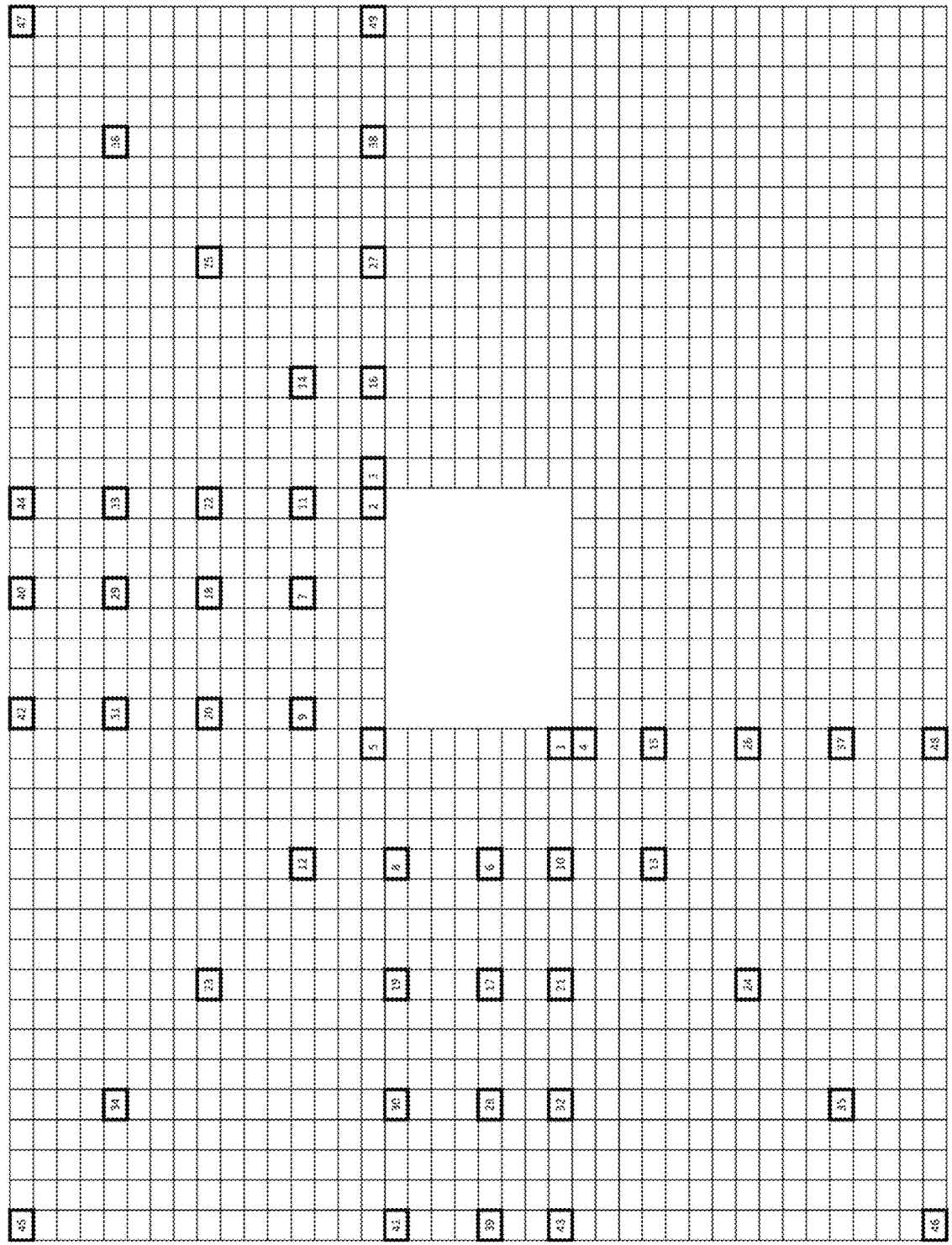
FIG. 25 shows an example of spatially neighboring blocks used to derive spatial merge candidates.

A merge candidate list is first constructed by inserting the motion vectors and reference indices of the spatial neighboring and temporal neighboring blocks into the candidate list with redundancy checking until the number of the available candidates reaches the maximum candidate size of 19. The merge candidate list for the merge/skip mode is constructed by inserting spatial candidates (FIG. 11), temporal candidates, affine candidates, advanced temporal MVP (ATMVP) candidate, spatial temporal MVP (STMVP) candidate and the additional candidates as used in HEVC (Combined candidates and Zero candidates) according to a pre-defined insertion order:

Spatial candidates for blocks 1-4.
  Extrapolated affine candidates for blocks 1-4.
  ATMVP.
  STMVP.
  Virtual affine candidate.
  Spatial candidate (block 5) (used only when the number of the available candidates is smaller than 6).
  Extrapolated affine candidate (block 5).
  Temporal candidate (derived as in HEVC).
  Non-adjacent spatial candidates followed by extrapolated affine candidate (blocks 6 to 49, as depicted in FIG. 25).
  Combined candidates.
  Zero candidates.

It is noted that IC flags are also inherited from merge candidates except for STMVP and affine. Moreover, for the first four spatial candidates, the bi-prediction ones are inserted before the ones with uni-prediction.

In some implementations, blocks which are not connected with the current block may be accessed. If a non-adjacent block is coded with non-intra mode, the associated motion information may be added as an additional merge candidate.

2.3.6 Look-Up Table for Motion Vector Prediction

A history-based MVP (HMVP) (e.g., as presented in JVET-K0104) method wherein a HMVP candidate may be used as the motion information of a previously coded block. A table with multiple HMVP candidates is maintained during the encoding/decoding process.

HMVP could be used for motion prediction in several ways, as described in the above mentioned IDFs.

2.3.7 Generalized Bi-Prediction (GBI) in JVET-K0248

In this contribution, GBi is presented to allow applying different weights to predictors from L0 and L1. The predictor generation is shown below.

$$P_{GBi} = ((1-w_1)*P_{L0} + w_1*P_{L1} + \text{RoundingOffset}_{GBi}) >> \text{shiftNum}_{GBi},$$

Weights for true bi-prediction cases in random access (RA) condition.

| GBi Index | Weight value of $w_1$ | Binarization of GBi Index |
|---|---|---|
| 0 | 3/8 | 00 |
| 1 | 1/2 | 1 |
| 2 | 5/8 | 01 |

Weights in generalized bi-prediction

| GBi Index | Weight value of $w_1$ | Binarization of GBi Index |
|---|---|---|
| 0 | −1/4 | 0000 |
| 1 | 3/8 | 001 |
| 2 | 1/2 | 1 |
| 3 | 5/8 | 01 |
| 4 | 5/4 | 0001 |

For advanced motion vector prediction (AMVP) mode, the weight selection in GBi is explicitly signalled at CU-level if this CU is coded by bi-prediction. For merge mode, the weight selection is inherited from the merge candidate. In this proposal, GBi supports DMVR to generate the weighted average of template as well as the final predictor for BMS-1.0.

2.3.8 Non-Sub Block STMVP in JVET-K0532

Figure 26:
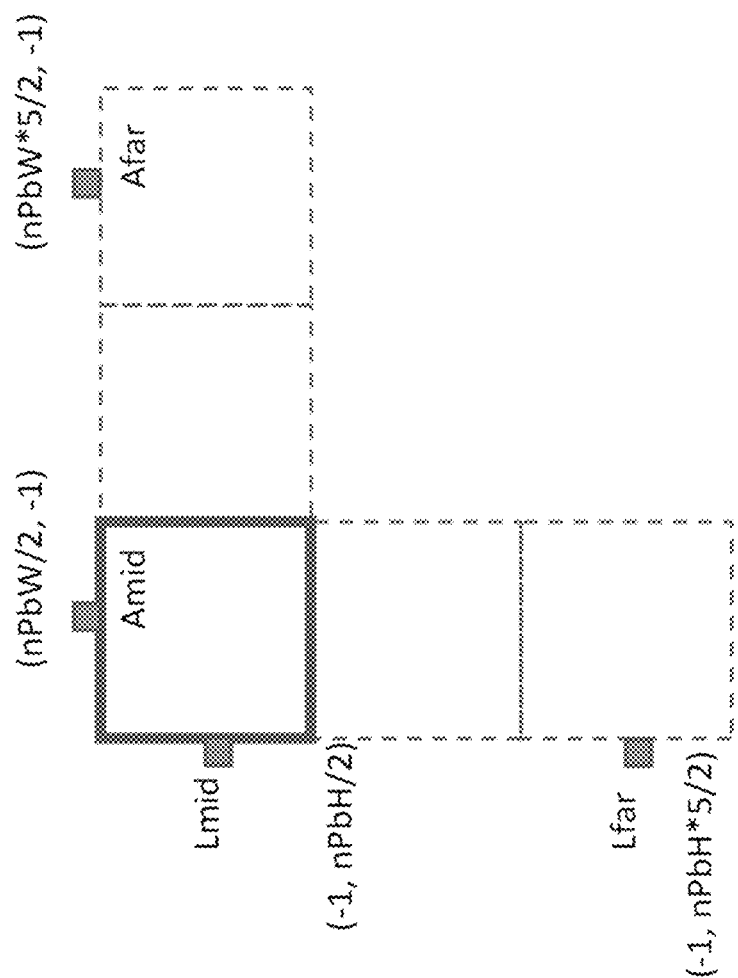
FIG. 26 depicts an example of non-sub block STMVP (spatio-temporal motion vector predictor) with the width and height of current block is denoted by nPbW and nPbH, respectively.

In this proposal, no subblock STMVP is proposed as a spatial-temporal merge mode. This proposed method uses a collocated block, which is the same as HEVC/JEM (only 1 picture, no temporal vector here). The proposed method also checks upper and left spatial position, which position is adjusted in this proposal. Specifically to check neighbouring inter-prediction information, at most two positions is checked for each above and left. The exact position of Amid, Afar from above row, Lfar and Lmid from left column (as depicted in FIG. 26) is shown below:

Afar: (nPbW*5/2, −1), Amid (nPbW/2, −1)

Lfar: (−1, nPbH*5/2), Lmid (−1, nPbH/2)

An average of motion vectors of above block, left block and a temporal block is calculated as the same as BMS software implementation. If the 3 reference inter-prediction blocks is available, denoted the associated MVs by (mvLX_A[0], mvLX_A[1]), (mvLX_L[0], mvLX_L[1]) and (mvLX_C[0], mvLX_C[1]), respectively, and the final predictor is denoted by (mvLX[0], mvLX[1]).

mvLX[0]=((mvLX_A[0]+mvLX_L[0]+mvLX_C[0])*43)/128 mvLX[1]=((mvLX_A[1]+mvLX_L[1]+mvLX_C[1])*43)/128

If only two or one inter-prediction block is available, average of two or just use one mv is used.

mvLX[0]=(mvLX_D[0]+mvLX_E[0])/2 mvLX[1]=(mvLX_D[1]+mvLX_E[1])/2

2.3.9 MV Planar in JVET-K0135

Figure 27:
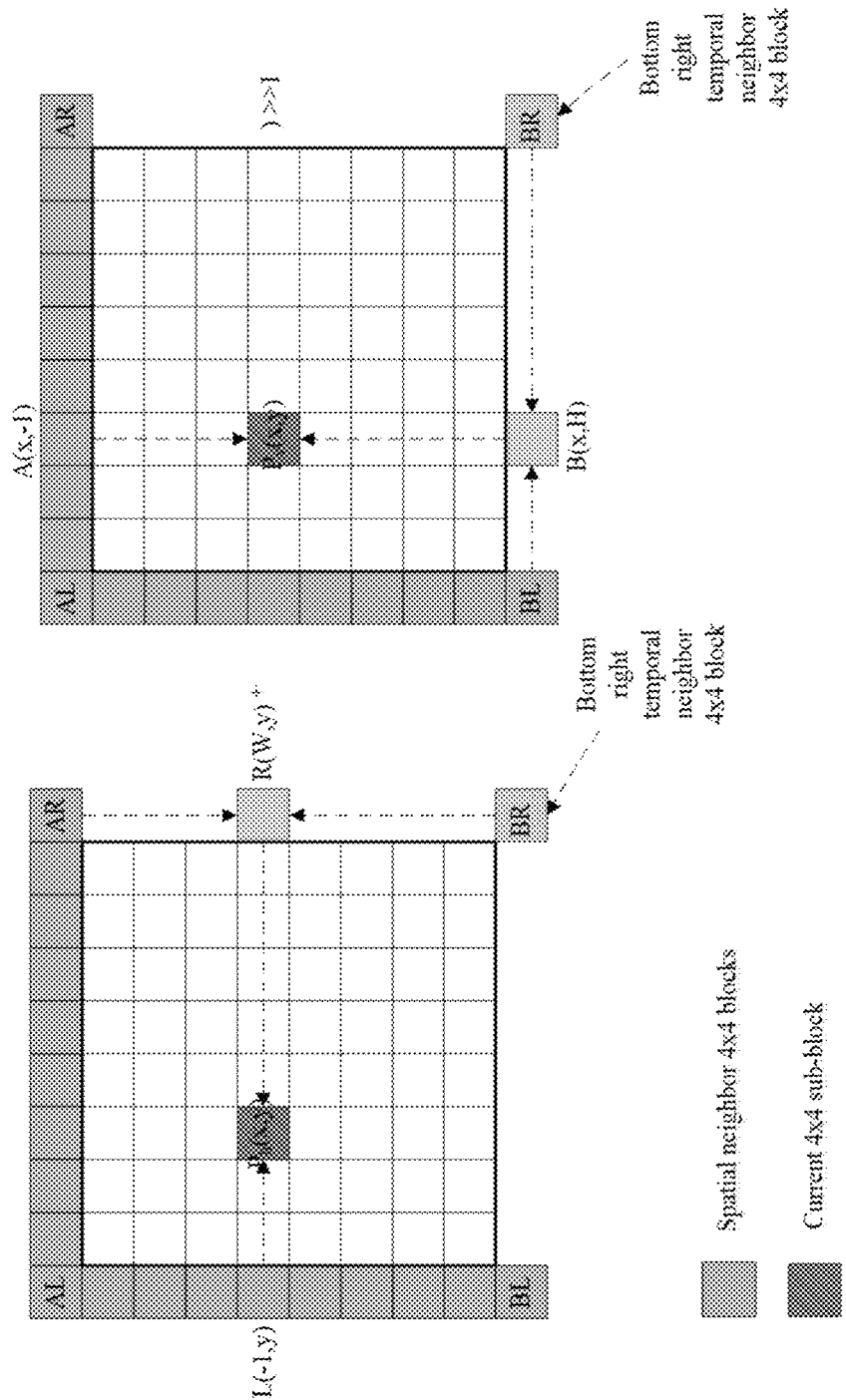
FIG. 27 shows an example of planar motion vector prediction.

To generate a smooth fine granularity motion field, FIG. 27 gives a brief description of the planar motion vector prediction process.

Planar motion vector prediction is achieved by averaging a horizontal and vertical linear interpolation on 4×4 block basis as follows.

$$P(x,y)=(H \times P_h(x,y)+W \times P_v(x,y)+H \times W)/(2 \times H \times W)$$

W and H denote the width and the height of the block. (x,y) is the coordinates of current sub-block relative to the above left corner sub-block. All the distances are denoted by the pixel distances divided by 4. P(x,y) is the motion vector of current sub-block.

The horizontal prediction $P_h(x,y)$ and the vertical prediction $P_v(x,y)$ for location (x,y) are calculated as follows:

$$P_h(x,y)=(W-1-x) \times L(-1,y)+(x+1) \times R(W,y)$$

$$P_v(x,y)=(H-1-y) \times A(x,-1)+(y+1) \times B(x,H)$$

where L(−1, y) and R(W,y) are the motion vectors of the 4×4 blocks to the left and right of the current block. A(x, −1) and B(x,H) are the motion vectors of the 4×4 blocks to the above and bottom of the current block.

The reference motion information of the left column and above row neighbour blocks are derived from the spatial neighbour blocks of current block.

The reference motion information of the right column and bottom row neighbour blocks are derived as follows.

Derive the motion information of the bottom right temporal neighbour 4×4 block

Compute the motion vectors of the right column neighbour 4×4 blocks, using the derived motion information of the bottom right neighbour 4×4 block along with the motion information of the above right neighbour 4×4 block, as described below.

$$R(W,y)=((H-y-1) \times AR+(y+1) \times BR)/H$$

Compute the motion vectors of the bottom row neighbour 4×4 blocks, using the derived motion information of the bottom right neighbour 4×4 block along with the motion information of the bottom left neighbour 4×4 block, as described below.

$$B(x,H)=((W-x-1) \times BL+(x+1) \times BR)/W$$

where AR is the motion vector of the above right spatial neighbour 4×4 block, BR is the motion vector of the bottom right temporal neighbour 4×4 block, and BL is the motion vector of the bottom left spatial neighbour 4×4 block.

The motion information obtained from the neighbouring blocks for each list is scaled to the first reference picture for a given list.

2.3.10 Pairwise-Average Candidates in JVET-K0245

Pairwise average candidates are generated by averaging predefined pairs of candidates in the current merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list; if both MVs are available in one list, the MV with the larger merge index is scaled to the reference picture of the merge candidate with the smaller merge index; if only one MV is available, use the MV directly; if no MV is available, keep this list invalid. The pairwise average candidates replace the combined candidates from HEVC.

3. Examples of Problems Addressed by Embodiments Disclosed Herein

The design of HMVP could bring significant coding gains. However, the complexity is somewhat increased due to the pruning stages:

Stage 1: when inserting a HMVP candidate to the look up table, pruning may be applied to remove identical one in the look up table.

Stage 2: when inserting a HMVP candidate to either AMVP or merge candidate list, the motion vector may need to be compared to available MVs in the AMVP candidate list or the motion information need to be compared to available merge candidates in the merge list.

In yet another example, in HEVC or current VVC design, there is a high probability that the merge list size is not full after checking motion information from spatial or temporal neighbouring blocks. That is, after inserting spatial merge candidates, ATMVP (in VVC), and temporal merge candidates, the probability of inserting combined bi-predictive merge candidates and zero motion vector candidates is still high. Such a situation may be changed after using HMVP candidates.

There are more and more merge candidates (non-subblock STMVP, mv planar) to appear. How to combine them with HMVP is a question to be studied.

When general bi-prediction is enabled, how to cooperate with HMVP candidates is unknown.

4. Some Examples

The examples below should be considered as examples to explain general concepts. These examples should not be interpreted in a narrow way. Furthermore, these examples can be combined in any manner.

Technique 1: Complexity Reduction of HMVP

1. It is proposed that when a block is coded with uni-prediction, there is no need to update the look-up table for HMVP candidates.
    a. When a block is coded with bi-prediction, the associated motion information may be added to the look-up table as an additional HMVP candidate.
    b. Alternatively, even one block is coded with uni-prediction, if it is coded with multi-hypothesis (e.g., more than one reference picture is used for motion compensation), such motion information may also be used to update the look-up table.
2. It is proposed that when a block is coded with the generalized bi-prediction mode, only the motion information (reference picture information, motion vectors) may be stored in the look-up table.
  a. In one example, the associated weights (i.e., $w_1$) are not stored and inferred to be ½.
  b. In one example, the associated weights (i.e., $w_1$) are not stored and inferred to be $(1<<(\text{shiftNum}_{GBi}-1))$.
  c. Alternatively, the associated weights may be also stored in the look-up table. In this case, for a HMVP candidate, it will also include the weight information.
3. It is proposed to reduce the number of pairs to be checked for generating combined bi-predictive merge candidates.
  a. The number of pairs to be checked is reduced from 12 to N wherein N is a integer value.
  b. In one example, the number of pairs to be checked is set equal to $(m*(m-1))$ wherein m is smaller than 4.
  c. In one example, the number of pairs to be checked is dependent on how many merge candidates are available before adding the combined bi-predictive merge candidate.
4. It is proposed that HMVP candidates stored in the look-up table are associated with lower precisions of motion vectors.
  a. If we denote the MV storage precision in the decoder picture buffer by K bits (e.g., 16 bits in HEVC), the precision of MVs stored in the look up table is set to L wherein L is smaller than K (e.g., L is 8, 10, 12, 14).
  b. In this case, when the motion information of HMVP candidate is compared to other motion candidates, the motion vector precisions may need firstly to be aligned.
    i. In one example, the MVs of HMVP candidates may be scaled by $(1<<(K-L))$.
5. It is proposed that only motion vectors referring to certain reference pictures, such as the reference picture with reference index equal to 0 of each reference list are added into the lookup table. In this case, there is no need to store the reference picture information (e.g., reference picture index is not stored)
  a. Alternatively, a motion vector not referring to certain reference pictures is scaled to the reference pictures before being put into the lookup table.
  b. The 'certain reference picture' may be pre-defined. Alternatively, index of the 'certain reference pictures' may be signaled.
6. In one example, one or more hash tables are used to do the pruning between candidates.

Technique 2: Further Coding Performance of HMVP
7. Combined bi-predictive merge candidates may be generated from certain type of merge candidates. For the other types of merge candidates, it is disallowed to be used to generate combined bi-predictive merge candidates.
  a. In one example, the HMVP candidates are not allowed to be used for Combined bi-predictive merge candidates generation.
  b. In one example, the sub-block motion candidates (e.g., ATMVP) are not allowed to be used for Combined bi-predictive merge candidates generation.
8. When HMVP is associated with weights information (e.g., GBI is enabled), multiple merge candidates may be generated from one HMVP candidate.
  a. In one example, the HMVP candidate may be directly added as a merge candidate after potential pruning operations.
  b. In one example, the same motion information of the HMVP candidate may be used, and different weight may be assigned.
  c. How many merge candidates (e.g., with different weights) generated from one HMVP candidate may depend on the number of allowed weights.
  d. How many merge candidates (e.g., with different weights) generated from one HMVP candidate may depend on the weight associated with the HMVP candidate.
    i. In one example, up to two candidates may be generated, one is with the exact weight associated with the HMVP candidate, and the other one is with the equal weight for two reference picture lists.
  e. How many merge candidates (e.g., with different weights) generated from one HMVP candidate may depend on the number of available motion candidates before adding HMVP.
9. When STMVP (either sub-block based or non-sub block based) is enabled, HMVP candidates may be added after STMVP.
  a. Alternatively, HMVP candidates may be added before STMVP.
  b. Alternatively, HMVP candidates may be added in an interleaved way with STMVP, e.g, partial of HMVP candidates may be added before STMVP and partial of HMVP may be added after STMVP.
10. When pairwise-average candidates (PAC) is enabled, HMVP candidates may be added before PAC.
  a. Alternatively, HMVP candidates may be added before PAC.
  b. Alternatively, HMVP candidates may be added in an interleaved way with PAC, e.g., partial of HMVP candidates may be added before PAC and partial of HMVP may be added after PAC or one HMVP and one PAC, and so on; or one PAC and one HMVP, and so on.
  c. In one example, HMVP candidates may not be allowed to derive PAC.
11. When affine motion candidates are put in a different candidate list (different from the conventional merge candidate list), the HMVP candidate may be added after affine motion candidates directly associated with neighbouring blocks.
  a. Alternatively, HMVP candidates may be added after affine motion candidates generated from neighbouring blocks.
  b. Alternatively, HMVP candidates may be added right before the default affine motion candidates (e.g., zero motion candidates).
  c. Alternatively, HMVP candidates may be added in an interleaved way, e.g., some are before affine motion candidates, some are after.
  d. HMVP candidates may be added to the affine motion candidate list in a flexible way, i.e., different from block to block.

5. Additional Examples of Embodiments

Embodiment #1

Figure 31:
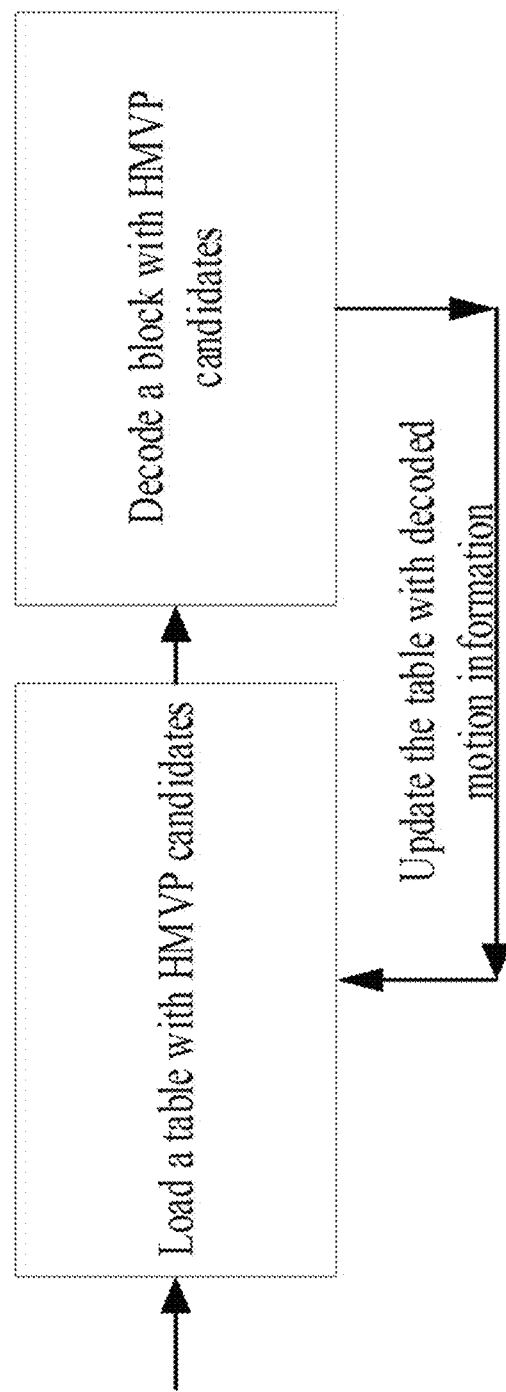
FIG. 31 shows an example of a decoding flow chart with the proposed HMVP (history based motion vector predictor) method.

A history-based MVP (HMVP) method is proposed wherein a HMVP candidate is defined as the motion information of a previously coded block. A table with multiple HMVP candidates is maintained during the encoding/decoding process. The table is emptied when a new slice is encountered. Whenever there is an inter-coded non-affine block, the associated motion information is added to the last entry of the table as a new HMVP candidate. The overall coding flow is depicted in FIG. 31.

Figure 32:
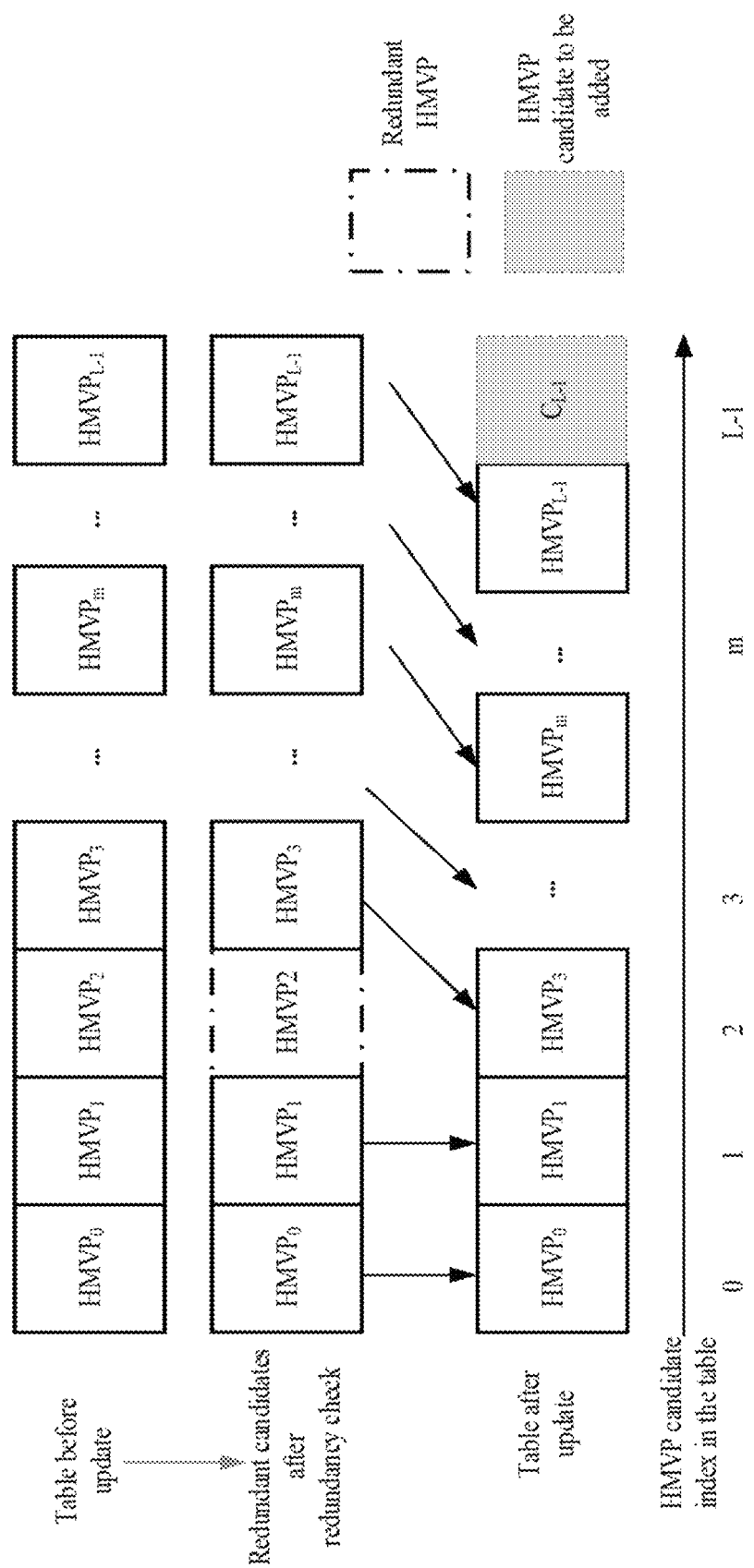
FIG. 32 shows examples of updating tables using an example HMVP method.

FIG. 32 shows an example implementation of HMVP table updating. The table size S is set to be 6, which indicates up to 6 HMVP candidates may be added to the table. When inserting a new motion candidate to the table, a constraint FIFO rule is utilized wherein redundancy check is firstly applied to find whether there is an identical HMVP in the table. If found, the identical HMVP is removed from the table and all the HMVP candidates afterwards are moved, i.e., with indices reduced by 1.

HMVP candidates could be used in the merge candidate list construction process. The latest several HMVP candidates in the table are checked in order and inserted to the candidate list after the TMVP candidate. Pruning is applied on the HMVP candidates to the spatial or temporal merge candidate excluding sub-block motion candidate (i.e., ATMVP).

To reduce the number of pruning operations, three simplifications are introduced:
1) Number of HMPV candidates to be check denoted by L is set as follows:
   L=(N<=4)?M: (8−N)
wherein N indicates number of available non-sub block merge candidate and M indicates number of available HMVP candidates in the table.
2) In addition, once the total number of available merge candidates reaches the signaled maximally allowed merge candidates minus 1, the merge candidate list construction process is terminated.
3) Moreover, the number of pairs for combined bi-predictive merge candidate derivation is reduced from 12 to 6.

Similarly, HMVP candidates could also be used in the AMVP candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates. In this contribution, K is set to 4.

Embodiment #2

Some examples of the merge list derivation process is given as follows:
1) Spatial merge candidates+ATMVP (ATMVP may be inserted interleaved with spatial merge candidates)→TMVP→HMVP→others (e.g., combined bi-predictive merge candidates, zero motion vector candidates)
2) Spatial merge candidates+ATMVP+STMVP (ATMVP and STMVP may be inserted interleaved with spatial merge candidates, STMVP may be inserted right or before after TMVP)→TMVP→HMVP→others (e.g., combined bi-predictive merge candidates, zero motion vector candidates)
3) Spatial merge candidates+ATMVP (ATMVP may be inserted interleaved with spatial merge candidates)→TMVP→HMVP→pairwise-average candidates→others (e.g., combined bi-predictive merge candidates, zero motion vector candidates)
4) Spatial merge candidates+ATMVP (ATMVP may be inserted interleaved with spatial merge candidates)→TMVP→pairwise-average candidates→HMVP→others (e.g., combined bi-predictive merge candidates, zero motion vector candidates)
5) Spatial merge candidates+ATMVP+STMVP (ATMVP and STMVP may be inserted interleaved with spatial merge candidates, STMVP may be inserted right or before after TMVP)→TMVP→HMVP→pairwise-average candidates→others (e.g., combined bi-predictive merge candidates, zero motion vector candidates)

Figure 28:
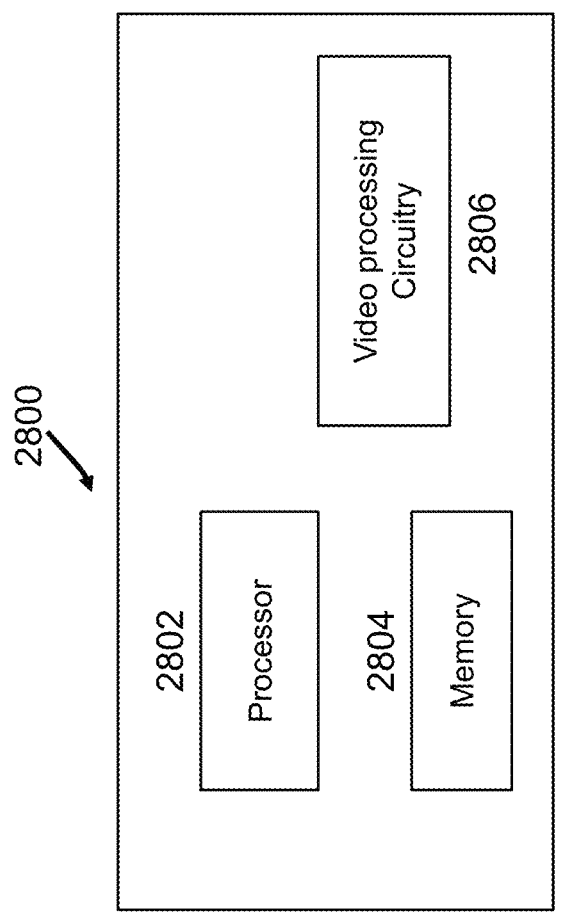
FIG. 28 is a block diagram of an example of a hardware platform for implementing a visual media decoding or a visual media encoding technique described in the present document.

FIG. 28 is a block diagram of a video processing apparatus 2800. The apparatus 2800 may be used to implement one or more of the methods described herein. The apparatus 2800 may be embodied in a smartphone, tablet, computer, Internet of Things (IoT) receiver, and so on. The apparatus 2800 may include one or more processors 2802, one or more memories 2804 and video processing hardware 2806. The processor(s) 2802 may be configured to implement one or more methods described in the present document. The memory (memories) 2804 may be used for storing data and code used for implementing the methods and techniques described herein. The video processing hardware 2806 may be used to implement, in hardware circuitry, some techniques described in the present document.

Figure 29:
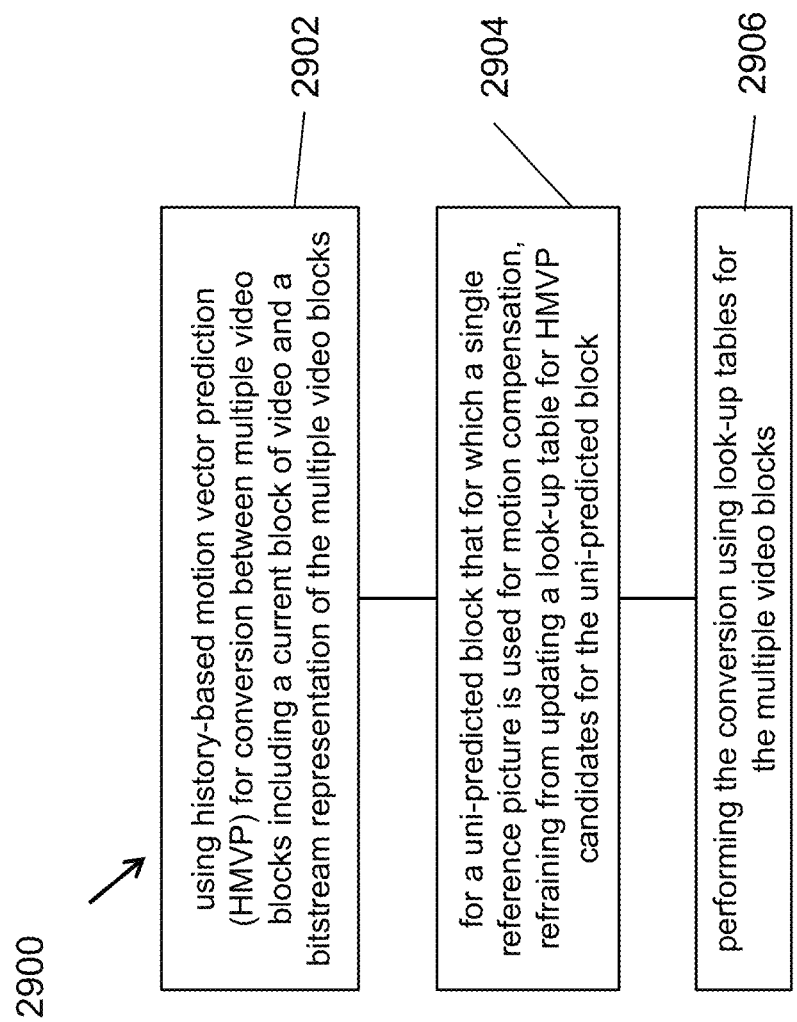
FIG. 29 is a flowchart for an example method of video bitstream processing.

FIG. 29 shows a flowchart for an example method 2900 of video processing. The method 2900 includes using (2902) history-based motion vector prediction (HMVP) for conversion between multiple video blocks including a current block of video and a bitstream representation of the multiple video blocks such that for a uni-predicted block that for which a single reference picture is used for motion compensation, refraining (2904) from updating a look-up table for HMVP candidates for the uni-predicted block, and performing (2906) the conversion using look-up tables for the multiple video blocks.

Figure 30:
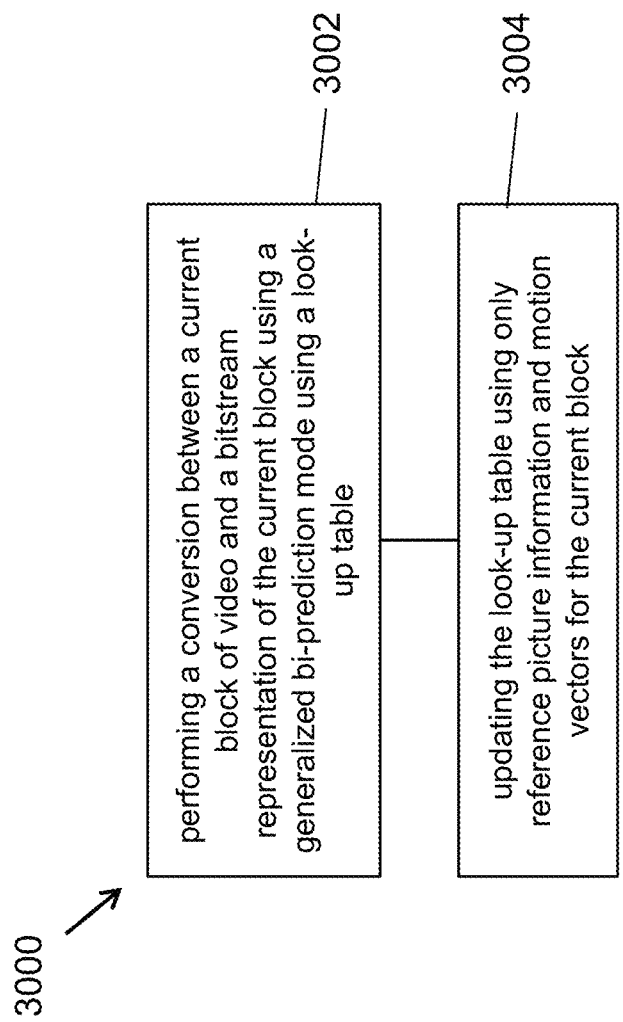
FIG. 30 is a flowchart for another example method of video bitstream processing.

FIG. 30 shows a flowchart for an example method 3000 of video processing. The method 3000 includes performing (3002) a conversion between a current block of video and a bitstream representation of the current block using a generalized bi-prediction mode using a look-up table, and updating (3004) the look-up table using only reference picture information and motion vectors for the current block.

Figure 33:
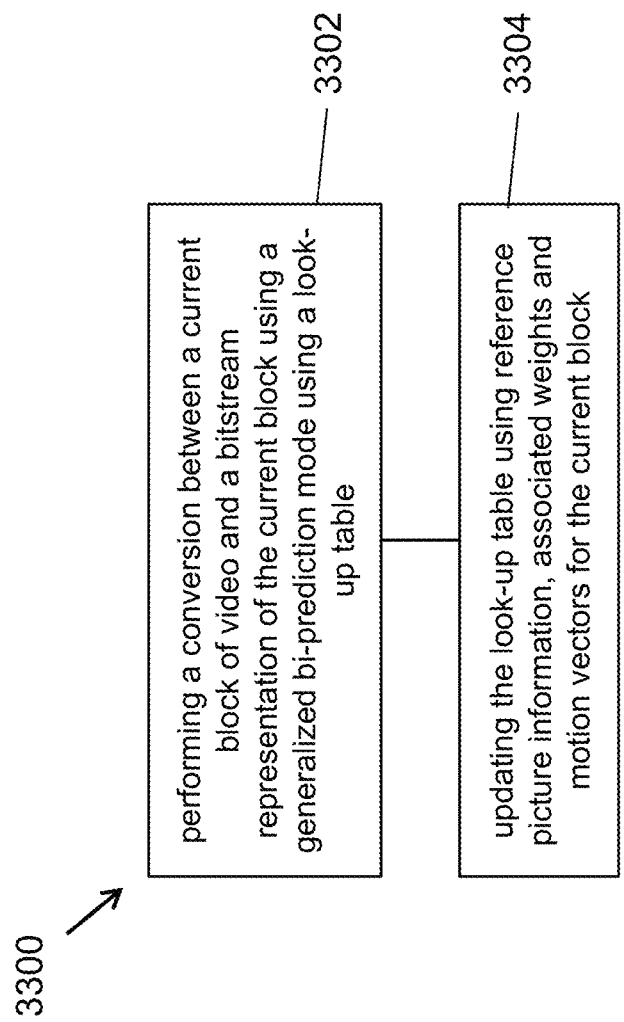
FIG. 33 is a flowchart for an example method of video processing.

FIG. 33 is a flowchart for an example method 3300 of video processing. The method 3300 includes performing (3302) a conversion between a current block of video and a bitstream representation of the current block using a generalized bi-prediction mode using a look-up table, and updating (3304) the look-up table using reference picture information, associated weights and motion vectors for the current block. Here, a history-based motion vector prediction candidate of the current block also uses the associated weights.

Another example video processing method includes performing a conversion between a current block of video and a bitstream representation of the current block using a history-based motion vector prediction look-up table in which a combined bi-predictive merge candidate is generated by comparing N number of pairs of motion vectors, where N is less than 12.

Figure 34:
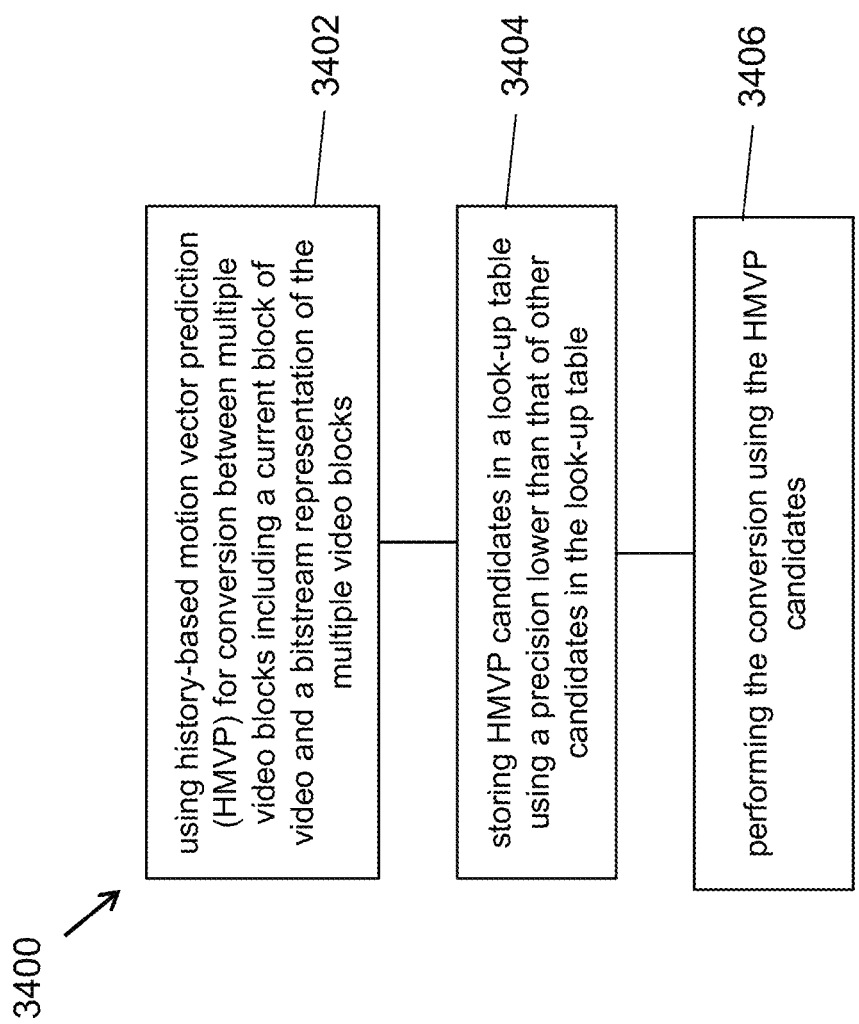
FIG. 34 is a flowchart for an example method of video processing.

FIG. 34 is a flowchart for an example method 3400 of video processing. The method 3400 includes using (3402) history-based motion vector prediction (HMVP) for conversion between multiple video blocks including a current block of video and a bitstream representation of the multiple video blocks, storing (3404) HMVP candidates in a look-up table using a precision lower than that of other candidates in the look-up table, and performing (3406) the conversion using the HMVP candidates.

Figure 35:
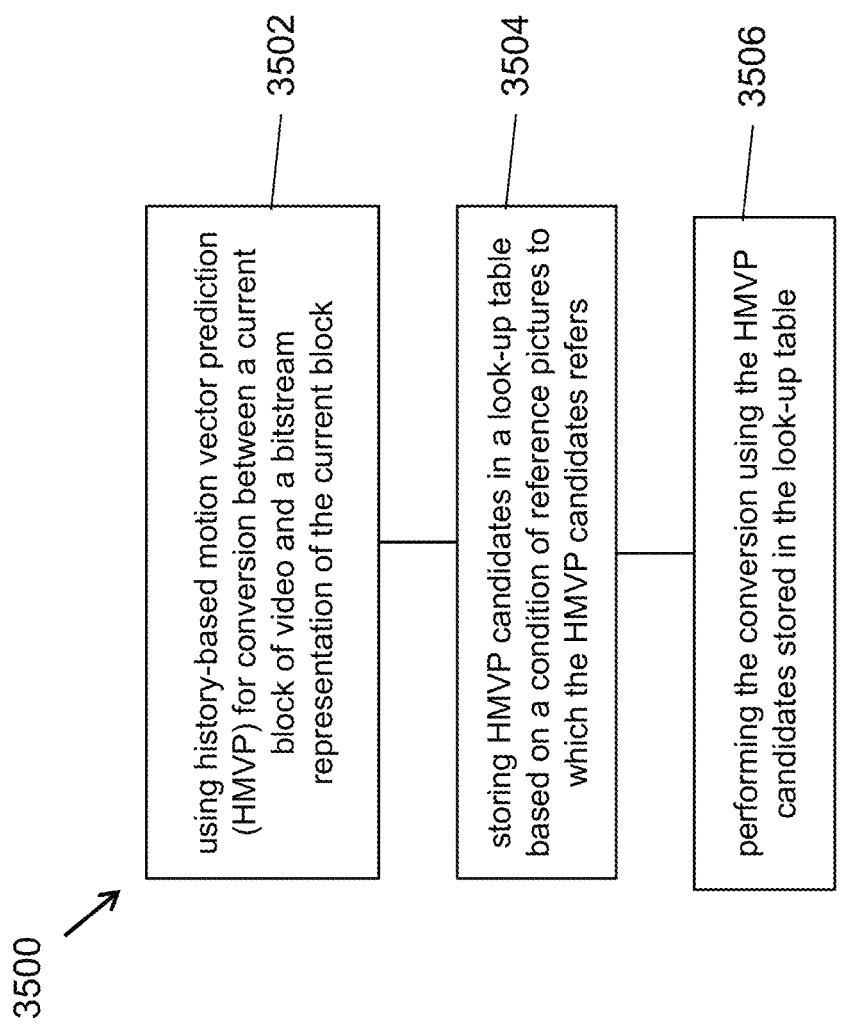
FIG. 35 is a flowchart for an example method of video processing.

FIG. 35 shows a flowchart for an example method 3500 of video processing. The method 3500 includes using (3502) history-based motion vector prediction (HMVP) for conversion between a current block of video and a bitstream representation of the current block, storing (3504) HMVP candidates in a look-up table based on a condition of reference pictures to which the HMVP candidates refers, and performing (3506) the conversion using the HMVP candidates stored in the look-up table.

The above-described, and other, techniques may be described using the following clause-based description.

1. A method of video processing, comprising: using history-based motion vector prediction (HMVP) for conversion between multiple video blocks including a current block of video and a bitstream representation of the multiple video blocks such that: for a uni-predicted block that for which a single reference picture is used for motion compensation, refraining from updating a look-up table for HMVP candidates for the uni-predicted block; and performing the conversion using look-up tables for the multiple video blocks. For example, uni-predicted blocks may be compressed using a prediction that is based on a single direction of prediction.

2. The method of clause 1, further including: for a bi-predicted block, a corresponding motion information is added to a look-up table for the bi-predicted block as an additional HMVP candidate. For example, bi-predicted blocks may be predicted using reference pictures in two temporal directions (before and after).

3. The method of clause 1 or 2, further including: for a uni-predicted block for which multiple reference pictures are used for motion compensation, updating a corresponding lookup table with motion information thereof.

4. A method of video processing, comprising: performing a conversion between a current block of video and a bitstream representation of the current block using a generalized bi-prediction mode using a look-up table; and updating the look-up table using only reference picture information and motion vectors for the current block.

5. The method of clause 4, further including using a pre-determined value of ½ for weights corresponding to the reference pictures referred in the reference picture information.

6. The method of clause 4, further including using weights that are inherited from coding of other blocks in the bitstream representation.

7. A method of video processing, comprising: performing a conversion between a current block of video and a bitstream representation of the current block using a generalized bi-prediction mode using a look-up table; and updating the look-up table using reference picture information, associated weights and motion vectors for the current block; wherein a history-based motion vector prediction candidate of the current block also uses the associated weights.

8. A method of video processing, comprising: performing a conversion between a current block of video and a bitstream representation of the current block using a history-based motion vector prediction look-up table in which a combined bi-predictive merge candidate is generated by comparing N number of pairs of motion vectors, where N is less than 12.

9. The method of clause 8, wherein N is equal to m*(m−1) where m is an integer smaller than 4.

10. The method of clause 8, wherein N is dependent on a number of available merge candidates prior to adding the combined bi-predictive merge candidate to the look-up table.

11. A method of video processing, comprising: using history-based motion vector prediction (HMVP) for conversion between multiple video blocks including a current block of video and a bitstream representation of the multiple video blocks; storing HMVP candidates in a look-up table using a precision lower than that of other candidates in the look-up table; and performing the conversion using the HMVP candidates.

12. The method of clause 11, further including: comparing the HMVP candidates with the other candidates by scaling the HMVP candidates prior to the comparing.

13. A method of video processing, comprising: using history-based motion vector prediction (HMVP) for conversion between a current block of video and a bitstream representation of the current block; storing HMVP candidates in a look-up table based on a condition of reference pictures to which the HMVP candidates refer to; and performing the conversion using the HMVP candidates stored in the look-up table.

14. The method of clause 13, wherein only HMVP candidates referring to certain reference pictures are stored in the look-up table, thereby avoiding having to store reference picture index information in the look-up table.

15. The method of clause 14, wherein the certain reference pictures are pre-defined or signaled in the bitstream representation.

16. The method of clause 13, further including, scaling HMVP candidates prior to storing in the look-up table.

17. The method of any of clauses 1 to 16, wherein pruning of candidates uses hash table based pruning.

18. The method of any of clauses 1 to 17, wherein the conversion further uses combined bi-predictive merge candidates that are generated using only a certain type of merge candidates.

19. The method of clause 18, wherein the certain type of merge candidates excludes HMVP candidates.

20. The method of clause 18, wherein the certain type of merge candidates excludes advanced temporal motion vector predictors.

21. The method of clause 18, wherein HMVP candidates that have associated weights information are used to generate multiple merge candidates.

22. The method of clause 21, wherein the HMVP candidate is used as a merge candidate for the conversion.

23. The method of clause 21 or 22, wherein a number of merge candidates generated from the HMVP candidate is equal to a number of allowed weights.

24. The method of clauses 1 to 23, wherein HMVP candidates are added to merge lists after adding spatio-temporal motion vector predictors for the current block to the list.

25. The method of clauses 1 to 23, wherein HMVP candidates are added to merge lists by interweaving among spatio-temporal motion vector predictors for the current block to the list.

26. The method of clauses 1 to 23, wherein HMVP candidates are added to merge lists before adding pairwise-average candidates for the current block to the list.

27. The method of clauses 1 to 23, wherein HMVP candidates are added to merge lists by interweaving among pairwise-average candidates for the current block to the list.

28. The method of clauses 1 to 23, wherein the conversion further uses a candidate list of affine motion candidates, and wherein the HMVP candidates are added after affine motion candidates to the candidate list of affine motion candidates.

29. The method of clauses 1 to 23, wherein the conversion further uses a candidate list of affine motion candidates, and wherein the HMVP candidates are added after affine motion candidates that are generated from neigbouring blocks of the current block.

30. The method of clauses 1 to 23, wherein the conversion further uses a candidate list of affine motion candidates, and wherein the HMVP candidates interweaved with affine motion candidates that are generated from neigbouring blocks of the current block.

31. The method of any of clauses 1 to 30, wherein the conversion includes compressing the current block into the bitstream representation.

32. The method of any of clauses 1 to 30, wherein the conversion includes decompressing the bitstream representation into the current block.

33. A video encoder apparatus including a processor configured to implement a method recited in any one or more of clauses 1 to 32.

34. A video decoder apparatus including a processor configured to implement a method recited in any one or more of clauses 1 to 32.

35. A computer-readable medium having code stored thereupon, the code including instructions causing a processor to implement a method recited in any one or more of claims 1 to 32.

Figure 36:
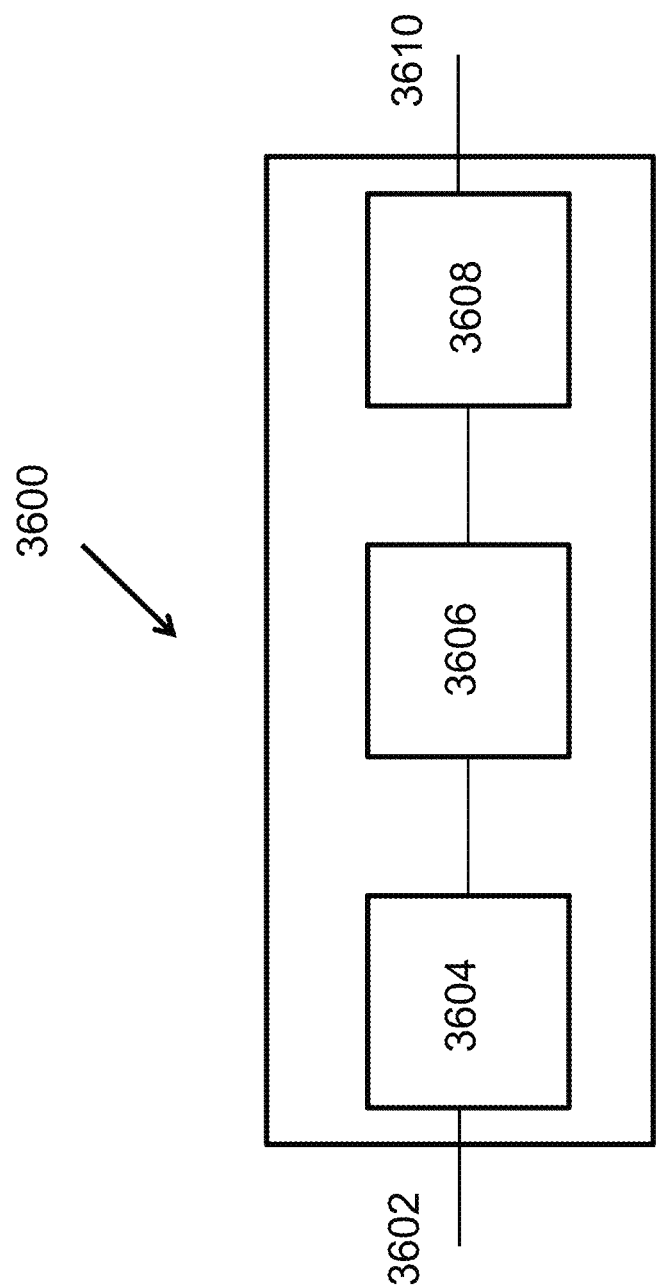
FIG. 36 is a block diagram of an example video processing system in which disclosed techniques may be implemented.

FIG. 36 is a block diagram showing an example video processing system 3600 in which various techniques disclosed herein may be implemented. Various implementations may include some or all of the components of the system 3600. The system 3600 may include input 3602 for receiving video content. The video content may be received in a raw or uncompressed format, e.g., 8 or 10 bit multi-component pixel values, or may be in a compressed or encoded format. The input 3602 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 3600 may include a coding component 3604 that may implement the various coding or encoding methods described in the present document. The coding component 3604 may reduce the average bitrate of video from the input 3602 to the output of the coding component 3604 to produce a coded representation of the video. The coding techniques are therefore sometimes called video compression or video transcoding techniques. The output of the coding component 3604 may be either stored, or transmitted via a communication connected, as represented by the component 3606. The stored or communicated bitstream (or coded) representation of the video received at the input 3602 may be used by the component 3608 for generating pixel values or displayable video that is sent to a display interface 3610. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 37:
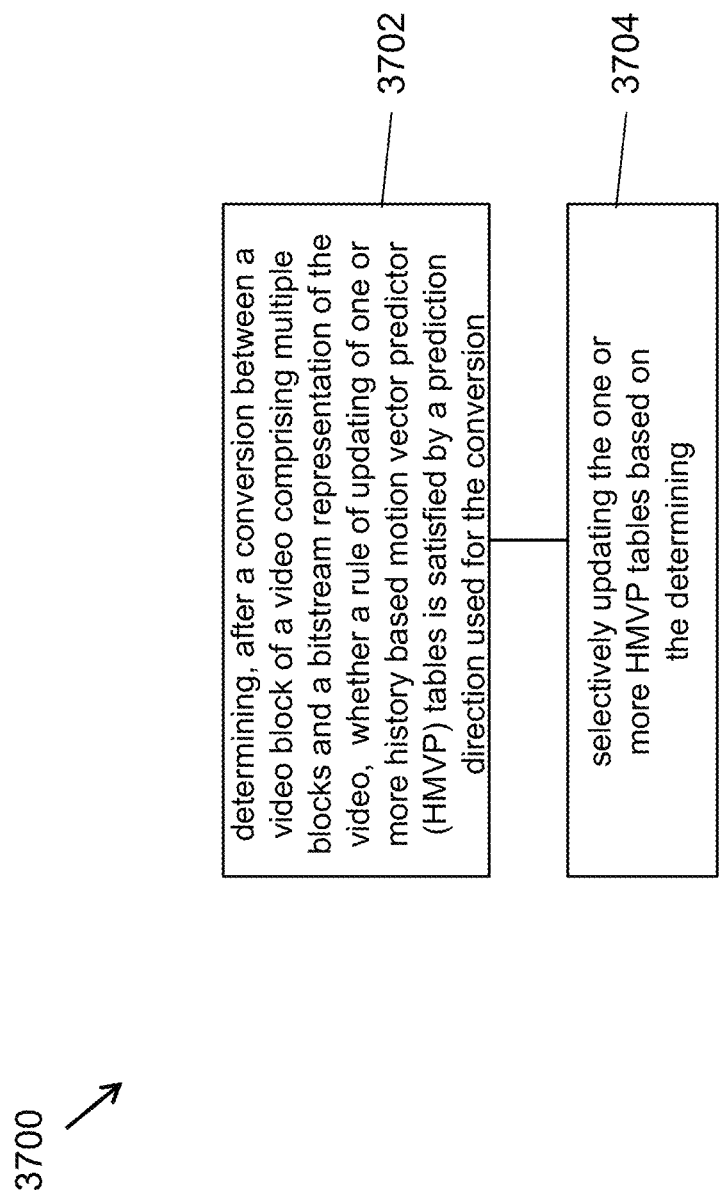
FIG. 37 is a flowchart for an example method of video processing.

FIG. 37 is a flowchart for an example method 3700 of video processing. The steps of this flowchart can be associated with example 1 described in Section 4 of this document. The method 3700 includes determining (3702), after a conversion between a video block of a video comprising multiple blocks and a bitstream representation of the video, whether a rule of updating of one or more history based motion vector predictor (HMVP) tables is satisfied by a prediction direction used for the conversion; and selectively updating (3704) the one or more HMVP tables based on the determining.

Figure 38:
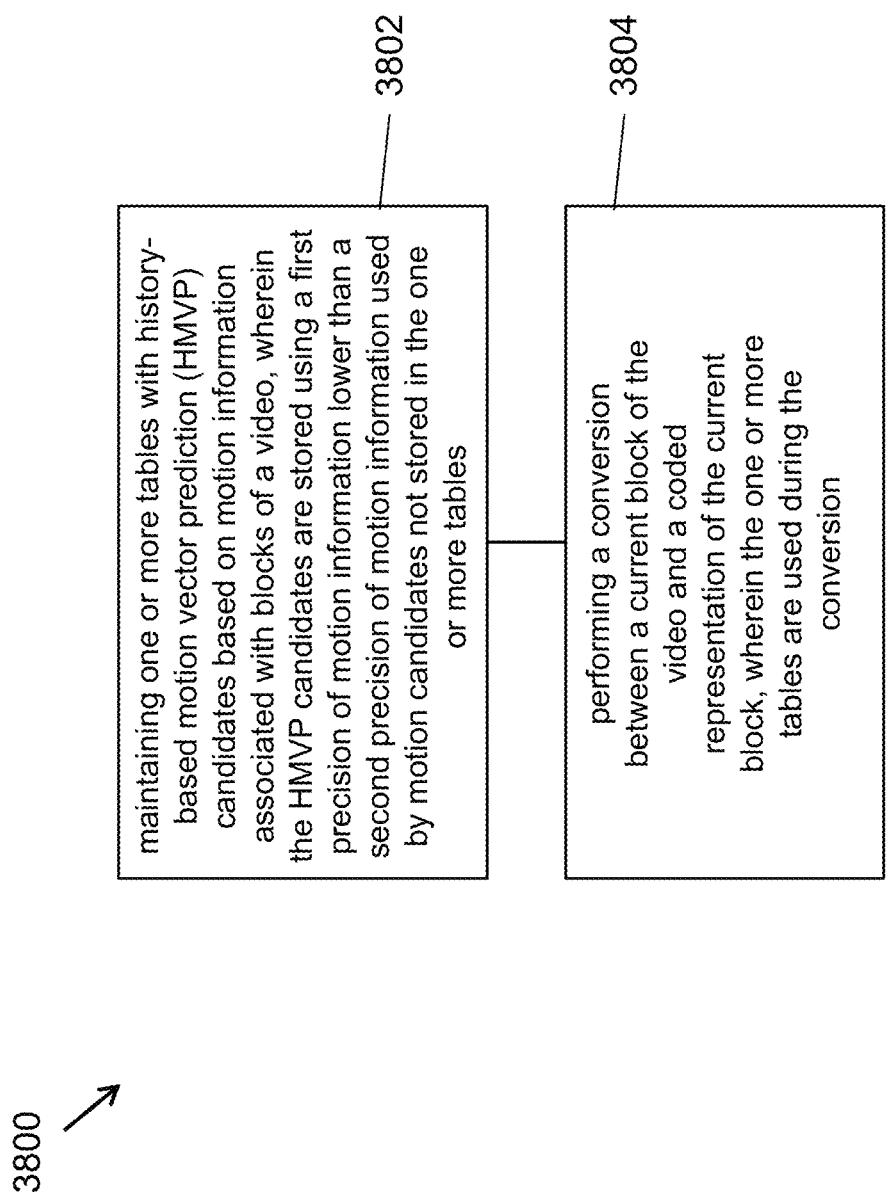
FIG. 38 is a flowchart for an example method of video processing.

FIG. 38 is a flowchart for an example method 3800 of video processing. The steps of this flowchart can be associated with example 4 described in Section 4 of this document. The method 3800 includes maintaining (3802) one or more tables with history-based motion vector prediction (HMVP) candidates based on motion information associated with blocks of a video, wherein the HMVP candidates are stored using a first precision of motion information lower than a second precision of motion information used by motion candidates not stored in the one or more tables and performing (3804) a conversion between a current block of the video and a coded representation of the current block, wherein the one or more tables are used during the conversion.

Figure 39:
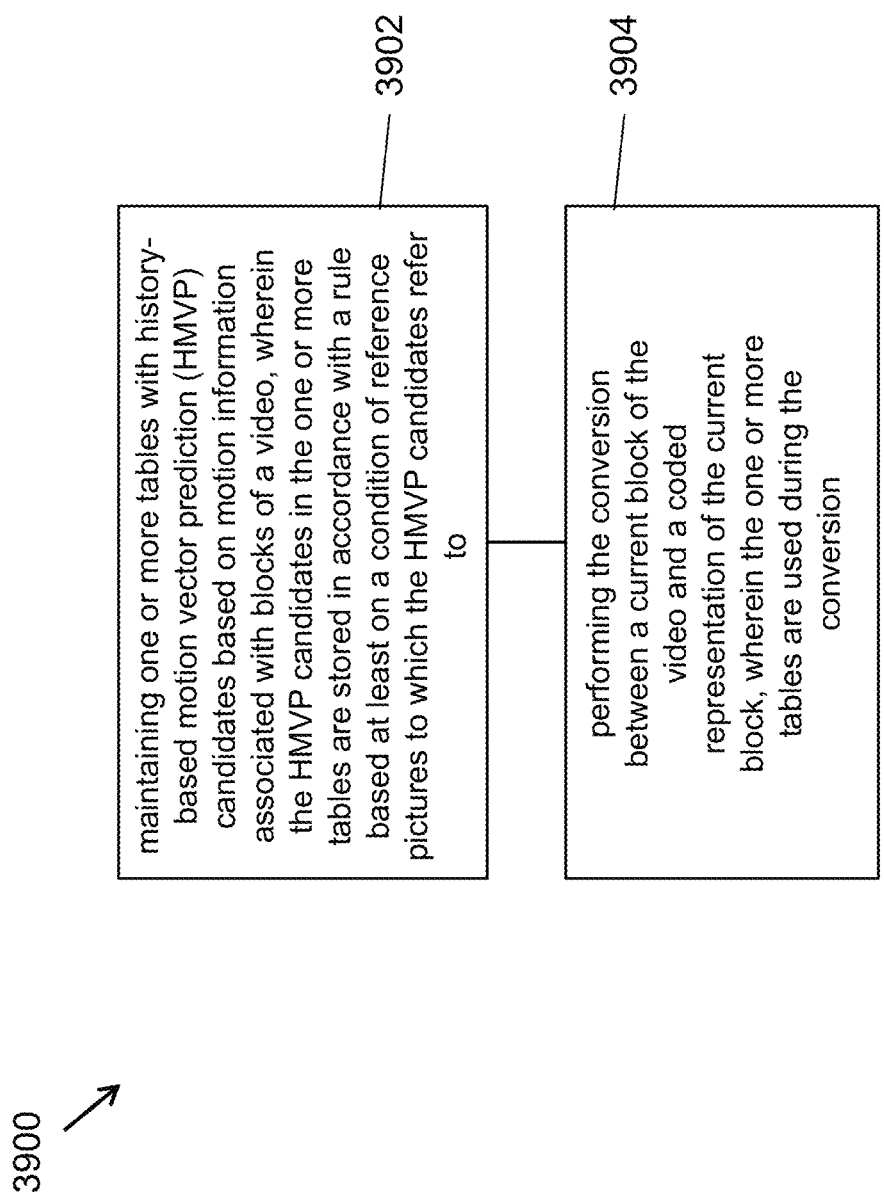
FIG. 39 is a flowchart for an example method of video processing.

FIG. 39 is a flowchart for an example method 3900 of video processing. The steps of this flowchart can be associated with example 5 described in Section 4 of this document. The method 3900 includes maintaining (3902) one or more tables with history-based motion vector prediction (HMVP) candidates based on motion information associated with blocks of a video, wherein the HMVP candidates in the one or more tables are stored in accordance with a rule based at least on a condition of reference pictures to which the HMVP candidates refer to; and performing (3904) the conversion between a current block of the video and a coded representation of the current block, wherein the one or more tables are used during the conversion.

Figure 40:
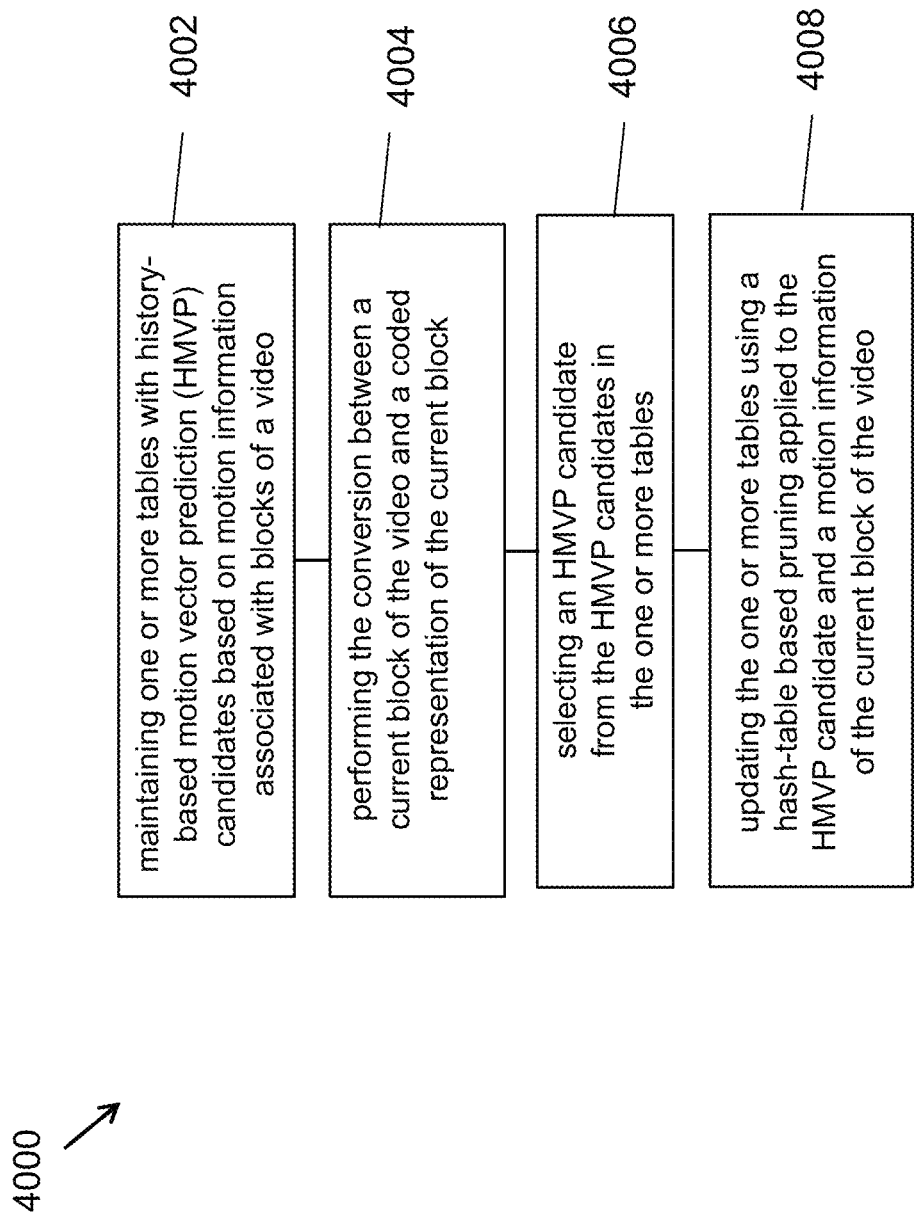
FIG. 40 is a flowchart for an example method of video processing.

FIG. 40 is a flowchart for an example method 4000 of video processing. The steps of this flowchart can be associated with example 6 described in Section 4 of this document. The method 3700 includes maintaining (4002) one or more tables with history-based motion vector prediction (HMVP) candidates based on motion information associated with blocks of a video; performing (4004) the conversion between a current block of the video and a coded representation of the current block; selecting (4006) an HMVP candidate from the HMVP candidates in the one or more tables; updating (4008) the one or more tables using a hash-table based pruning applied to the HMVP candidate and a motion information of the current block of the video.

Figure 41:
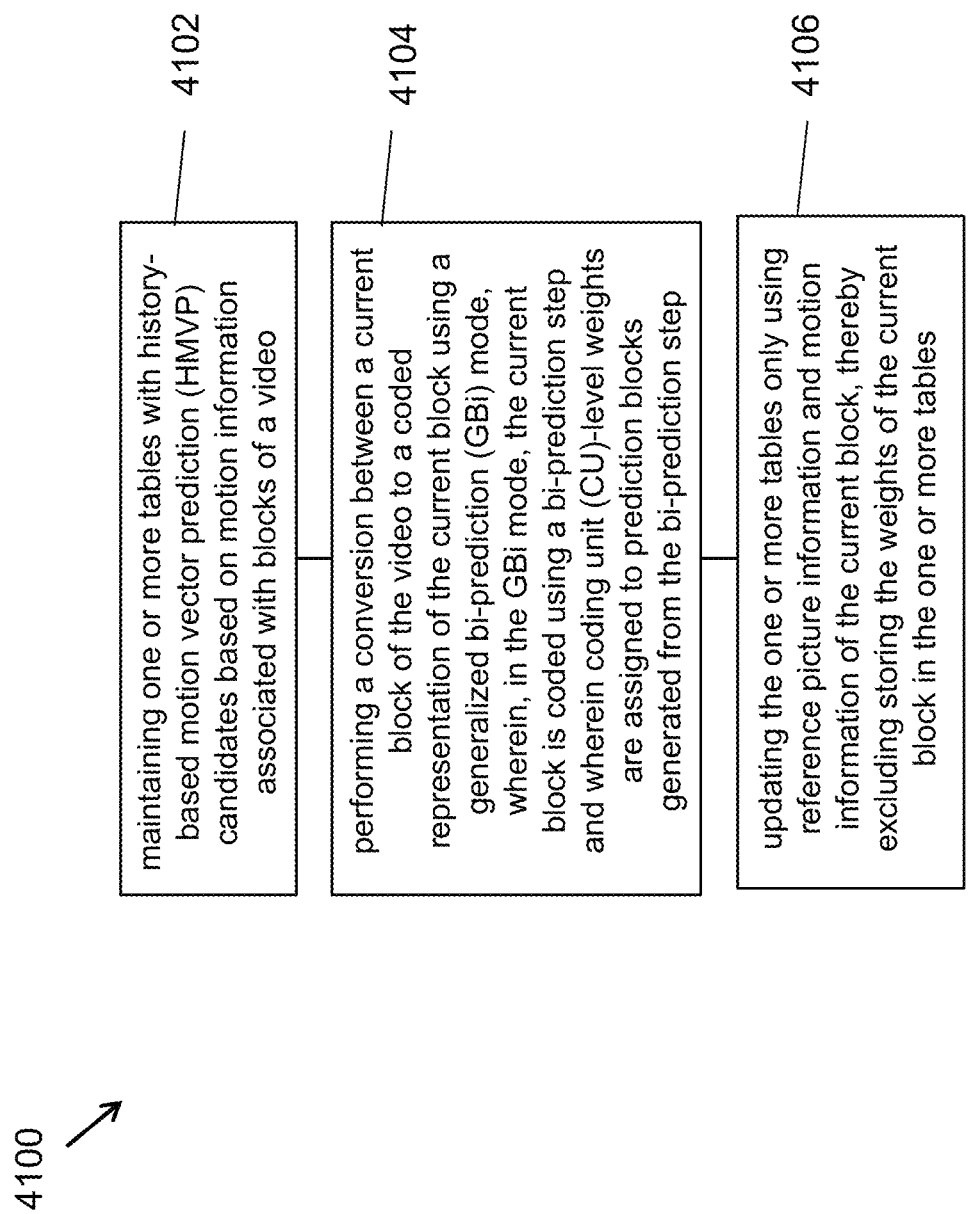
FIG. 41 is a flowchart for an example method of video processing.

FIG. 41 is a flowchart for an example method 4100 of video processing. The steps of this flowchart can be associated with example 2 described in Section 4 of this document. The method 4100 includes maintaining (4102) one or more tables with history-based motion vector prediction (HMVP) candidates based on motion information associated with blocks of a video; performing (4104) a conversion between a current block of the video to a coded representation of the current block using a generalized bi-prediction (GBi) mode, wherein, in the GBi mode, the current block is coded using a bi-prediction step and wherein coding unit (CU)-level weights are assigned to prediction blocks generated from the bi-prediction step; and updating (4106) the one or more tables only using reference picture information and motion information of the current block, thereby excluding storing the weights of the current block in the one or more tables.

Figure 42:
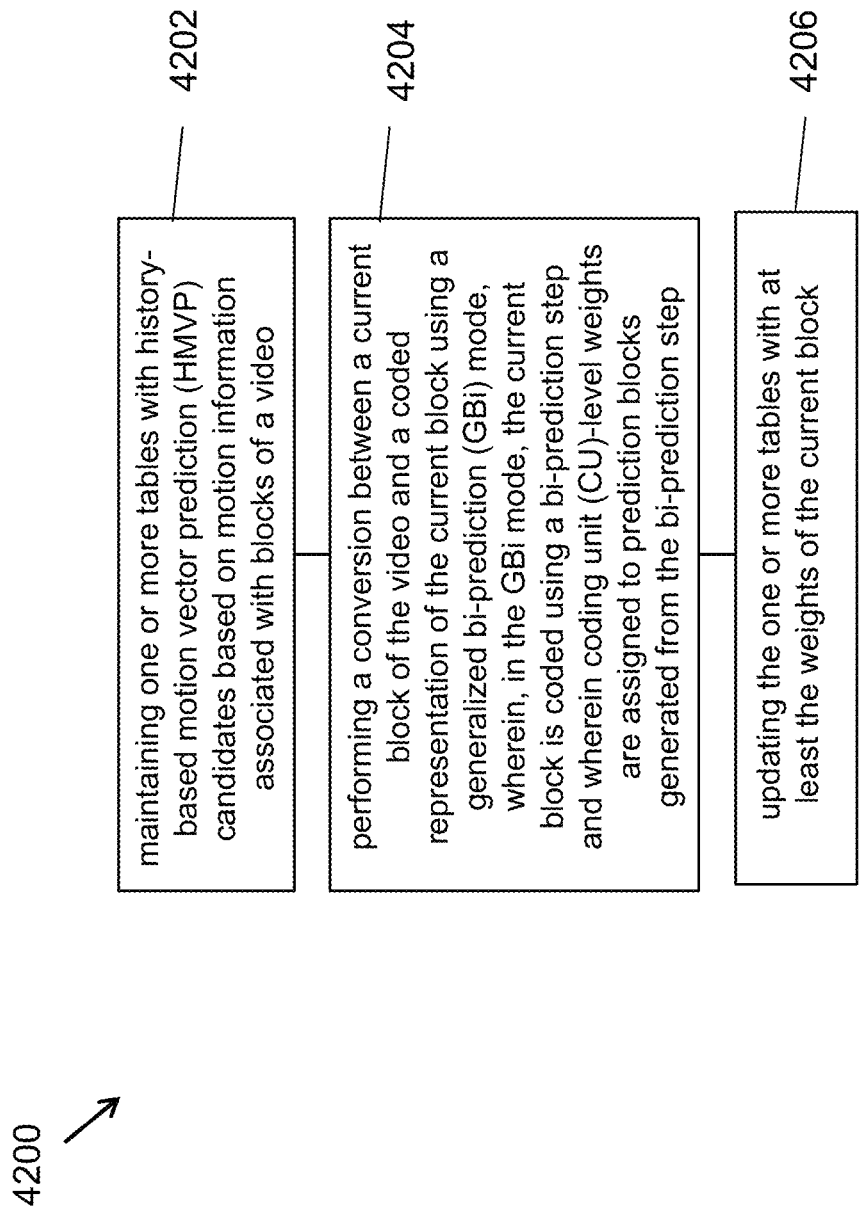
FIG. 42 is a flowchart for an example method of video processing.

FIG. 42 is a flowchart for an example method 4200 of video processing. The steps of this flowchart can be associated with example 2c described in Section 4 of this document. The method 4200 includes maintaining (4202) one or more tables with history-based motion vector prediction (HMVP) candidates based on motion information associated with blocks of a video; performing (4204) a conversion between a current block of the video and a coded representation of the current block using a generalized bi-prediction (GBi) mode, wherein, in the GBi mode, the current block is coded using a bi-prediction step and wherein coding unit (CU)-level weights are assigned to prediction blocks generated from the bi-prediction step; and updating (4206) the one or more tables with at least the weights of the current block.

Figure 43:
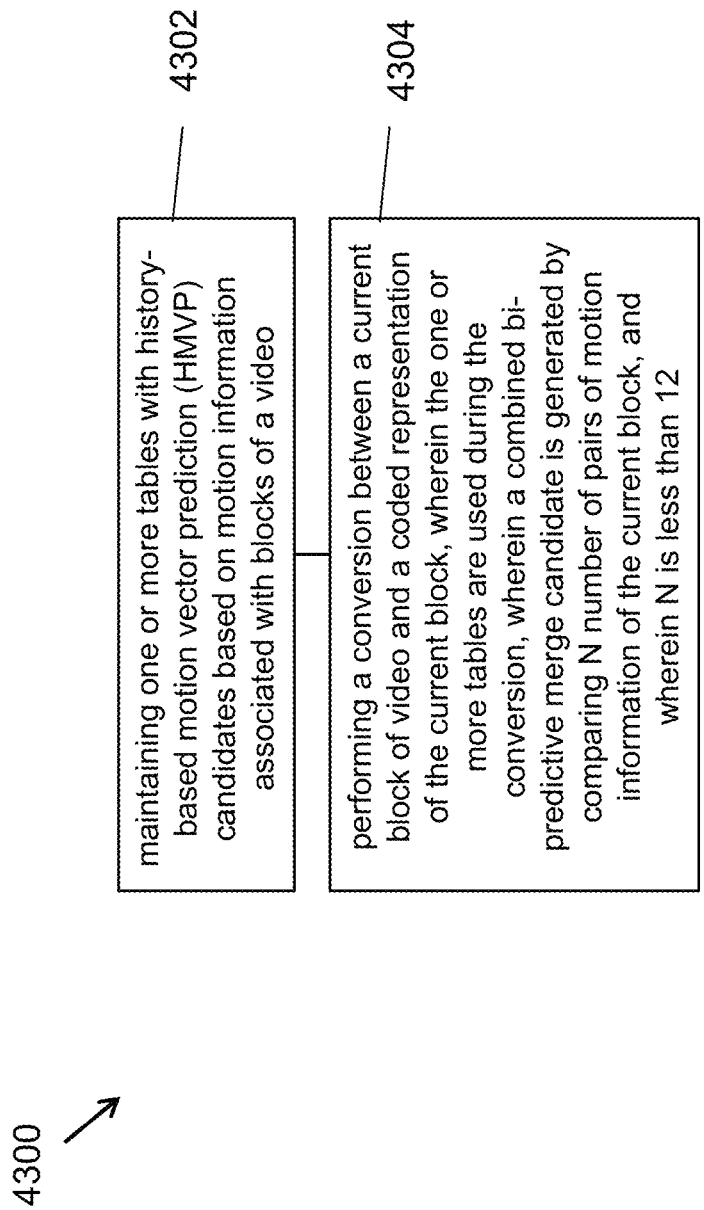
FIG. 43 is a flowchart for an example method of video processing.

FIG. 43 is a flowchart for an example method 4300 of video processing. The steps of this flowchart can be associated with example 3 described in Section 4 of this document. The method 4300 includes maintaining (4302) one or more tables with history-based motion vector prediction (HMVP) candidates based on motion information associated with blocks of a video; and performing (4304) a conversion between a current block of video and a coded representation of the current block, wherein the one or more tables are used during the conversion, wherein a combined bi-predictive merge candidate is generated by comparing N number of pairs of motion information of the current block, and wherein N is less than 12.

Figure 44:
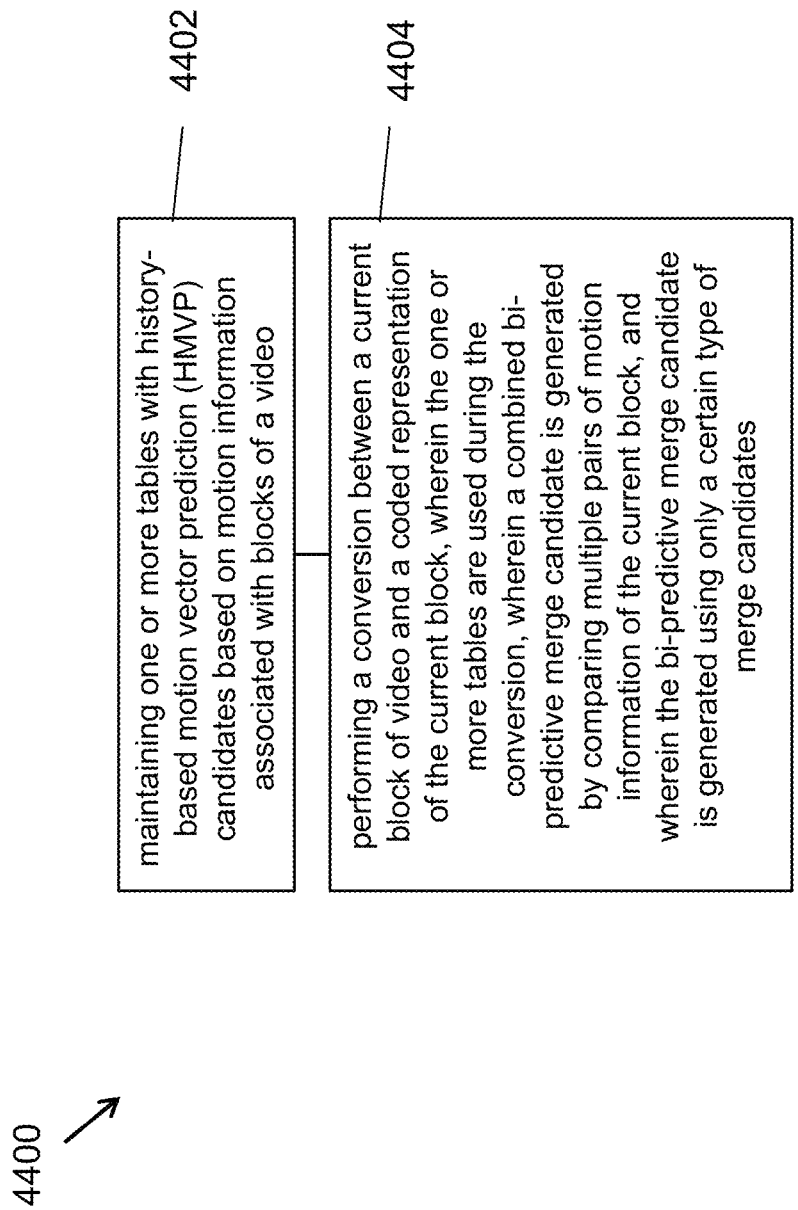
FIG. 44 is a flowchart for an example method of video processing.

FIG. 44 is a flowchart for an example method 4400 of video processing. The steps of this flowchart can be associated with example 7 described in Section 4 of this document. The method 4400 includes maintaining (4402) one or more tables with history-based motion vector prediction (HMVP) candidates based on motion information associated with blocks of a video; and performing (4404) a conversion between a current block of video and a coded representation of the current block, wherein the one or more tables are used during the conversion, wherein a combined bi-predictive merge candidate is generated by comparing multiple pairs of motion information of the current block, and wherein the bi-predictive merge candidate is generated using only a certain type of merge candidates.

Figure 45:
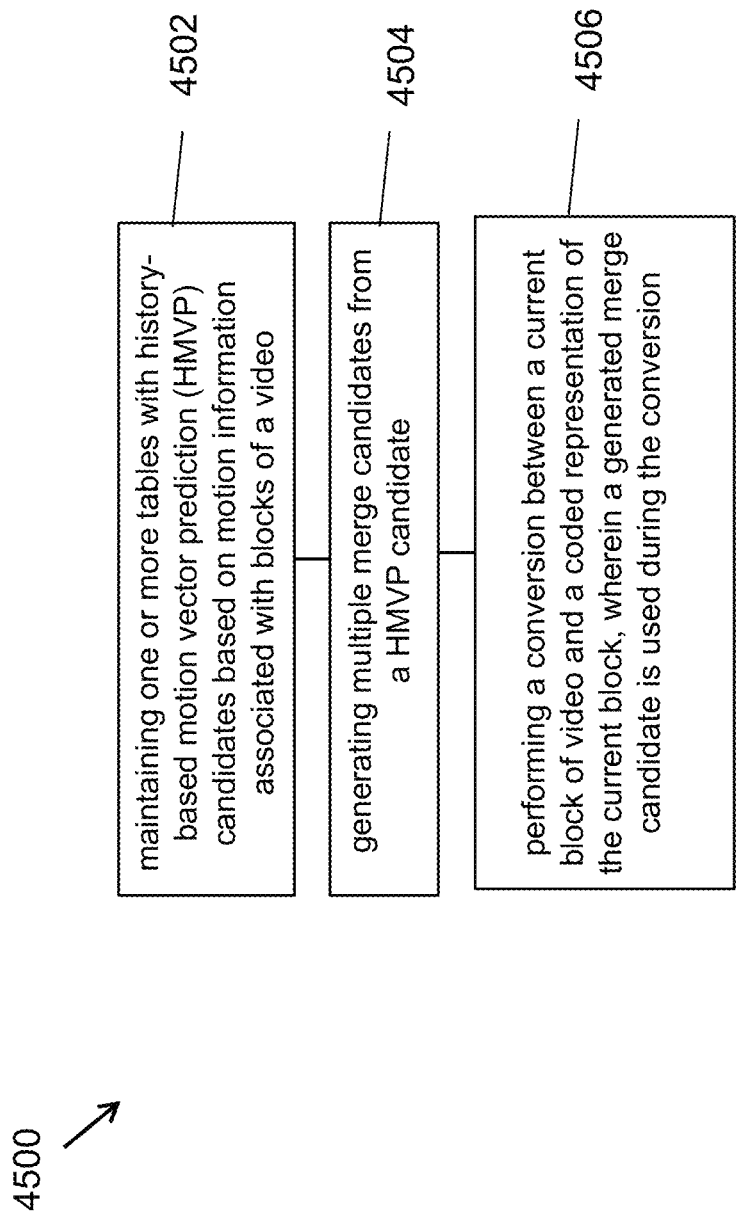
FIG. 45 is a flowchart for an example method of video processing.

FIG. 45 is a flowchart for an example method 4500 of video processing. The steps of this flowchart can be associated with example 8 described in Section 4 of this document. The method 4500 includes maintaining (4502) one or more tables with history-based motion vector prediction (HMVP) candidates based on motion information associated with blocks of a video; generating (4504) multiple merge candidates from a HMVP candidate; and performing (4506) a conversion between a current block of video and a coded representation of the current block, wherein a generated merge candidate is used during the conversion.

Figure 46:
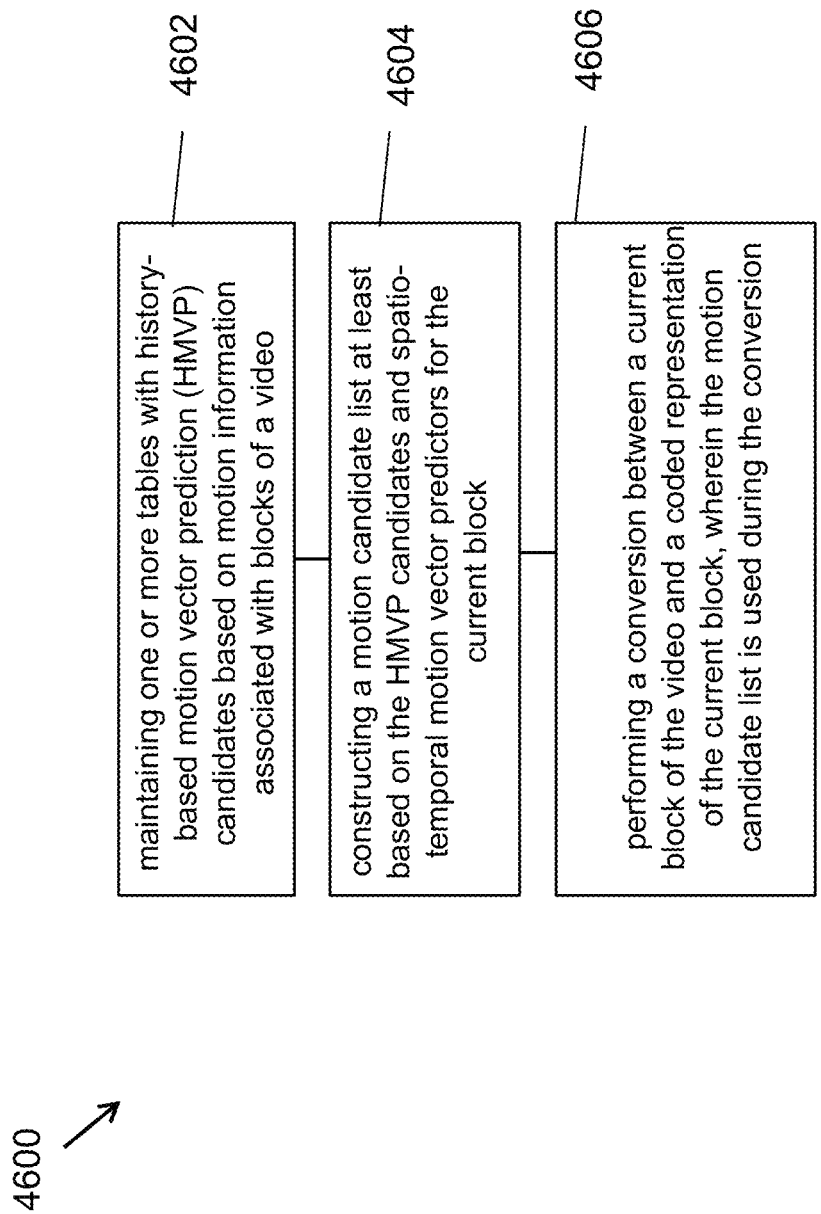
FIG. 46 is a flowchart for an example method of video processing.

FIG. 46 is a flowchart for an example method 4600 of video processing. The steps of this flowchart can be associated with example 9 described in Section 4 of this document. The method 4600 includes maintaining (4602) one or more tables with history-based motion vector prediction (HMVP) candidates based on motion information associated with blocks of a video; constructing (4604) a motion candidate list at least based on the HMVP candidates and spatio-temporal motion vector predictors for the current block; and performing (4606) a conversion between a current block of the video and a coded representation of the current block, wherein the motion candidate list is used during the conversion.

Figure 47:
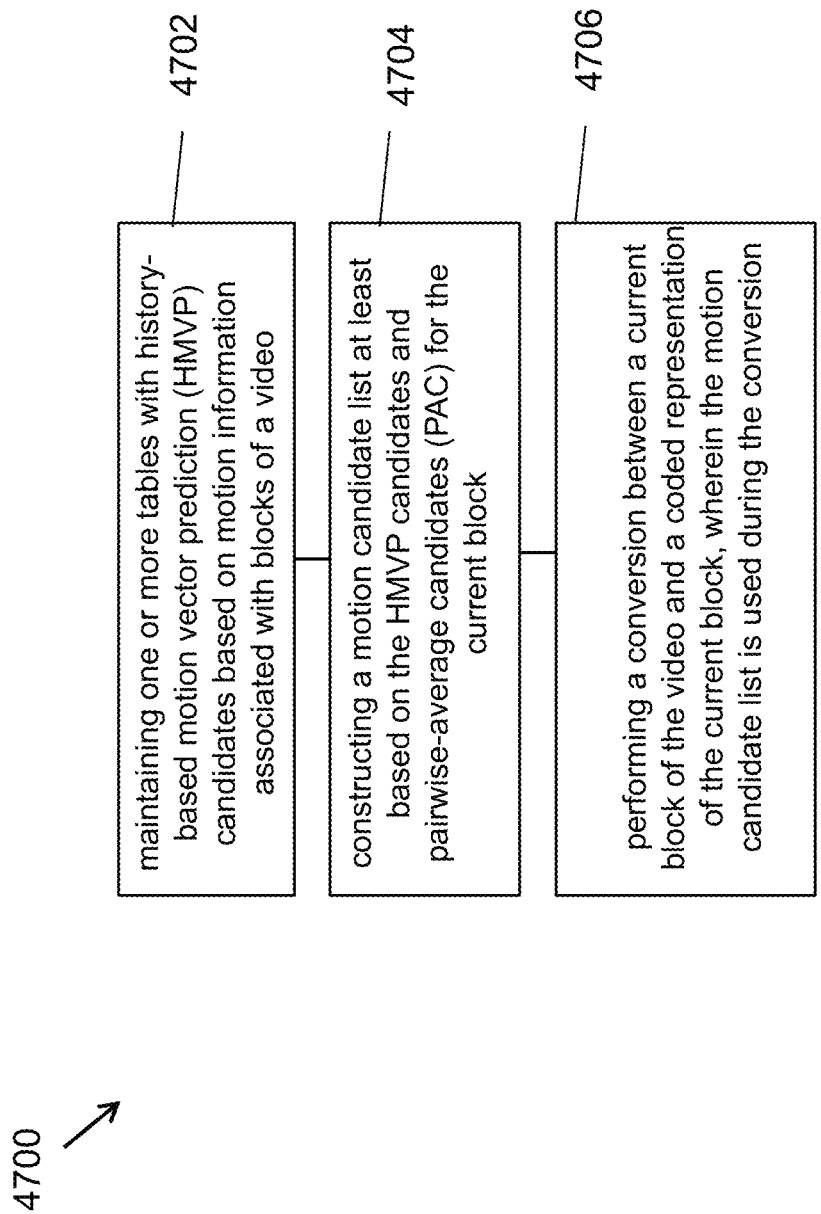
FIG. 47 is a flowchart for an example method of video processing.

FIG. 47 is a flowchart for an example method 4700 of video processing. The steps of this flowchart can be associated with example 10 described in Section 4 of this document. The method 4700 includes maintaining (4702) one or more tables with history-based motion vector prediction (HMVP) candidates based on motion information associated with blocks of a video; constructing (4704) a motion candidate list at least based on the HMVP candidates and pairwise-average candidates (PAC) for the current block; and performing (4706) a conversion between a current block of the video and a coded representation of the current block, wherein the motion candidate list is used during the conversion.

Figure 48:
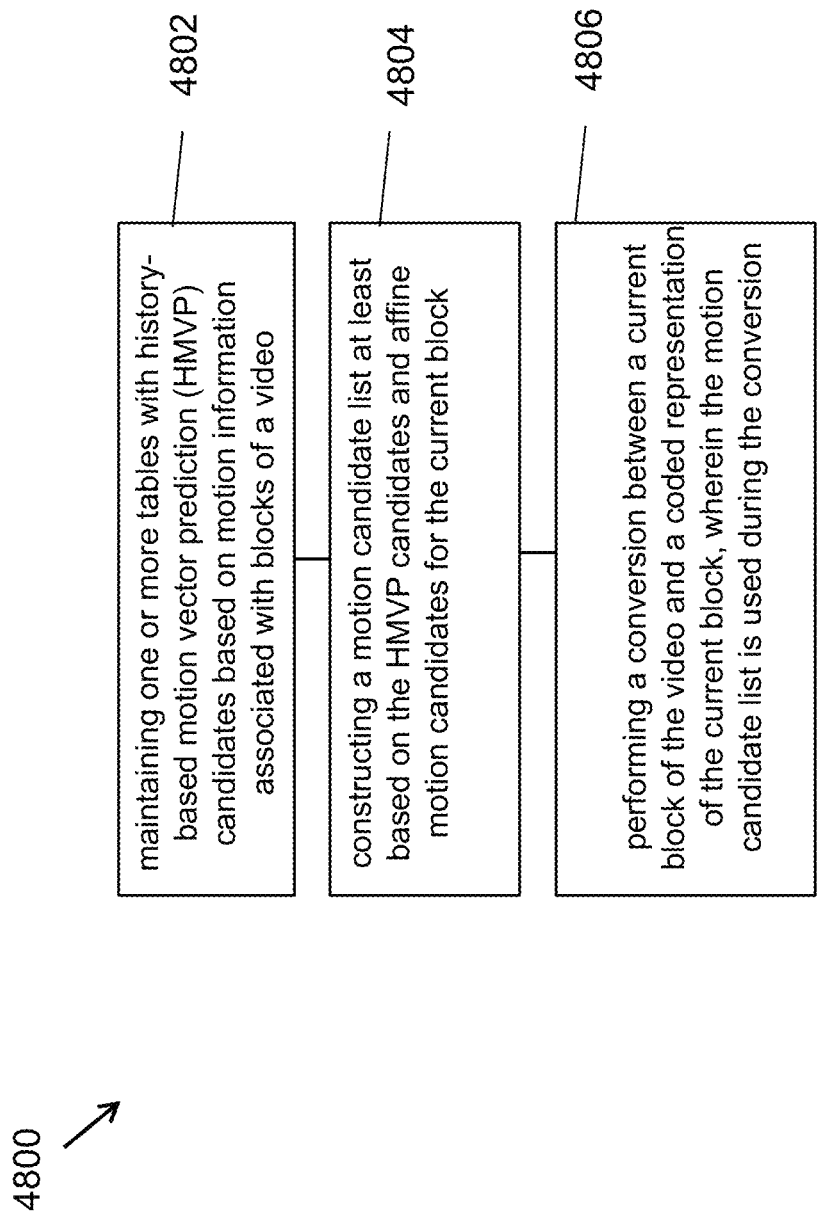
FIG. 48 is a flowchart for an example method of video processing.

FIG. 48 is a flowchart for an example method 4800 of video processing. The steps of this flowchart can be associated with example 11 described in Section 4 of this document. The method 4800 includes maintaining (4802) one or more tables with history-based motion vector prediction (HMVP) candidates based on motion information associated with blocks of a video; constructing (4804) a motion candidate list at least based on the HMVP candidates and affine motion candidates for the current block; and performing (4806) a conversion between a current block of the video and a coded representation of the current block, wherein the motion candidate list is used during the conversion.

Some embodiments of the disclosed technology will now be described in clause-based format.

1. A method of video processing, comprising:
   determining, after a conversion between a video block of a video comprising multiple blocks and a bitstream representation of the video, whether a rule of updating of one or more history based motion vector predictor (HMVP) tables is satisfied by a prediction direction used for the conversion; and
   selectively updating the one or more HMVP tables based on the determining.

2. The method of clause 1, wherein the rule of updating specifies to skip updating the one or more HMVP tables due to the prediction direction being a uni-direction.

3. The method of clause 1, wherein the rule of updating specifies to update the one or more HMVP tables due to the prediction direction being a bi-prediction.

4. The method of clause 1, wherein the rule of updating specifies to update the one or more HMVP tables due to the prediction direction being a uni-direction and due to use of multiple reference pictures during the conversion.

5. The method of clause 4, wherein the selectively updating comprises updating the one or more tables includes updating the one or more tables using multi-hypothesis motion information of the video block.

6. A method of video processing, comprising:
   maintaining one or more tables with history-based motion vector prediction (HMVP) candidates based on motion information associated with blocks of a video, wherein the HMVP candidates are stored using a first precision of motion information lower than a second precision of motion information used by motion candidates not stored in the one or more tables; and performing a conversion between a current block of the video and a coded representation of the current block, wherein the one or more tables are used during the conversion.

7. The method of clause 6, wherein the first precision of motion information is 8, 10, 12 or 14, and the second precision of motion information is 16.

8. The method of clause 6, further comprising:
selecting a HMVP candidate from the HMVP candidates; and
performing a comparison of the HMVP candidate with a motion candidate stored in a motion candidate list in accordance with the second precision of motion information.

9. The method of clause 8, wherein the comparison includes applying a bit shift operation.

10. The method of clause 9, wherein the bit shift operation is expressed as $(1<<(K-L))$, wherein K denotes the second precision of motion information and L denotes the first precision of motion information.

11. The method of clause 8, further comprising:
upon determining that the HMVP candidate is different from the motion candidate, adding the HMVP candidate to the motion candidate list.

12. A method of video processing, comprising:
maintaining one or more tables with history-based motion vector prediction (HMVP) candidates based on motion information associated with blocks of a video, wherein the HMVP candidates in the one or more tables are stored in accordance with a rule based at least on a condition of reference pictures to which the HMVP candidates refer to; and
performing the conversion between a current block of the video and a coded representation of the current block, wherein the one or more tables are used during the conversion.

13. The method of clause 11, wherein only HMVP candidates referring to certain reference pictures are stored in the one or more tables, thereby avoiding having to store reference picture index information in the one or more tables.

14. The method of clause 13, wherein the certain reference pictures are pre-defined or signaled in the coded representation of the video.

15. The method of clause 14, further comprising:
upon determining that a motion information of the current block fails to refer to the certain reference pictures, scaling the motion information of the current block to at least one of the certain reference pictures prior to storing the motion information of the current block in the one or more tables.

16. A method of video processing, comprising:
maintaining one or more tables with history-based motion vector prediction (HMVP) candidates based on motion information associated with blocks of a video;
performing the conversion between a current block of the video and a coded representation of the current block;
selecting an HMVP candidate from the HMVP candidates in the one or more tables; and
updating the one or more tables using a hash-table based pruning applied to the HMVP candidate and a motion information of the current block of the video.

17. The method of clause 16, wherein a hash-table based pruning includes performing a comparison of a hash value of the HMVP candidate and a hash value of the motion information of the current block of the video.

18. The method of clause 17, further comprising:
upon determining that the hash value of the HMVP candidate is identical to that of the hash value of the motion information of the current block of the video, removing the HMVP candidate from the one or more tables.

19. A method of video processing, comprising:
maintaining one or more tables with history-based motion vector prediction (HMVP) candidates based on motion information associated with blocks of a video;
performing a conversion between a current block of the video to a coded representation of the current block using a generalized bi-prediction (GBi) mode, wherein, in the GBi mode, the current block is coded using a bi-prediction step and wherein coding unit (CU)-level weights are assigned to prediction blocks generated from the bi-prediction step; and
updating the one or more tables only using reference picture information and motion information of the current block, thereby excluding storing the weights of the current block in the one or more tables.

20. The method of clause 19, wherein the weights are based on a predetermined value.

21. The method of clause 19, wherein the predetermined value is ½.

22. The method of clause 19, wherein the weights are based on one or more HMVP candidates used during a conversion of another block of the video to a coded representation of the another block.

23. A method of video processing, comprising:
maintaining one or more tables with history-based motion vector prediction (HMVP) candidates based on motion information associated with blocks of a video;
performing a conversion between a current block of the video and a coded representation of the current block using a generalized bi-prediction (GBi) mode, wherein, in the GBi mode, the current block is coded using a bi-prediction step and wherein coding unit (CU)-level weights are assigned to prediction blocks generated from the bi-prediction step; and
updating the one or more tables with at least the weights of the current block.

24. The method of clause 23, further comprising:
updating the one or more tables with the motion information and the weights of the current block.

25. The method of clause 24, further comprising:
updating the one or more tables by adding the motion information and the weights of the current block as a new HMVP candidate.

26. The method of clause 23, further comprising:
performing a conversion between another block of the video and the coded representation of the video including the another block, wherein the one or more tables are used during the conversion.

27. The method of clause 23, further comprising:
performing a conversion between another block of the video and the coded representation of the video according to a HMVP candidate in the one or more tables.

28. A method of video processing, comprising:
maintaining one or more tables with history-based motion vector prediction (HMVP) candidates based on motion information associated with blocks of a video; and
performing a conversion between a current block of video and a coded representation of the current block, wherein the one or more tables are used during the conversion, wherein a combined bi-predictive merge candidate is generated by comparing N number of pairs of motion information of the current block, and wherein N is less than 12.

29. The method of clause 28, wherein N is equal to m*(m−1) where m is an integer smaller than 4.

30. The method of clause 28, wherein N is dependent on a number of available merge candidates prior to adding the combined bi-predictive merge candidate to the look-up table.

31. A method of video processing, comprising:
maintaining one or more tables with history-based motion vector prediction (HMVP) candidates based on motion information associated with blocks of a video; and
performing a conversion between a current block of video and a coded representation of the current block, wherein the one or more tables are used during the conversion, wherein a combined bi-predictive merge candidate is generated by comparing multiple pairs of motion information of the current block, and wherein the bi-predictive merge candidate is generated using only a certain type of merge candidates.

32. The method of clause 31, wherein the certain type of merge candidates excludes HMVP candidates.

33. The method of clause 31, wherein the certain type of merge candidates excludes advanced temporal motion vector predictors.

34. A method of video processing, comprising:
maintaining one or more tables with history-based motion vector prediction (HMVP) candidates based on motion information associated with blocks of a video;
generating multiple merge candidates from a HMVP candidate; and
performing a conversion between a current block of video and a coded representation of the current block, wherein a generated merge candidate is used during the conversion.

35. The method of clause 34, wherein the HMVP candidate is used as a merge candidate for the conversion.

36. The method of clause 34, wherein the multiple merge candidates use a same motion information as a motion information of the HMVP candidate and the multiple merge candidates further use different associated weights than a weight of the HMVP candidate.

37. The method of clause 34 or 35, wherein a number of merge candidates generated from the HMVP candidate is equal to a number of allowed weights.

38. The method of clause 34 or 35, wherein a number of merge candidates generated from the HMVP candidate is based on a weight of the HMVP candidate.

39. The method of clause 38, wherein at most a first merge candidate and a second merge candidate are generated, wherein a weight of the first merge candidate is equal to the weight of the HMVP candidate and a weight of the second merge candidate is equal to a weight of a pair of reference pictures used in the conversion.

40. The method of clause 34 or 35, wherein a number of merge candidates generated from the HMVP candidate is based on a number of available motion candidates prior to adding the HMVP candidate to the look-up table.

41. A method of video processing, comprising:
maintaining one or more tables with history-based motion vector prediction (HMVP) candidates based on motion information associated with blocks of a video;
constructing a motion candidate list at least based on the HMVP candidates and spatio-temporal motion vector predictors for the current block; and
performing a conversion between a current block of the video and a coded representation of the current block, wherein the motion candidate list is used during the conversion.

42. The method of clause 41, wherein the motion candidate list is a merge candidate list.

43. The method of clause 42, further comprising:
adding the HMVP candidates to the merge candidate list in accordance with a rule.

44. The method of clause 41, wherein the rule specifies that the HMVP candidates are to be added after the spatio-temporal motion vector predictors for the current block.

45. The method of clause 41, wherein the rule specifies that the HMVP candidates are to be added before the spatio-temporal motion vector predictors for the current block.

46. The method of clause 41, wherein the rule specifies that the HMVP candidates are to be interweaved with the spatio-temporal motion vector predictors for the current block such that a portion of the HMVP candidates are added before the spatio-temporal motion vector predictors and another portion of the HMVP candidates are added after the spatio-temporal motion vector predictors.

47. The method of any one or more of clauses 41-46, wherein the spatio-temporal motion vector predictors for the current block pertain to sub-blocks of the current block.

48. A method of video processing, comprising:
maintaining one or more tables with history-based motion vector prediction (HMVP) candidates based on motion information associated with blocks of a video;
constructing a motion candidate list at least based on the HMVP candidates and pairwise-average candidates (PAC) for the current block; and
performing a conversion between a current block of the video and a coded representation of the current block, wherein the motion candidate list is used during the conversion.

49. The method of clause 48, wherein the motion candidate list is a merge candidate list.

50. The method of clause 49, further comprising:
adding the HMVP candidates to the merge candidate list in accordance with a rule.

51. The method of clause 48, wherein the rule specifies that the HMVP candidates are to be added after the PAC for the current block.

52. The method of clause 48, wherein the rule specifies that the HMVP candidates are to be added before the PAC for the current block.

53. The method of clause 48, wherein the rule specifies that the HMVP candidates are to be interweaved with the PAC for the current block such that a portion of the HMVP candidates are added before the PAC and another portion of the HMVP candidates are added after the PAC.

54. The method of clause 48, further comprising:
performing a conversion of the current block by disallowing the PAC to be derived from the HMVP candidates.

55. A method of video processing, comprising:
maintaining one or more tables with history-based motion vector prediction (HMVP) candidates based on motion information associated with blocks of a video;
constructing a motion candidate list at least based on the HMVP candidates and affine motion candidates for the current block; and performing a conversion between a current block of the video and a coded representation of the current block, wherein the motion candidate list is used during the conversion.

56. The method of clause 55, wherein the motion candidate list is a merge candidate list.

57. The method of clause 56, further comprising:
adding the HMVP candidates to the merge candidate list in accordance with a rule.

58. The method of clause 55, wherein the rule specifies that the HMVP candidates are to be added after the affine motion candidates for the current block.

59. The method of clause 55, wherein the rule specifies that the HMVP candidates are to be added before default affine motion candidates for the current block.

60. The method of clause 55, wherein the rule specifies that the HMVP candidates are to be interweaved with the PAC for the current block such that a portion of the HMVP candidates are added before the PAC and another portion of the HMVP candidates are added after the affine motion candidates.

61. The method of any of clauses 55 to 60, wherein the HMVP candidates are generated from neighboring blocks of the current block.

62. The method of any one or more of clauses 55 to 61, wherein addition of the HMVP candidates to the merge list dynamically varies from one block to another.

63. A video encoder apparatus including a processor configured to implement a method recited in any one or more of clauses 1 to 62.

64. A video decoder apparatus including a processor configured to implement a method recited in any one or more of clauses 1 to 62.

65. A computer-readable medium having code stored thereupon, the code including instructions causing a processor to implement a method recited in any one or more of clauses 1 to 62.

66. A method, system or apparatus described herein.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
   determining, after a conversion between a video block of a video comprising multiple blocks and a bitstream representation of the video, whether a rule of updating one or more history based motion vector predictor (HMVP) tables with HMVP candidates is satisfied, wherein the rule of updating is based on a prediction direction used for the conversion; and
   selectively updating the one or more HMVP tables based on the determining,
   wherein the rule of updating specifies to skip updating the one or more HMVP tables due to the prediction direction being a uni-direction, or specifies to update the one or more HMVP tables due to the prediction direction being a bi-prediction.

2. The method of claim 1, wherein the rule of updating specifies to update the one or more HMVP tables due to the prediction direction being a uni-direction and due to use of multiple reference pictures during the conversion.

3. The method of claim 2, wherein the selectively updating comprises updating the one or more HMVP tables using multi-hypothesis motion information of the video block.

4. The method of claim 1, wherein the rule of updating the one or more HMVP tables with HMVP candidates is further based on motion information associated with the multiple blocks of the video, wherein the HMVP candidates are stored using a first precision of motion information lower than a second precision of motion information used by motion candidates not stored in the one or more HMVP tables.

5. The method of claim 4, wherein the first precision of motion information is 8, 10, 12 or 14, and the second precision of motion information is 16.

6. The method of claim 4, wherein the determining whether the rule of updating is satisfied comprises:
   selecting a HMVP candidate from the HMVP candidates; and
   performing a comparison of the HMVP candidate with a motion candidate stored in a motion candidate list in accordance with the second precision of motion information.

7. The method of claim 6, wherein the comparison includes applying a bit shift operation.

8. The method of claim 7, wherein the bit shift operation is expressed as (1<<(K−L)), wherein K denotes the second precision of motion information and L denotes the first precision of motion information.

9. The method of claim 6, wherein the selectively updating comprises:
   upon determining that the HMVP candidate is different from the motion candidate, adding the HMVP candidate to the motion candidate list.

10. The method of claim 1, wherein the rule of updating the one or more HMVP tables with HMVP candidates is further based on motion information associated with multiple blocks of the video, wherein the HMVP candidates in the one or more HMVP tables are stored in accordance with a rule based at least on a condition of reference pictures to which the HMVP candidates refer to.

11. The method of claim 10, wherein only HMVP candidates referring to certain reference pictures are stored in the one or more HMVP tables, thereby avoiding having to store reference picture index information in the one or more HMVP tables, wherein the certain reference pictures are pre-defined or signaled in the bitstream representation of the video.

12. The method of claim 11, wherein the selectively updating comprises:
   upon determining that a motion information of the video block fails to refer to the certain reference pictures, scaling the motion information of the video block to at least one of the certain reference pictures prior to storing the motion information of the video block in the one or more HMVP tables.

13. The method of claim 1, wherein the rule of updating the one or more HMVP tables with HMVP candidates is further based on motion information associated with the multiple blocks of the video, wherein the selectively updating comprises:
   selecting an HMVP candidate from the HMVP candidates in the one or more HMVP tables; and
   updating the one or more HMVP tables using a hash-table based pruning applied to the HMVP candidate and a motion information of the video block of the video.

14. The method of claim 13, wherein the hash-table based pruning includes performing a comparison of a hash value of the HMVP candidate and a hash value of the motion information of the video block of the video.

15. The method of claim 14, wherein the selectively updating further comprises:
   upon determining that the hash value of the HMVP candidate is identical to that of the hash value of the motion information of the current block of the video, removing the HMVP candidate from the one or more HMVP tables.

16. The method of claim 1, further comprising:
   performing the conversion between the video block of the video and the bitstream representation of the video, wherein the one or more HMVP tables are used during the conversion.

17. An apparatus for video processing, comprising a processor and a non-transitory memory with instructions thereon, wherein the instructions upon execution by the processor, cause the processor to:
   determine, after a conversion between a video block of a video comprising multiple blocks and a bitstream representation of the video, whether a rule of updating of one or more history based motion vector predictor (HMVP) tables with HMVP candidates is satisfied, wherein the rule of updating is based on a prediction direction used for the conversion; and
   selectively update the one or more HMVP tables based on the determining,
   wherein the rule of updating specifies to skip updating the one or more HMVP tables due to the prediction direction being a uni-direction, or specifies to update the one or more HMVP tables due to the prediction direction being a bi-prediction.

18. A non-transitory computer-readable medium having code stored thereupon, the code including instructions causing a processor to implement a method of video processing, wherein the method comprises:
  determining, after a conversion between a video block of a video comprising multiple blocks and a bitstream representation of the video, whether a rule of updating of one or more history based motion vector predictor (HMVP) tables with HMVP candidates is satisfied, wherein the rule of updating is based on a prediction direction used for the conversion; and
  selectively updating the one or more HMVP tables based on the determining,
  wherein the rule of updating specifies to skip updating the one or more HMVP tables due to the prediction direction being a uni-direction, or specifies to update the one or more HMVP tables due to the prediction direction being a bi-prediction.

19. The apparatus of claim 17, wherein the rule of updating specifies to update the one or more HMVP tables due to the prediction direction being a uni-direction and due to use of multiple reference pictures during the conversion.

20. The apparatus of claim 19, wherein the selectively updating comprises updating the one or more HMVP tables using multi-hypothesis motion information of the video block.

* * * * *

UNITED STATES PATENT AND TRADEMARK OFFICE
CERTIFICATE OF CORRECTION

PATENT NO. : 11,616,945 B2
APPLICATION NO. : 17/210797
DATED : March 28, 2023
INVENTOR(S) : Li Zhang et al.

Page 1 of 1

It is certified that error appears in the above-identified patent and that said Letters Patent is hereby corrected as shown below:

On the Title Page

In the (30) Foreign Application Priority Data, insert:
-- September 24, 2018 (WO) ............... PCT/CN2018/107178 --, therefor.

Signed and Sealed this
Twenty-fifth Day of June, 2024

Katherine Kelly Vidal
*Director of the United States Patent and Trademark Office*